United States Patent [19]
Nakai

[11] Patent Number: 5,949,955
[45] Date of Patent: Sep. 7, 1999

[54] RECORDING MEDIUM APPARATUS AND METHOD OF RECORDING AND REPRODUCING DATA WITH MANAGEMENT INFORMATION

[75] Inventor: Masatoshi Nakai, Kawasaki, Japan

[73] Assignee: Kabushiki Kaisha Toshiba, Kawasaki, Japan

[21] Appl. No.: 08/971,578

[22] Filed: Nov. 17, 1997

Related U.S. Application Data

[63] Continuation of application No. 08/630,507, Apr. 10, 1996, abandoned.

[30] Foreign Application Priority Data

Apr. 14, 1995 [JP] Japan .................................... 7-114004

[51] Int. Cl.$^6$ .................................................. H04N 5/85
[52] U.S. Cl. ........................................ 386/106; 386/126
[58] Field of Search .................................. 386/33, 45, 95, 386/96, 109, 125, 126, 46, 121, 69, 52, 55, 106; H04N 5/85

[56] References Cited

U.S. PATENT DOCUMENTS

| | | | |
|---|---|---|---|
| 4,422,105 | 12/1983 | Rodesch et al. | 386/83 |
| 4,989,097 | 1/1991 | Yoshio et al. | 386/95 |
| 5,010,417 | 4/1991 | Yoshio et al. | 386/98 |
| 5,016,113 | 5/1991 | Yamashita et al. | 386/95 |
| 5,068,733 | 11/1991 | Bennett | 348/7 |
| 5,070,503 | 12/1991 | Shikakura | 386/100 |
| 5,130,966 | 7/1992 | Yoshio et al. | 386/95 |
| 5,206,929 | 4/1993 | Langford et al. | 386/55 |
| 5,270,828 | 12/1993 | Mogi | 386/101 |
| 5,336,844 | 8/1994 | Yamauchi et al. | 386/102 |
| 5,434,678 | 7/1995 | Abecassis | 386/52 |
| 5,448,371 | 9/1995 | Choi | 386/125 |
| 5,497,241 | 3/1996 | Ostrover et al. | 386/97 |
| 5,499,103 | 3/1996 | Mankovitz | 386/96 |
| 5,513,010 | 4/1996 | Kori et al. | 386/104 |
| 5,521,712 | 5/1996 | Oguro | 386/95 |
| 5,574,567 | 11/1996 | Cookson et al. | 386/46 |
| 5,613,032 | 3/1997 | Cruz et al. | 386/69 |
| 5,621,579 | 4/1997 | Yuen | 386/121 |
| 5,623,424 | 4/1997 | Azadegan et al. | 364/514 R |
| 5,627,657 | 5/1997 | Park | 386/126 |

FOREIGN PATENT DOCUMENTS 2 196 506   4/1988   United Kingdom ............. H04N 5/76

OTHER PUBLICATIONS

Cruz et al, "Capturing and Playing Multimedia Events with STREAMS," Proceedings ACM Multimedia '94, Oct. 1994.

Little et al, "A Digital On–Demand Video Service Supporting Content–Based Queries," ACM Multimedia 93 Proceedings, Aug. 1993.

Primary Examiner—Tommy P. Chin
Assistant Examiner—Y. Lee
Attorney, Agent, or Firm—Pillsbury Madison & Sutro LLP

[57] ABSTRACT

An optical disk comprises at least one video title set where data is to be recorded, and a video manager for recording management information for managing the video title set. The video title set includes VTSTT_VOBS where data is recorded, VTSM_VOBS where at least one video title set menu, which is to be used at the time of checking and selecting contents of various kinds of data recorded in the VTSTT_VOBS, and corresponds to the contents, is recorded, and VTSM_PGCI_UT where the recording position of the video title set menu in this VTSM VOBS is recorded for the content of each data corresponding the video title set menu. The video manager comprises VMGM_VOBS where a video manager menu corresponding to the management information is recorded and VMGM_PGCI_UT where the recording position of the video manager menu in this VMGM_VOBS is recorded for the content of each data corresponding to the video manager menu. The video manager menu is a title menu, and the video title set menu includes an audio menu, sub-picture menu and angle menu.

12 Claims, 42 Drawing Sheets

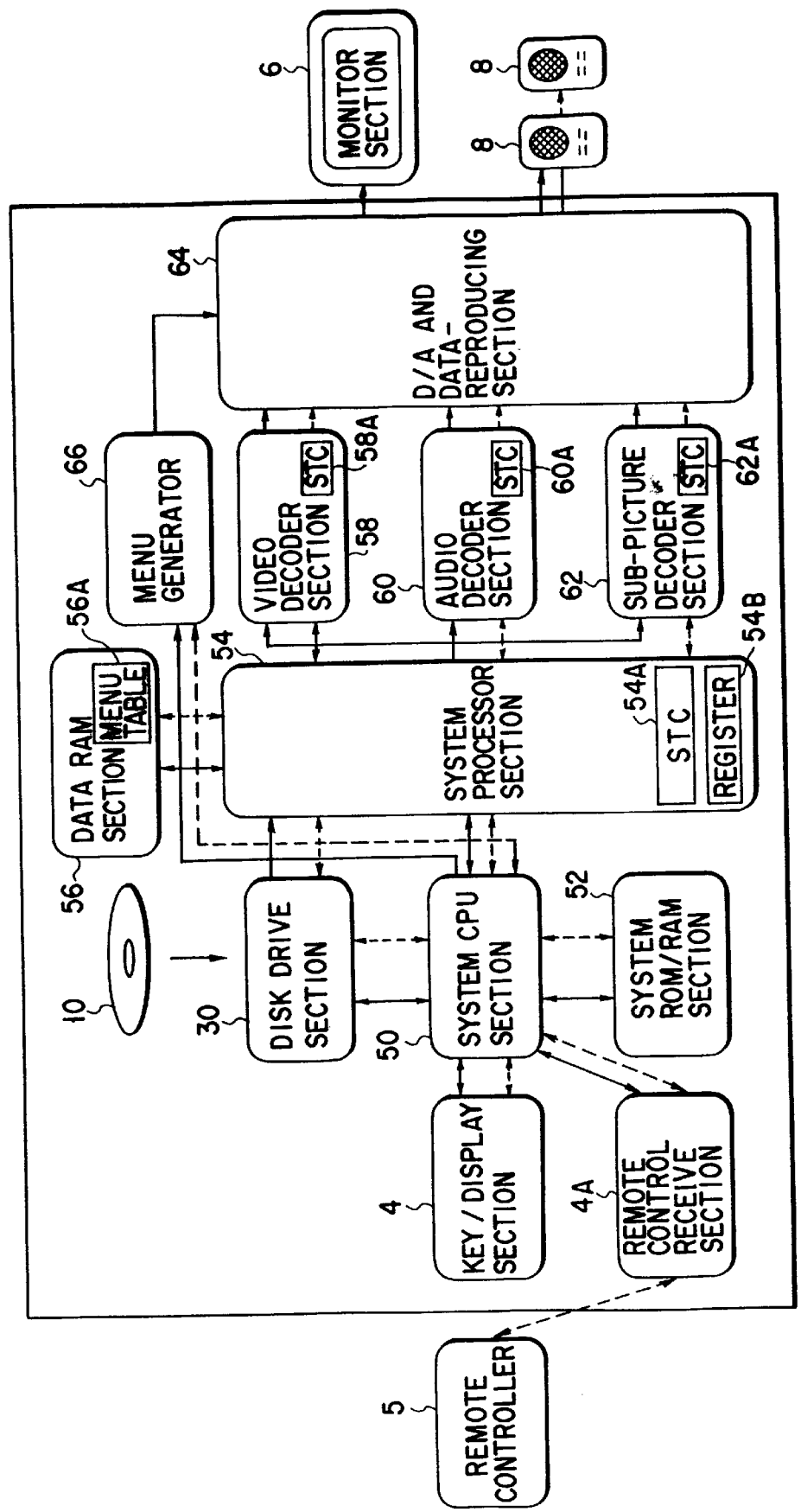
F I G. 1

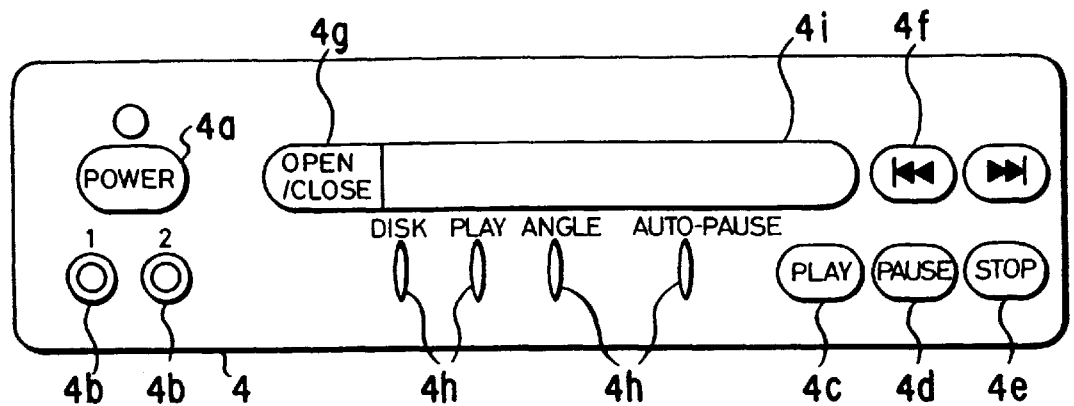
F I G. 4
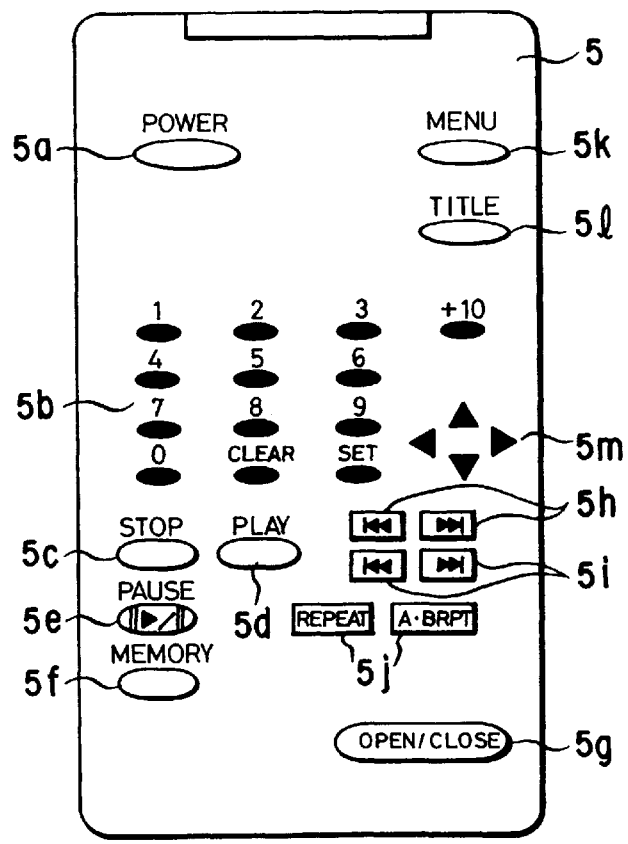
F I G. 5

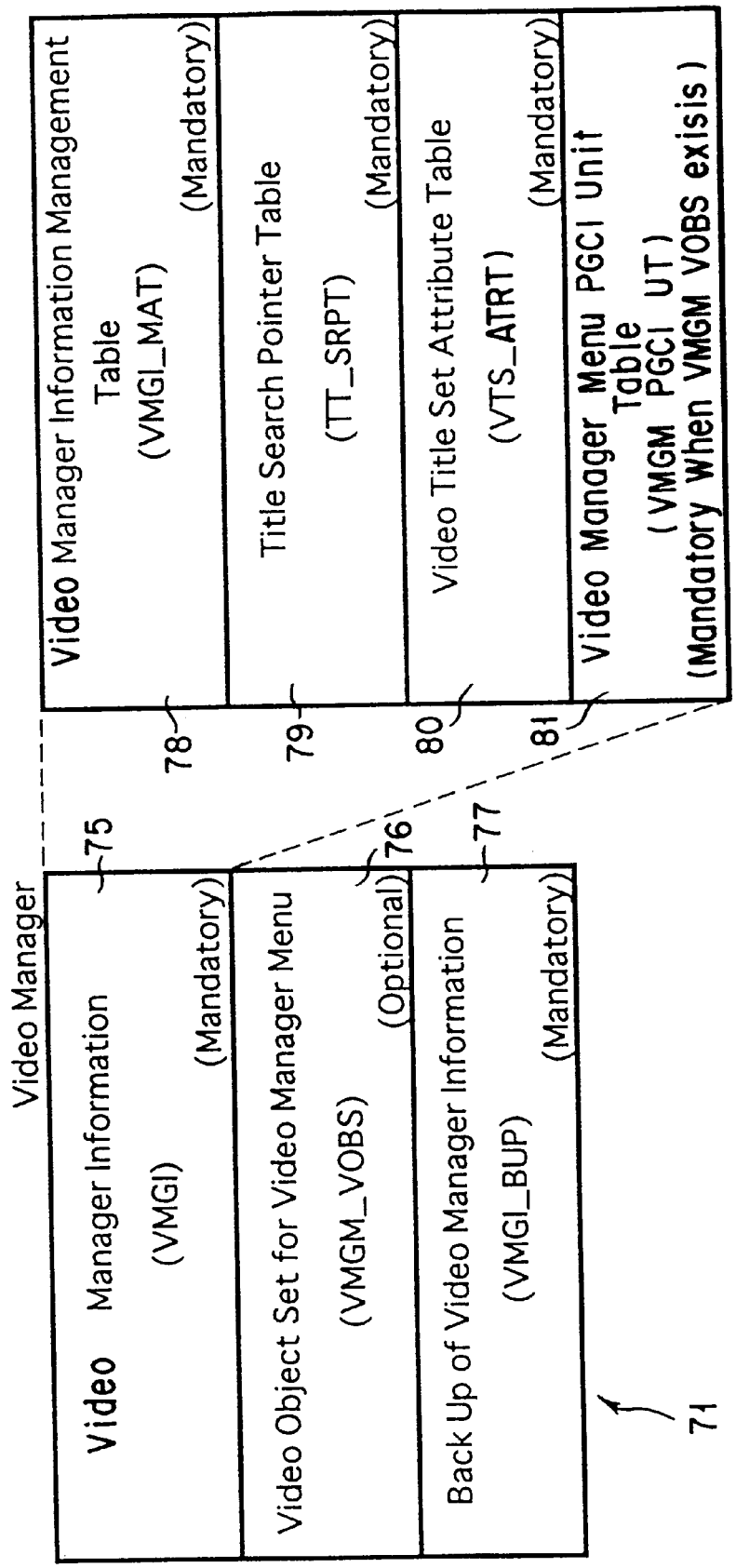
F I G. 7

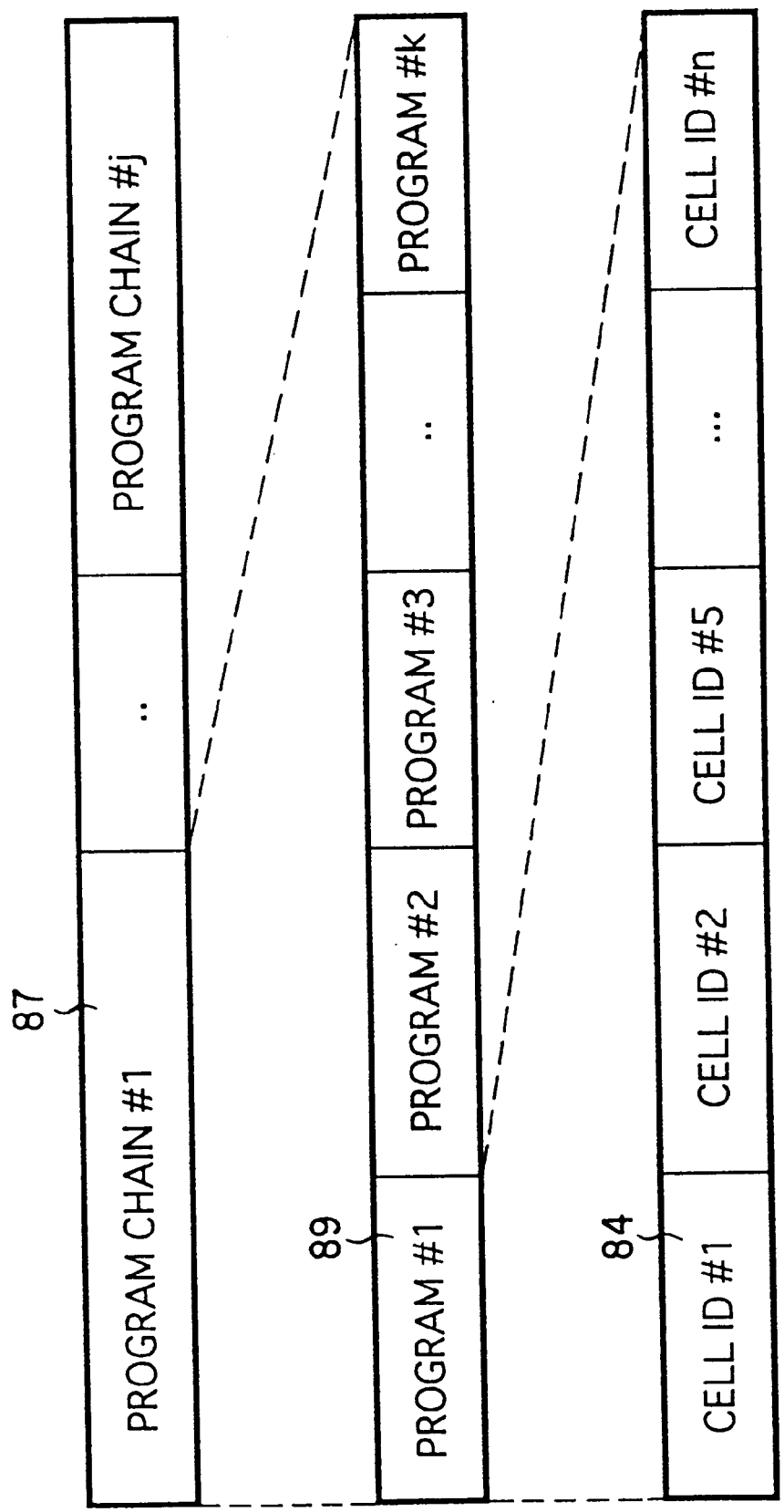
F I G. 9

FIG. 10

| VMGI MAT | Content | (Description order) |
|---|---|---|
| VMG_ID | Video Manager Identifier | |
| VMGI_SZ | Size of Video Manager Information | |
| VERN | Version Number of DVD Video Specification | |
| VMG_CAT | Video Manager Category | |
| VLMS_ID | Volume Set Identifier | |
| VTS_Ns | Number of Video Title Set | |
| PVR_ID | Provider Unique ID | |
| VMGM_VOBS_SA | Video Manager Menu Video Object Set Start Address | |
| VMGI_MAT_EA | End Address of VMGI_MAT | |
| TT_SRPT_SA | Start Address of TT_SRPT | |
| VMGM_PGCI_UT_SA | Start Address of VMGM_PGCI_UT | |
| VTS_ATRT_SA | Start Address of VTS_ATRT | |
| VMGM_V_ATR | Video Attribute of VMGM | |
| VMGM_AST_Ns | Number of Audio Stream of VMGM | |
| VMGM_AST_ATR | Audio Stream Attribute of VMGM | |
| VMGM_SPST_Ns | Number of Sub-picture Stream of VMGM | |
| VMGM_SPST_ATR | Sub-picture Stream Attribute of VMGM | |

TT_SRPT

| TT_SRPTI | (Description order) |
|---|---|
| | Content |
| TT_Ns | Number of Title search Pointers |
| TT_SRPT_EA | End Address of TT_SRPT |

| TT_SPR | (Description order) |
|---|---|
| | Content |
| PTT_Ns | Number of Part of Title |
| VTSN | Video Title Set Number |
| VTS_TTN | Video Title Set Title Number |
| VTS_SA | Start Address of Video Title Set |

| VMGM_PGCI_UTI | |
|---|---|
| | Contents |
| VMGM_LU_Ns | Number of Video Manager Menu Language Unit |
| VMGM_IGCI_UT_EA | End address of VMGM PGCI UT |

| VTSM PGCI SRP | |
|---|---|
| | Contents |
| VMGM_LCD | Video Manager Menu Language Code |
| VMGM_LU_SA | Start address of VMGM LU |

VTSM_LUI

| | Contents |
|---|---|
| NMGM_PGCI_Ns | Number of VMGM_PGCI |
| reserved | RSV(0) |
| VMGM_LUI_EA | End address of VMGM LUI |

VTSM_PGCI_SRP

| | Contents |
|---|---|
| VMGM_PGC_CAT | VMGM_PGC Category |
| VMGM_PGCI_SA | Start Address of VMGM_PGCI |

| VTSI_MAT | Content (Description order) |
|---|---|
| VTS_ID | Video Title Set Identifier |
| VTSI_SZ | Size of the VTSI |
| VERN | Version Number of DVD Video Specification |
| VTS_CAT | Video Title Set Category |
| VTSM_VOBS_SA | Start Address of VTSM_VOBS |
| VTSTT_VOBS_SA | Start Address of VTSTT_VOBS |
| VTSI_MAT_EA | End Address of VTSI_MAT |
| VTS_PTT_SRPT_SA | Start Address of VTS_PTT_SRPT |
| VTS_PGCIT_SA | Start Address of VTS_PGCIT |
| VTSM_PGCI_UT_SA | Start Address of VTSM_PGCI_UT |
| VTS_TMAPT_SA | Start Address of VTS_TMAPT |
| VTS_V_ATR | Video Attribute |
| VTS_AST_Ns | Number of Audio Streams for VTS |
| VTS_AST_ATR | Audio Stream Attribute for VTS |
| VTS_SPST_Ns | Number of Sub-picture Streams for VTS |
| VTS_SPST_ATR | Sub-picture Stream Attribute for VTS |
| VTSM_AST_Ns | Number of Audio Streams for VTSM |
| VTSM_AST_ATR | Audio Stream Attribute for VTSM |
| VTS_SPST_Ns | Number of Sub-picture Streams for VTSM |
| VTS_SPST_ATR | Sub-picture Stream Attribute for VTSM |

F I G. 21

The content of one VTS_AST_ATR are follows:

| b63 | b62 | b61 | b60 | b59 | b58 | b57 | b56 |
|-----|-----|-----|-----|-----|-----|-----|-----|
| Audio coding mode | | | | Audio type | | Application ID | |

Multichannel extention

| b55 | b54 | b53 | b52 | b51 | b50 | b49 | b48 |
|-----|-----|-----|-----|-----|-----|-----|-----|
| Quantization | | fs | | Reserved (0) | Number of audio channels | | |

| b47 | b46 | b45 | b44 | b43 | b42 | b41 | b40 |
|-----|-----|-----|-----|-----|-----|-----|-----|
| Specific code(upper bits) | | | | | | | |

| b39 | b38 | b37 | b36 | b35 | b34 | b33 | b32 |
|-----|-----|-----|-----|-----|-----|-----|-----|
| Specific code(lower bits) | | | | | | | |

| b31 | b30 | b29 | b28 | b27 | b26 | b25 | b24 |
|-----|-----|-----|-----|-----|-----|-----|-----|
| Reserved(0)for specific code | | | | | | | |

| b23 | b22 | b21 | b20 | b19 | b18 | b17 | b16 |
|-----|-----|-----|-----|-----|-----|-----|-----|
| Reserved(0) | | | | | | | |

| b15 | b14 | b13 | b12 | b11 | b10 | b9 | b8 |
|-----|-----|-----|-----|-----|-----|-----|-----|
| Reserved(0) | | | | | | | |

| b7 | b6 | b5 | b4 | b3 | b2 | b1 | b0 |
|----|----|----|----|----|----|----|----|
| Application Information | | | | | | | |

F I G. 22

The content of one VTS_SPST_ATR is as follows:

| b47 | b46 | b45 | b44 | b43 | b42 | b41 | b40 |
|---|---|---|---|---|---|---|---|
| Sub-Picture coding mode | | | Reserved (0) | Sub-picture display type | | Sub-picture type | |

| b39 | b38 | b37 | b36 | b35 | b34 | b33 | b32 |
|---|---|---|---|---|---|---|---|
| Specific code (upper bits) | | | | | | | |

| b31 | b30 | b29 | b28 | b27 | b26 | b25 | b24 |
|---|---|---|---|---|---|---|---|
| Specific code (lower bits) | | | | | | | |

| b23 | b22 | b21 | b20 | b19 | b18 | b17 | b16 |
|---|---|---|---|---|---|---|---|
| Reserved (0) for specific code | | | | | | | |

| b15 | b14 | b13 | b12 | b11 | b10 | b9 | b8 |
|---|---|---|---|---|---|---|---|
| Specific code extension | | | | | | | |

| b7 | b6 | b5 | b4 | b3 | b2 | b1 | b0 |
|---|---|---|---|---|---|---|---|
| Reserved (0) | | | | | | | |

FIG. 23

VTS_PGCIT

VTS_PGCIT_I

| | (Description order) |
|---|---|
| | Content |
| VTS_PGC_Ns | Number of VTS_PGCs |
| VTS_PGCIT_EA | End Address of VTS_PGCIT |

VTS_PGCIT_SRP

| | (Description order) |
|---|---|
| | Content |
| VTS_PGC_CAT | Video Title Set PGC category |
| VTS_PGCI_SA | Start Address of VTS_PGC Information |

VTS_PGCI

PGC_GI

| | (Description order) |
|---|---|
| | Content |
| PGC_CAT | PGC Category |
| PGC_CNT | PGC Content |
| PGC_PB_TIME | PGC Playback Time |
| PGC_SPST_CTL | PGC-Sub-picutre Stream Control |
| PGC_AST_CTL | PGC Audio Stream Control |
| PGC_SP_PLT | PGC Sub-picture Palette |
| C_PBIT_SA | Start Address of C_PBIT |
| C_POSIT_SA | Start Address of C_POSIT |

F I G. 28

PGC_PGMAP

| Entry Cell Number for Program #1 |
|---|
| Entry Cell Number for Program #2 |
| ⋮ |
| Entry Cell Number for Program #n |

F I G. 31

Entry cell number

| | Content |
|---|---|
| ECELLN | Entry Cell Number |

F I G. 32

C_PBIT

| Cell Playback Information #1 (C_PBI1) |
|---|
| Cell Playback Information #2 (C_PBI2) |
| ⋮ |
| Cell Playback Information #n (C_PBIn) |

F I G. 33

PGC_CAT

| b31 | b30 | b29 | b28 | b27 | b26 | b25 | b24 |
|---|---|---|---|---|---|---|---|
| Error type | RSV(0) | | | Menu ID | | | |

| b23 | b22 | b21 | b20 | b19 | b18 | b17 | b16 |
|---|---|---|---|---|---|---|---|
| PGC block mode | | PGC block type | | Program playback control | | | |

| b15 | b14 | b13 | b12 | b11 | b10 | b9 | b8 |
|---|---|---|---|---|---|---|---|
| Copy flag | | Playback system management | | Application type | | | |

| b7 | b6 | b5 | b4 | b3 | b2 | b1 | b0 |
|---|---|---|---|---|---|---|---|
| Parental ID | | | | | | | |

F I G. 29

PGC_CNT
The structure of PGC is described.

| b23 | b22 | b21 | b20 | b19 | b18 | b17 | b16 |
|---|---|---|---|---|---|---|---|
| Reserved (0) | Number of Programs | | | | | | |

| b15 | b14 | b13 | b12 | b11 | b10 | b9 | b8 |
|---|---|---|---|---|---|---|---|
| Number of Cells | | | | | | | |

| b7 | b6 | b5 | b4 | b3 | b2 | b1 | b0 |
|---|---|---|---|---|---|---|---|
| Reserved(0) | | | | Number of Angles | | | |

F I G. 30

| C_PBI | |
|---|---|
| | Content |
| C_CAT | Cell Category |
| C_PBTM | Cell Playback Time |
| C_FVOBU_SA | Start Address of the First VOBU in the Cell |
| C_LVOBU_SA | Start Address of the Last VOBU in the Cell |
F I G. 34
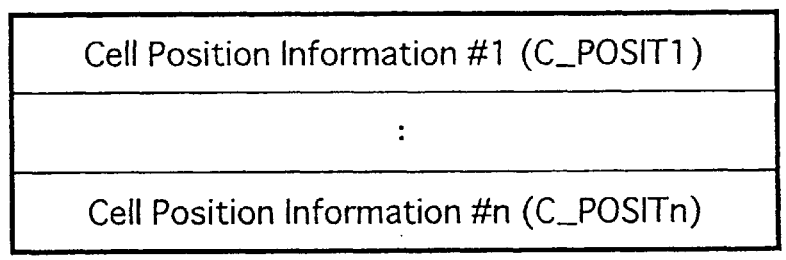
F I G. 35
| C_POSI | |
|---|---|
| | Content |
| C_VOB_IDN | VOB ID Number of Cell |
| C_IDN | Cell ID Number of the Cell |
F I G. 36

VTSM_PGCI_UTI

| | Contents |
|---|---|
| VTSM_LU_Ns | Number of Video Title Set Menu Language Units |
| reserved | RSV(0) |
| VTSM_PGCI_UT_EA | End Address of VTSM_PGCI_UT |

VTSM_LU_SRP

| | Contents |
|---|---|
| VTSM_LCD | Video Title Set Menu Language Code |
| reserved | RSV(0) |
| VTSM_LU_SA | Start Address of VTSM_LU |

VTSM_LUI

| | Contents |
|---|---|
| VTSM_PGC_Ns | Number of VTSM_PGCs |
| reserved | Reserved(0) |
| VTSM_LU_EA | End Adderss of VTSM_LU |

VTSM_PGCI_SRP

| | Contents |
|---|---|
| VTSM_PGC_CAT | VTSM_PGC Category |
| VTSM_PGCI_SA | Start Address of VTSM_PGCI |

| PCI | |
|---|---|
| | Content |
| PCI_GI | PCI General Information |
| NSML_AGLI | Angle Information |

F I G. 45

| PCI_GI | |
|---|---|
| | Content |
| NV_PCK_LBN | LBN of NV Pack |
| VOBU_CAT | Category of VOBU |
| VOBU_SPTS | Start PTS of VOBU |
| VOBU_EPTS | End PTS of VOBU |

F I G. 46

NSML_AGLI

| | Content |
|---|---|
| NSML_AGL_C1_DSTA | Destination Address of Angle Cell Number 1 |
| NSML_AGL_C2_DSTA | Destination Address of Angle Cell Number 2 |
| NSML_AGL_C3_DSTA | Destination Address of Angle Cell Number 3 |
| NSML_AGL_C4_DSTA | Destination Address of Angle Cell Number 4 |
| NSML_AGL_C5_DSTA | Destination Address of Angle Cell Number 5 |
| NSML_AGL_C6_DSTA | Destination Address of Angle Cell Number 6 |
| NSML_AGL_C7_DSTA | Destination Address of Angle Cell Number 7 |
| NSML_AGL_C8_DSTA | Destination Address of Angle Cell Number 8 |
| NSML_AGL_C9_DSTA | Destination Address of Angle Cell Number 9 |

F I G. 47

| DSI | |
|---|---|
| | Content |
| DSI_GI | DSI General Information |
| SML_AGLI | Angle Information |
| VOBU_SRI | VOBunit search Information |
| SYNCI | Synchronus Playback Information |

F I G. 49

| DSI_GI | |
|---|---|
| | Content |
| NV_PCK_SCR | SCR of NV Pack |
| NV_PCK_LBN | LBN of NV Pack |
| VOBU_EA | VOBU End Address |
| VOBU_IP_EA | First I-picture End Address |
| VOBU_VOB_IDN | VOB ID Number |
| VOBU_C_IDN | Cell ID Number |

F I G. 50

| SML_AGL1 | |
|---|---|
| | Content |
| SML_AGL_C1_DAST | Destination Address of Angle Cell Number 1 |
| SML_AGL_C2_DAST | Destination Address of Angle Cell Number 2 |
| SML_AGL_C3_DAST | Destination Address of Angle Cell Number 3 |
| SML_AGL_C4_DAST | Destination Address of Angle Cell Number 4 |
| SML_AGL_C5_DAST | Destination Address of Angle Cell Number 5 |
| SML_AGL_C6_DAST | Destination Address of Angle Cell Number 6 |
| SML_AGL_C7_DAST | Destination Address of Angle Cell Number 7 |
| SML_AGL_C8_DAST | Destination Address of Angle Cell Number 8 |
| SML_AGL_C9_DAST | Destination Address of Angle Cell Number 9 |

F I G. 51

| SYNCI | |
|---|---|
| | Content |
| A_SYNCA 0 to 7 | Target Audio Pack Address |
| SP_SYNCA 0 to 31 | VOBU Start Address of Target SP pack |

F I G. 56

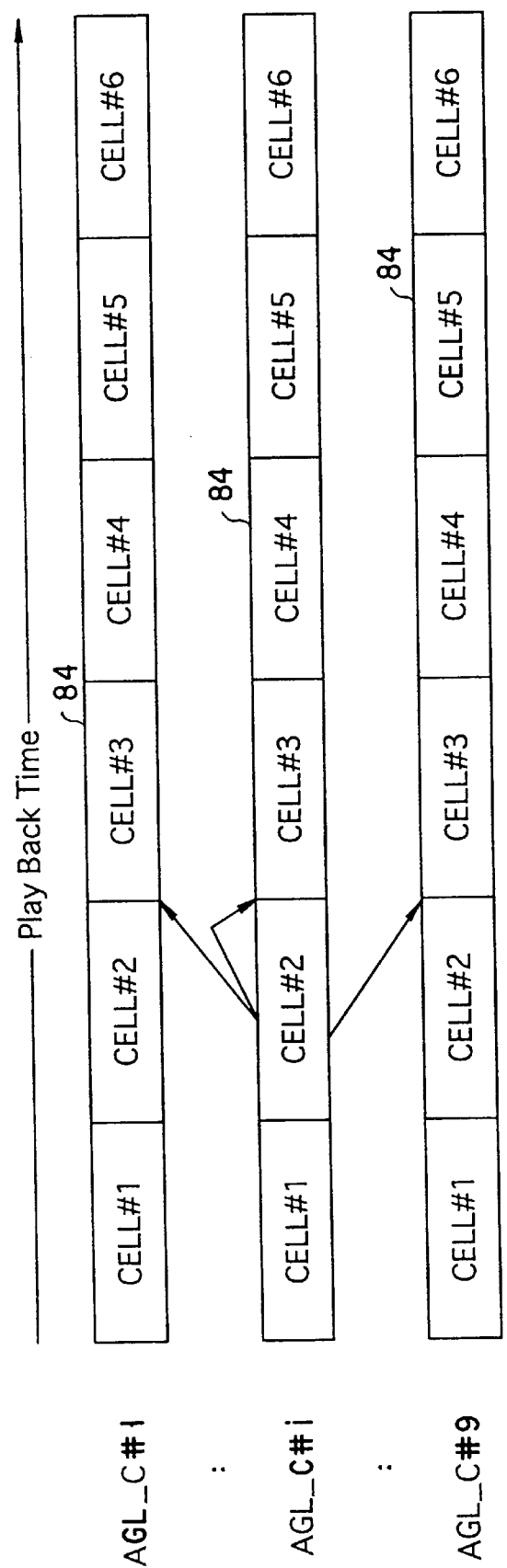
F I G. 52

| VOBU_SRI | |
|---|---|
| | Content |
| FWDA240 | +240 VOBU Start Address |
| FWDA120 | +120 VOBU Start Address |
| FWDA60 | +60 VOBU Start Address |
| FWDA20 | +20 VOBU Start Address |
| FWDA15 | +15 VOBU Start Address |
| FWDA14 | +14 VOBU Start Address |
| FWDA13 | +13 VOBU Start Address |
| FWDA12 | +12 VOBU Start Address |
| FWDA11 | +11 VOBU Start Address |
| FWDA10 | +10 VOBU Start Address |
| FWDA9 | +9 VOBU Start Address |
| FWDA8 | +8 VOBU Start Address |
| FWDA7 | +7 VOBU Start Address |
| FWDA6 | +6 VOBU Start Address |
| FWDA5 | +5 VOBU Start Address |
| FWDA4 | +4 VOBU Start Address |
| FWDA3 | +3 VOBU Start Address |
| FWDA2 | +2 VOBU Start Address |
| FWDA1 | +1 VOBU Start Address |
| BWDA1 | -1 VOBU Start Address |
| BWDA2 | -2 VOBU Start Address |
| BWDA3 | -3 VOBU Start Address |
| BWDA4 | -4 VOBU Start Address |
| BWDA5 | -5 VOBU Start Address |
| BWDA6 | -6 VOBU Start Address |
| BWDA7 | -7 VOBU Start Address |
| BWDA8 | -8 VOBU Start Address |
| BWDA9 | -9 VOBU Start Address |
| BWDA10 | -10 VOBU Start Address |
| BWDA11 | -11 VOBU Start Address |
| BWDA12 | -12 VOBU Start Address |
| BWDA13 | -13 VOBU Start Address |
| BWDA14 | -14 VOBU Start Address |
| BWDA15 | -15 VOBU Start Address |
| BWDA16 | -16 VOBU Start Address |
| BWDA20 | -20 VOBU Start Address |
| BWDA60 | -60 VOBU Start Address |
| BWDA120 | -120 VOBU Start Address |
| BWDA240 | -240 VOBU Start Address |

FIG. 53

FORWARD ADDRESS (FWDANn)

| b31 | b30 | b29 | b28 | b27 | b26 | b25 | b24 |
|---|---|---|---|---|---|---|---|
| V_FWD _Exist 1 | V_FWD _Exist 2 | A_FWDn[29...24] | | | | | |

| b23 | b24 | b25 | b26 | b27 | b28 | b29 | b30 |
|---|---|---|---|---|---|---|---|
| A-FWDn[23...16] | | | | | | | |

| b15 | b14 | b13 | b12 | b11 | b10 | b9 | b8 |
|---|---|---|---|---|---|---|---|
| A-FWDn[15...8] | | | | | | | |

| b7 | b6 | b5 | b4 | b3 | b2 | b1 | b0 |
|---|---|---|---|---|---|---|---|
| A-FWDn[7...0] | | | | | | | |

F I G. 54

BACKWARD ADDRESS (BWDANn)

| b31 | b30 | b29 | b28 | b27 | b26 | b25 | b24 |
|---|---|---|---|---|---|---|---|
| V_BWD _Exist 1 | V_BWD _Exist 2 | A_BWDn[29...24] | | | | | |

| b23 | b24 | b25 | b26 | b27 | b28 | b29 | b30 |
|---|---|---|---|---|---|---|---|
| A-BWDn[23...16] | | | | | | | |

| b15 | b14 | b13 | b12 | b11 | b10 | b9 | b8 |
|---|---|---|---|---|---|---|---|
| A-BWDn[15...8] | | | | | | | |

| b7 | b6 | b5 | b4 | b3 | b2 | b1 | b0 |
|---|---|---|---|---|---|---|---|
| A-BWDn[7...0] | | | | | | | |

F I G. 55

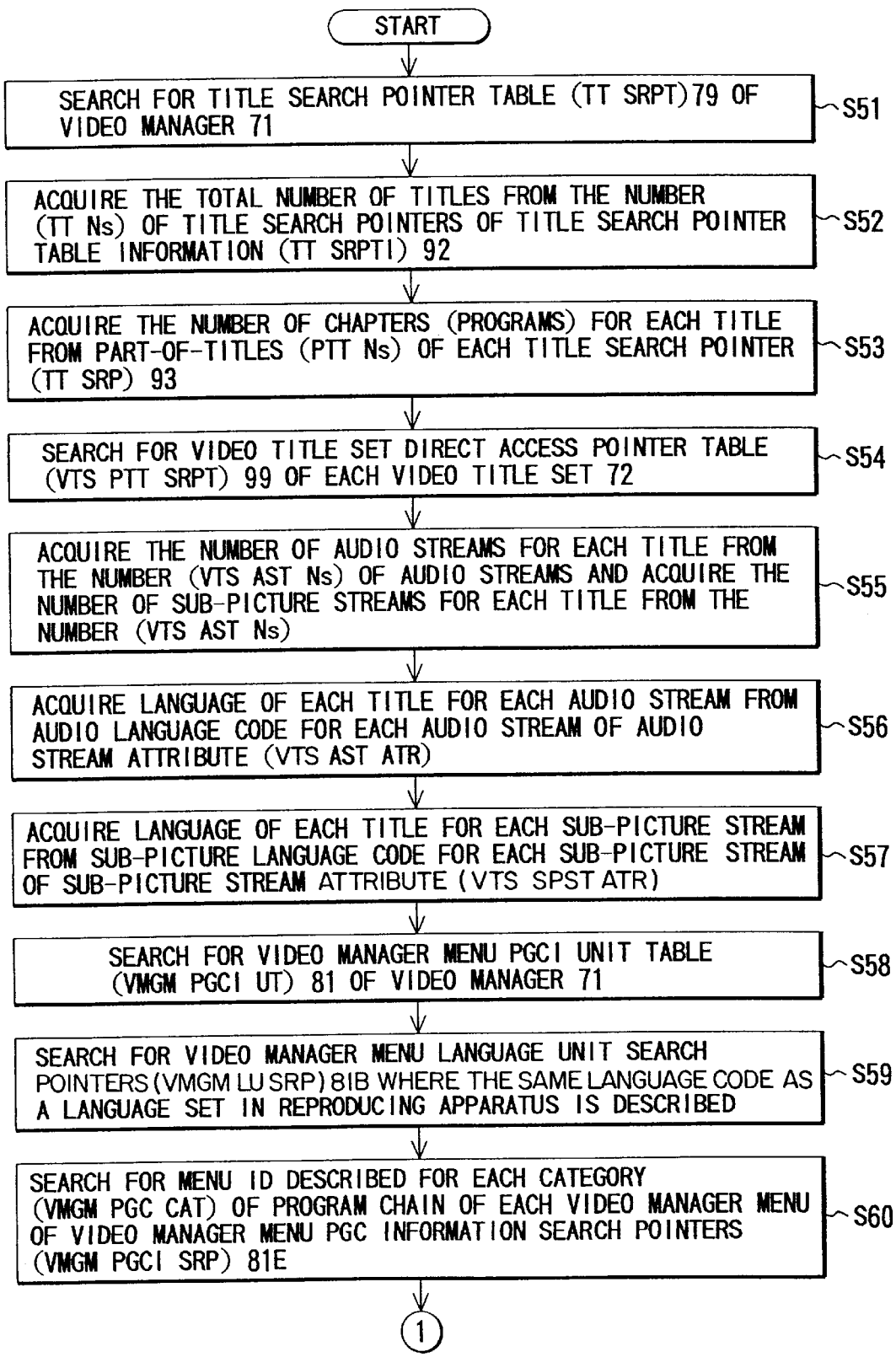
F I G. 57A

| TYPE | START ADDRESS OF TOP VIDEO OBJECT UNIT |
|---|---|
| MAIN MENU | C FVOBU SA OF VOBU DESCRIBED IN VMGM PGCI |
| TITLE MENU | C FVOBU SA OF VOBU DESCRIBED IN VMGM PGCI |
| AUDIO MENU OF TITLE 1 | C FVOBU SA OF VOBU DESCRIBED IN VMGM PGCI |
| AUDIO MENU OF TITLE 2 | C FVOBU SA OF VOBU DESCRIBED IN VMGM PGCI |
| ⋮ | ⋮ |
| AUDIO MENU OF TITLE 1 | C FVOBU SA OF VOBU DESCRIBED IN VMGM PGCI |
| AUDIO MENU OF TITLE 2 | C FVOBU SA OF VOBU DESCRIBED IN VMGM PGCI |
| ⋮ | ⋮ |
| SUB-PICTURE MENU OF TITLE 1 | C FVOBU SA OF VOBU DESCRIBED IN VMGM PGCI |
| SUB-PICTURE MENU OF TITLE 2 | C FVOBU SA OF VOBU DESCRIBED IN VMGM PGCI |
| ⋮ | ⋮ |
| ANGLE MENU OF TITLE 1 | C FVOBU SA OF VOBU DESCRIBED IN VMGM PGCI |
| ANGLE MENU OF TITLE 2 | C FVOBU SA OF VOBU DESCRIBED IN VMGM PGCI |
| ⋮ | ⋮ |

F I G. 58

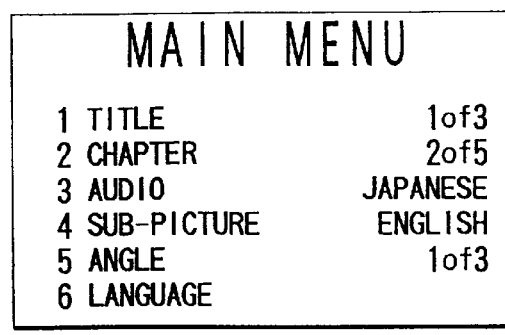

F I G. 59

| Title information | Chapter information |
|---|---|
| 1) from New York  2) from Paris | 1) Metropolitan  2) Manhattan  3) 5th street |

FIG. 60A    FIG. 60B

| Audio information | Subtitle information |
|---|---|
| 1) English  2) French  3) Japanese | 1) English  2) French |

FIG. 60C    FIG. 60D

Angle information
1) Left
2) Right
3) Center

FIG. 60E

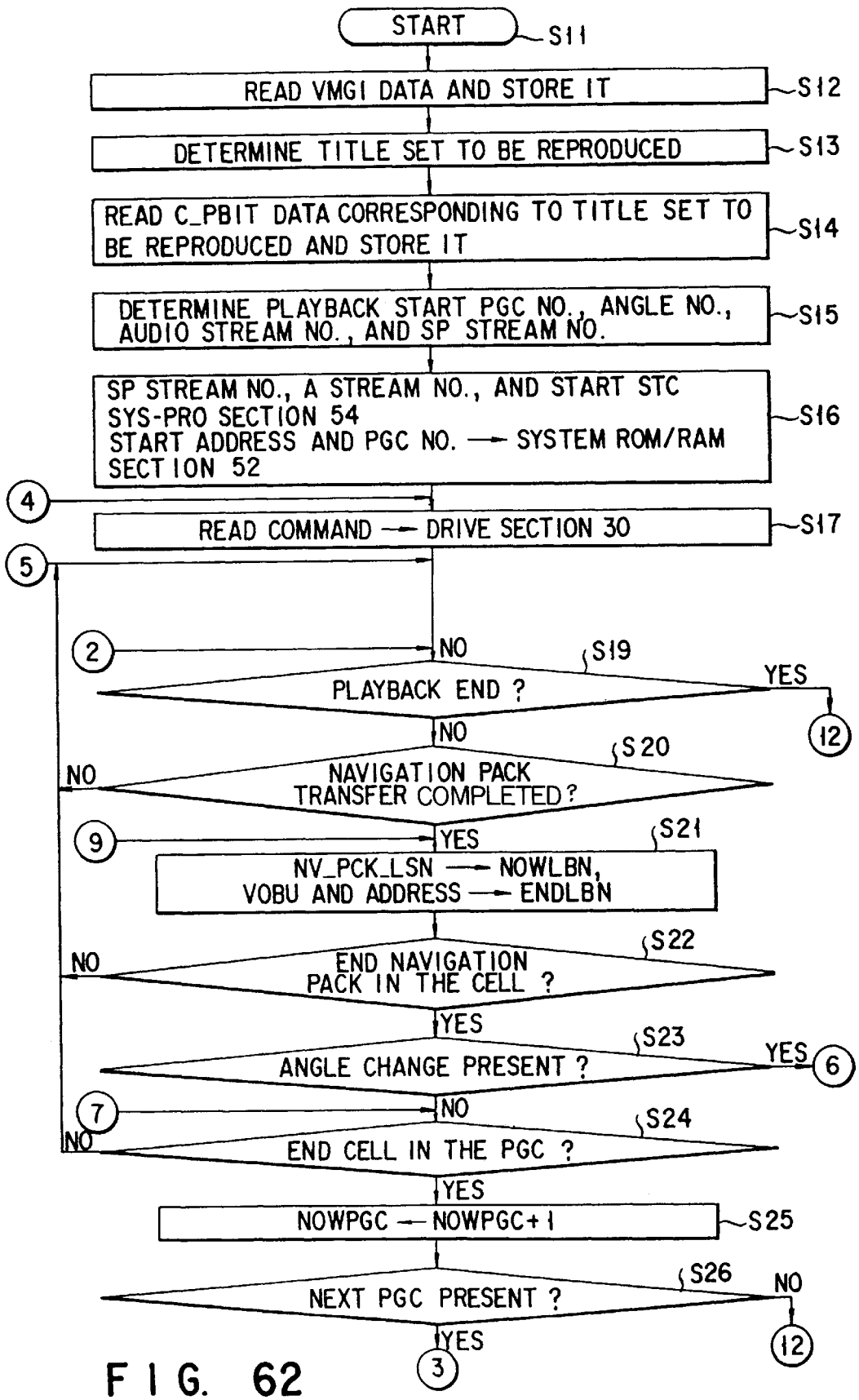
F I G. 62

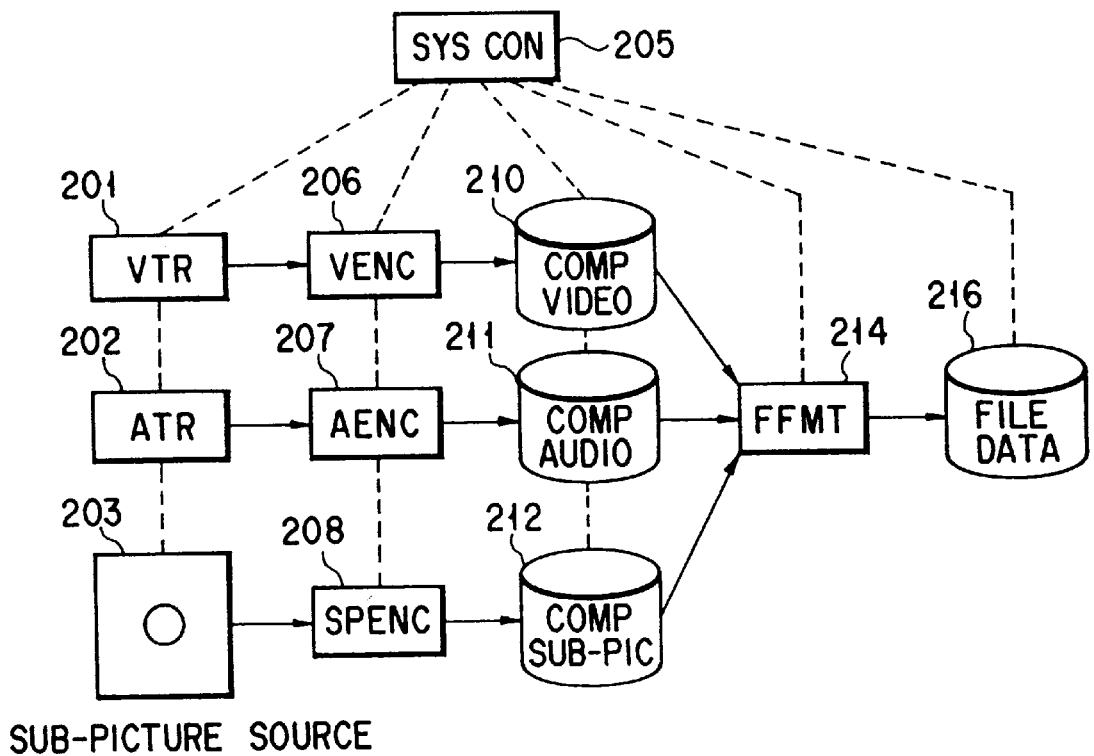
F I G. 66
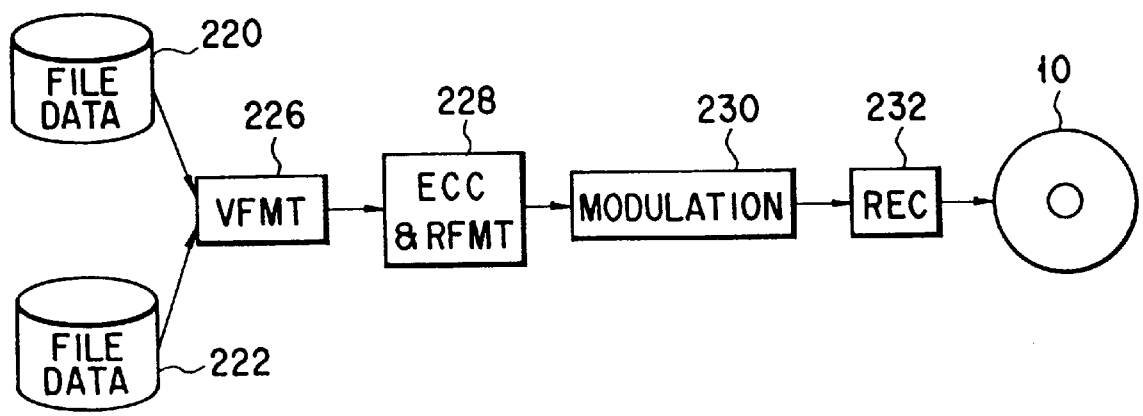
F I G. 69

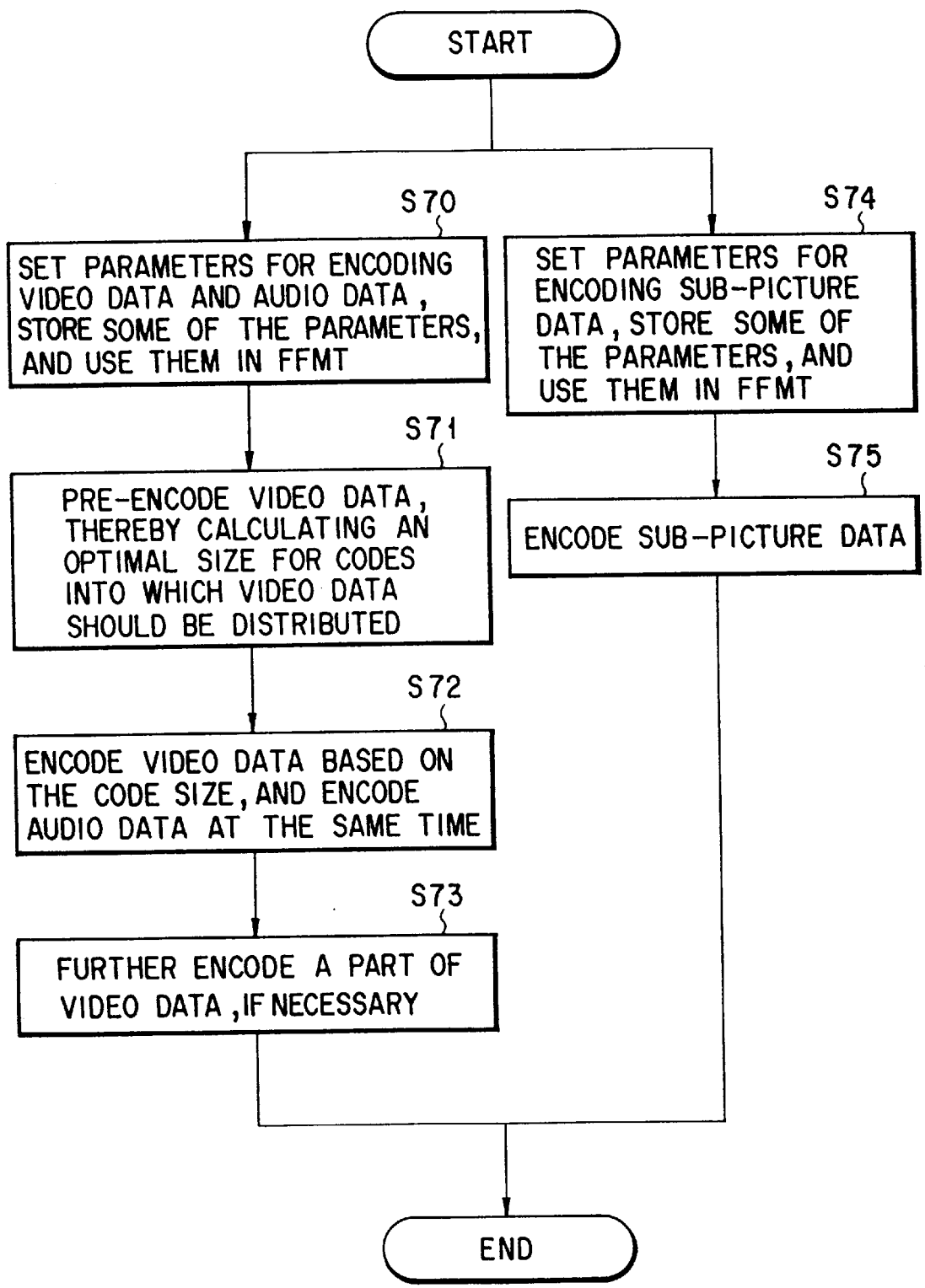
F I G. 67

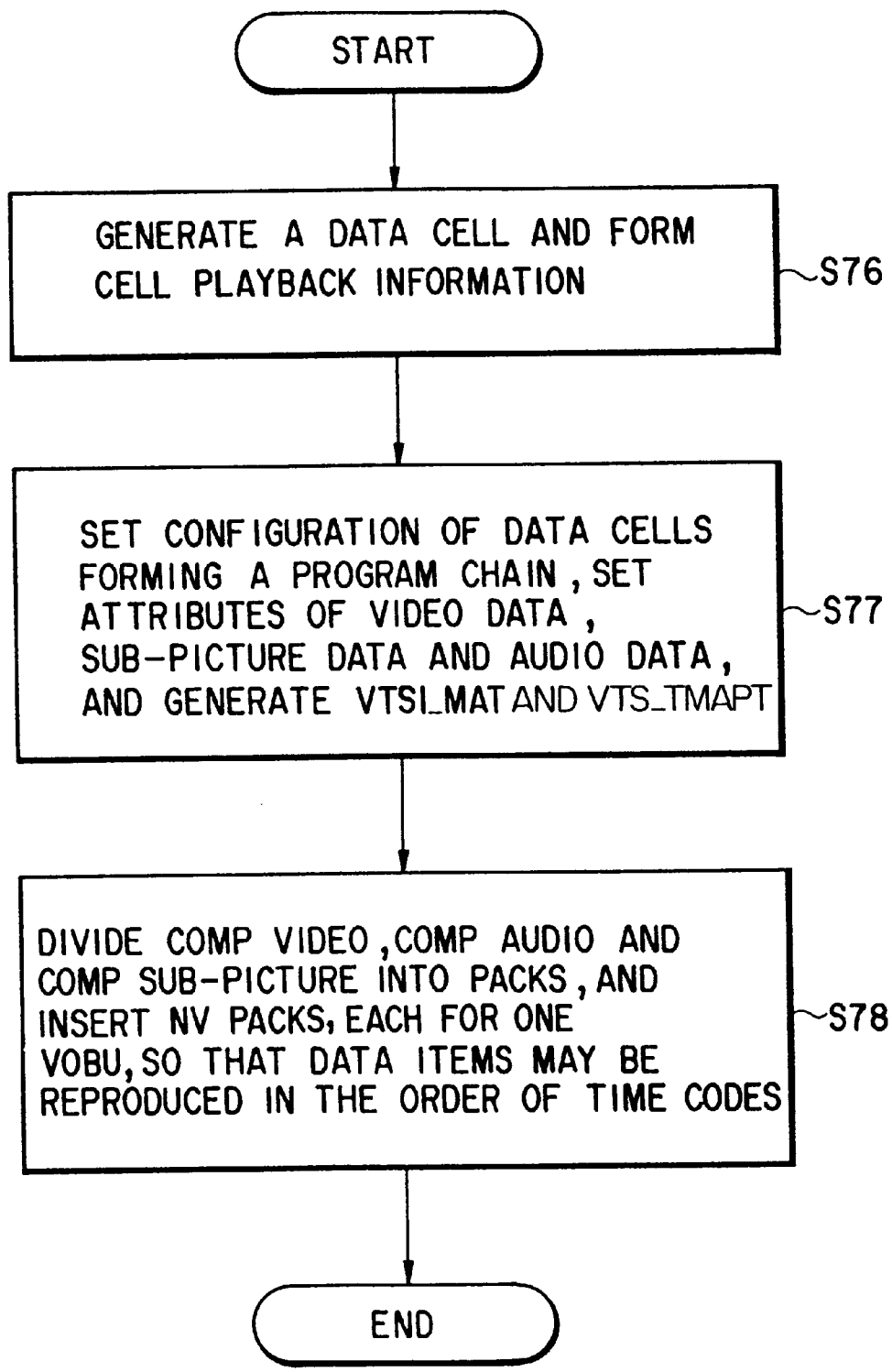
F I G. 68

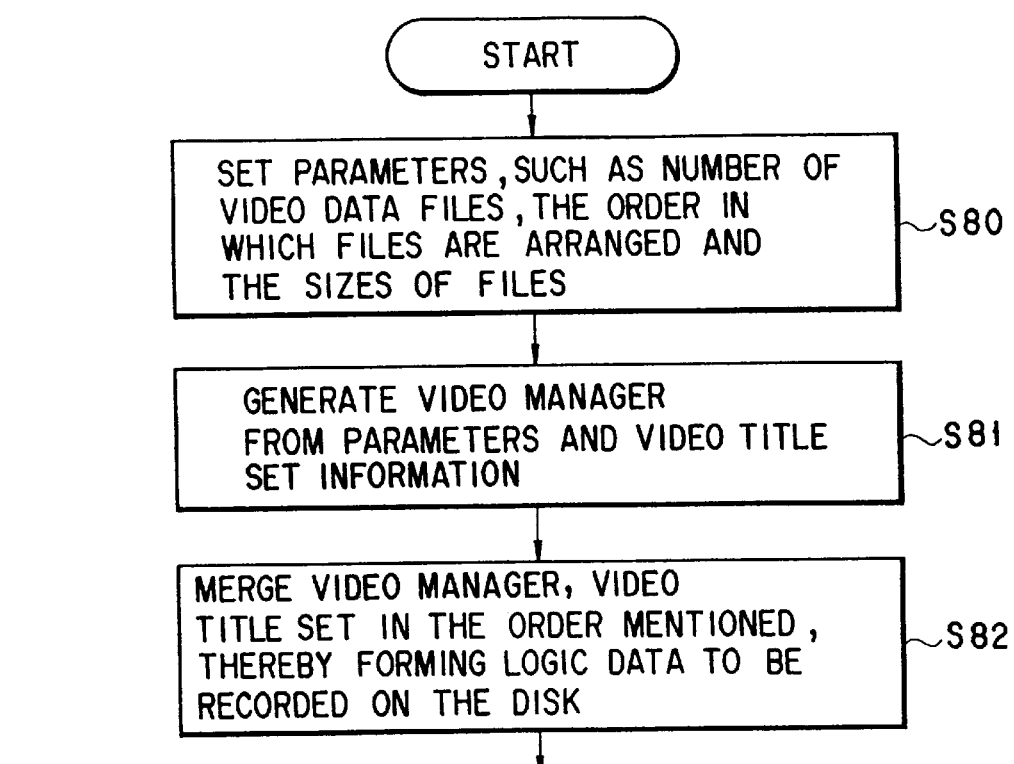
F I G. 70
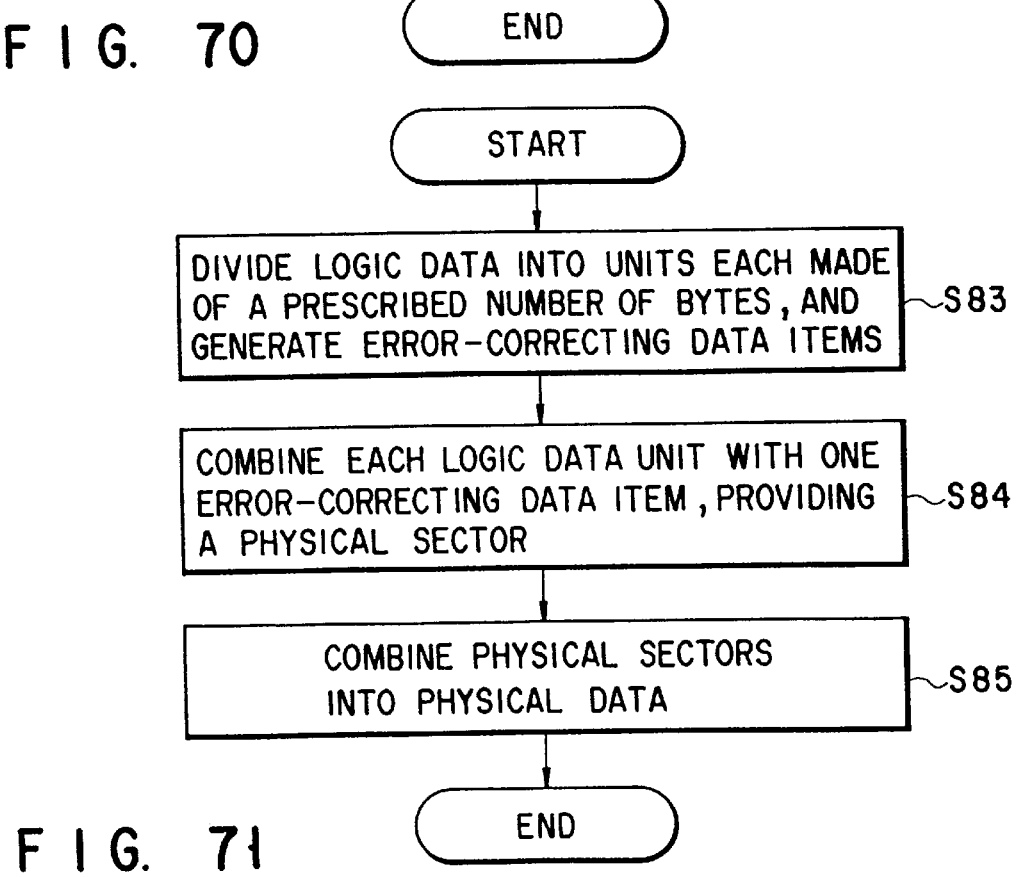
F I G. 71

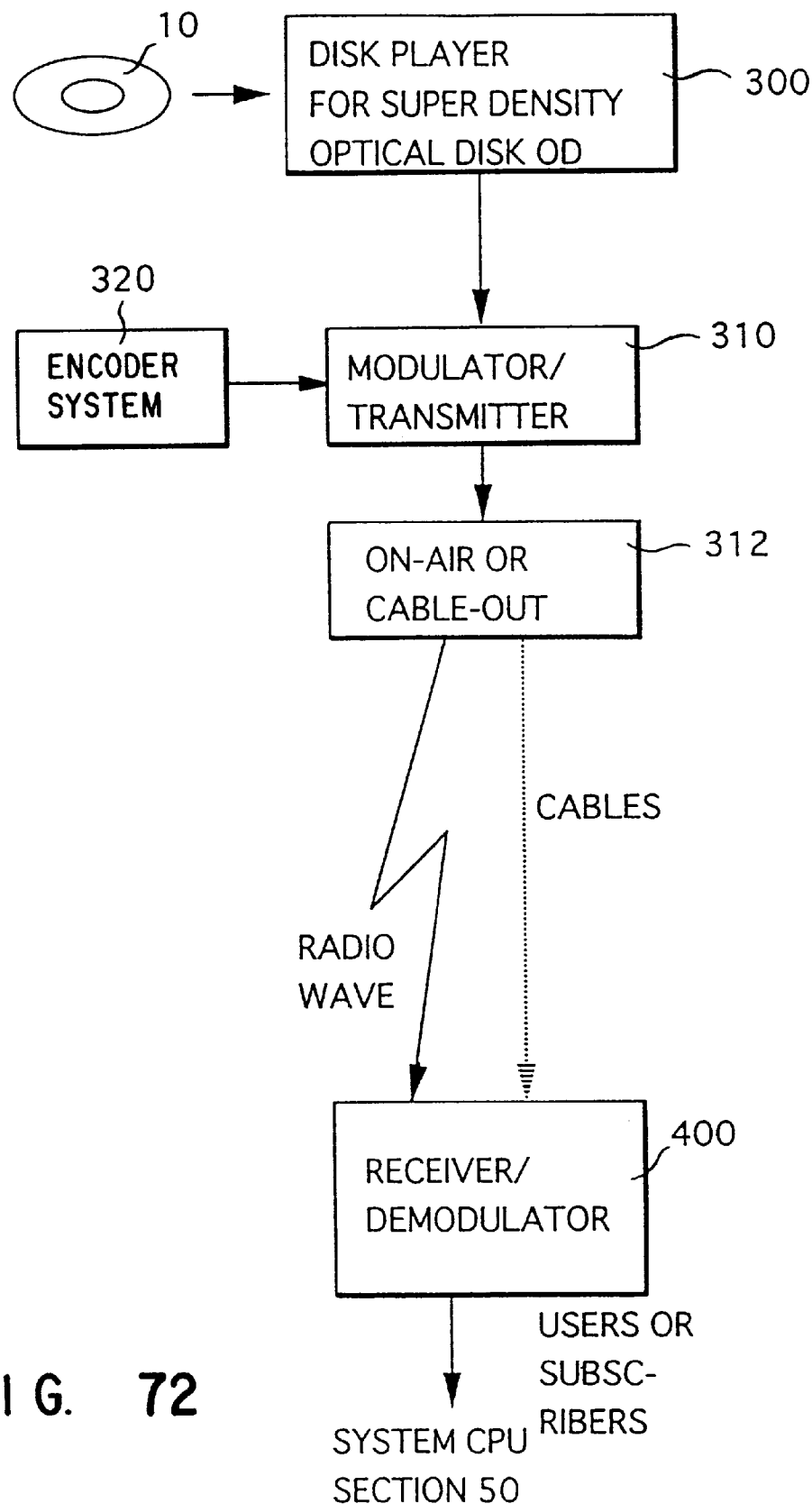
F I G. 72

RECORDING MEDIUM APPARATUS AND METHOD OF RECORDING AND REPRODUCING DATA WITH MANAGEMENT INFORMATION

This is a continuation of application Ser. No. 08/630,507, filed on Apr. 10, 1996, which was abandoned upon the filing thereof.

BACKGROUND OF THE INVENTION

1. Field of the Invention

The present invention relates to a recording medium like an optical disk where data of different purposes or kinds, such as compressed motion picture data and audio data, are to be recorded, an apparatus and method of recording data on this recording medium, and an apparatus and method of reproducing data from the recording medium.

2. Description of the Related Art

Recently, a great amount of attention has been being paid to a data recording/reproducing system which records, a plurality of movie data (pictures), audio streams, sub-picture channels and the like on a recording medium, such as an optical disk, and reproduces any movie data, audio stream and sub-picture channel which are arbitrarily selected from the recorded data by a user. A program chain is a set of virtually linked pictures and audio data as programs for each scene in a movie or the like. The presence of a plurality of program chains on a recording medium means that a single movie can have a plurality of story developments. Different speech can be associated with a single picture by recording a plurality of audio streams. Further, recording a plurality of sub-picture channels allows subtitles or the like of, for example, different languages to be displayed.

In reproducing a file with a complex structure which includes groups of data that are to be selectively reproduced in the same time slot on the same time axis, the presence of a plurality of program chains, audio streams, sub-picture channels, etc. in the file should be previously presented to a user so that the user can select the desired information for each item.

Conventionally, however, nothing has yet been specified for the description of such file structure information.

Therefore, there is a demand for a system which can allow users to easily check or select the contents of data recorded on an optical disk.

SUMMARY OF THE INVENTION

Accordingly, it is a primary object of the present invention to provide a system capable of allowing users to easily check or select the contents of data recorded on a recording medium through menus.

It is another object of this invention to provide a system capable of easily preparing a table indicative of positions of menus recorded on a recording medium so as to facilitate the reproduction of the menus.

It is a further object of this invention to provide a system capable of preparing and displaying a menu screen from information recorded on a recording medium even if menus are not recorded on the recording medium.

According to this invention, there is provided a recording medium comprising:

a first area for recording data; and a second area where management information for managing the first area is recorded and at least one menu information to be used at a time of checking and selecting contents of various kinds of data recorded in the first area and corresponding to the contents is recorded, the second area having a recording area where the menu information is recorded and a management area where a recording position of menu information in the recording area is recorded for a content of each data corresponding to the menu information.

According to this invention, there is provided a recording medium comprising:

at least one first area for recording data; and a second area where management information for managing the first area is recorded and at least one menu information to be used at a time of checking and selecting contents of various kinds of data recorded in the first area and corresponding to the contents is recorded, the second area having a recording area where the menu information is recorded and a management area where a recording position of menu information in the recording area is recorded for a content of each data corresponding to the menu information.

According to this invention, there is provided a recording medium comprising:

at least one first area for recording data; and a second area where management information for managing the first area is recorded, the first area having a third area for recording data, a fourth area where at least one first menu information to be used at a time of checking and selecting contents of various kinds of data recorded in the first area and corresponding to the contents is recorded, and a fifth area where a recording position of the first menu information in the fourth area is recorded for a content of each data corresponding to the first menu information, the second area having a sixth area where second menu information corresponding to the management information is recorded and a seventh area where a recording position of the second menu information in the sixth area is recorded for a content of each data corresponding to the second menu information.

According to this invention, there is provided a recording apparatus for recording data on a recording medium having a first area for recording data and a second area for recording management information for managing the first area, comprising:

supply means for supplying the data and at least one menu information to be used at a time of checking and selecting contents of various kinds of data and corresponding to the contents;

encoding means for encoding the data and menu information supplied by the supply means;

first recording means for recording the data encoded by the encoding means in the first area; and second recording means for recording the menu information encoded by the encoding means in a recording area in the second area and recording a recording position of the menu information in the recording area in a management area for a content of each data corresponding to the menu information.

According to this invention, there is provided a recording apparatus for recording data on a recording medium having at least one first area for recording data and a second area for recording management information for managing the first area, comprising:

supply means for supplying the data and at least one menu information to be used at a time of checking and selecting contents of various kinds of data and corresponding to the contents;

encoding means for encoding the data and menu information supplied by the supply means;

first recording means for recording the data encoded by the encoding means in the first area; and second recording means for recording the menu information encoded by the encoding means in a recording area in the second area and recording a recording position of the menu information in the recording area in a management area for a content of each data corresponding to the menu information.

According to this invention, there is provided a recording apparatus for recording data on a recording medium having at least one first area for recording data and a second area for recording management information for managing the first area, comprising:

supply means for supplying the data and at least one first menu information to be used at a time of checking and selecting contents of various kinds of data corresponding to the contents, and second menu information corresponding to the management information;

encoding means for encoding the data and first and second menu information supplied by the supply means;

first recording means for recording the data encoded by the encoding means in a third area in the first area;

second recording means for recording the first menu information encoded by the encoding means in a fourth area in the first area and recording a recording position of the first menu information in a fifth area for a content of each data corresponding to the menu information; and third recording means for recording the second menu information encoded by the encoding means in a sixth area in the second area and recording a recording position of the second menu information in a seventh area for a content of each data corresponding to the menu information.

According to this invention, there is provided a reproducing apparatus for reproducing data from a recording medium having a first area for recording data, and a second area where management information for managing the first area is recorded and at least one menu information to be used at a time of checking and selecting contents of various kinds of data recorded in the first area and corresponding to the contents is recorded, the second area having a recording area where the menu information is recorded and a management area where a recording position of menu information in the recording area is recorded for a content of each data corresponding to the menu information, the reproducing apparatus comprising:

indicating means for indicating one of the plurality of menus;

first reading means for reading a recording position of the indicated menu information from the management area in accordance with an indication made by the indicating means;

second reading means for reading menu information from the recording area in accordance with the recording position of the menu information read by the first reading means; and conversion means for converting the menu information read by the second reading means to a reproduction output.

According to this invention, there is provided a reproducing apparatus for reproducing data from a recording medium having at least one first area for recording data, and a second area where management information for managing the first area is recorded and at least one menu information to be used at a time of checking and selecting contents of various kinds of data recorded in the first area and corresponding to the contents is recorded, the second area having a recording area where the menu information is recorded and a management area where a recording position of menu information in the recording area is recorded for a content of each data corresponding to the menu information, the reproducing apparatus comprising:

indicating means for indicating one of the plurality of menus;

first reading means for reading a recording position of the indicated menu information from the management area in accordance with an indication made by the indicating means;

second reading means for reading menu information from the recording area in accordance with the recording position of the menu information read by the first reading means; and conversion means for converting the menu information read by the second reading means to a reproduction output.

According to this invention, there is provided a reproducing apparatus for reproducing data from a recording medium having at least one first area for recording data, and a second area where management information for managing the first area is recorded, the first area having a third area for recording data, a fourth area where at least one first menu information to be used at a time of checking and selecting contents of various kinds of data recorded in the first area corresponding to the contents is recorded, and a fifth area where a recording position of the first menu information in the fourth area is recorded for a content of each data corresponding to the first menu information, the second area having a sixth area where second menu information corresponding to the management information is recorded and a seventh area where a recording position of the second menu information in the sixth area is recorded for a content of each data corresponding to the second menu information, the reproducing apparatus comprising:

indicating means for indicating one of the plurality of menus;

first reading means for reading a recording position of the first menu information from the fifth area or reading a recording position of the second menu information from the seventh area in accordance with an indication made by the indicating means;

second reading means for reading the first or second menu information from the fourth area or the sixth area in accordance with the recording position of the first or second menu information read by the first reading means; and conversion means for converting the first or second menu information read by the second reading means to a reproduction output.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 1 is a schematic block diagram of an optical disk apparatus according to an embodiment of the present invention;

FIG. 4 is a schematic diagram of a key/display section in FIG. 1;

FIG. 5 is a schematic diagram of a remote controller in FIG. 1;

FIG. 7 shows the structure of the video manager of FIG. 6;

FIG. 9 is a diagram to help explain the structure of the video object unit of FIG. 8;

FIG. 10 shows the parameters and contents of the video manger information management table (VMGI_MAT) in the video manager information (VMGI) of FIG. 7;

FIG. 21 shows the parameters and contents of the video title set information management table (VTSI_MAT) of the video title set information (VTSI) of FIG. 20;

FIG. 22 illustrates the contents of the attribute (VTS_AST_ATR) of an audio stream of a video title set (VTS) in FIG. 20;

FIG. 23 illustrates the contents of the sub-picture stream attribute (VTS_SPST_ATR) of the video title set (VTS) in FIG. 20;

FIG. 28 shows the parameters and contents of the program chain general information (PGC_GI) in the program chain information (VTS_PGCI) of FIG. 27;

FIG. 29 shows the structure of a category (PGC_CAT) of a program chain (PGC) of general information (PGC_GI) of the program chain in FIG. 28;

FIG. 30 shows the structure of the contents (PGC_CNT) of the general information (PGC_GI) of the program chain in FIG. 28;

FIG. 31 illustrates the structure of a program chain map (PGC_PGMAP) of the program chain information (VTS_PGCI) of FIG. 27;

FIG. 32 shows the parameters and contents of the entry cell numbers (ECELLN) corresponding to the programs written in the program chain map (PGC_PGMAP) of FIG. 31;

FIG. 33 illustrates the structure of the cell playback information table (C_PBIT) of the program chain information (VTS_PGCI) of FIG. 27;

FIG. 34 shows the parameters and contents of the cell playback information (C_PBI) of FIG. 33;

FIG. 35 illustrates the structure of the cell position information (C_POSI) in the program chain information (VTS_PGCI) of FIG. 27;

FIG. 36 shows the parameters and contents of the cell position information (C_POSI) of FIG. 35;

FIG. 45 shows the parameters and contents of the playback control information (PCI) in the navigation pack of FIG. 43;

FIG. 46 shows the parameters and contents of the general information (PCI_GI) in the playback control information (PCI) of FIG. 45;

FIG. 47 shows the parameters and contents of the angle information (NSML_AGLI) in the playback control information (PCI) of FIG. 45;

FIG. 49 shows the parameters and contents of the disk search information (DSI) in the navigation pack of FIG. 43;

FIG. 50 shows the parameters and contents of the DSI general information (DSI_GI) in the disk search information of FIG. 49;

FIG. 51 shows the parameters and contents of the angle information (SML_AGLI) in the disk search information of FIG. 49;

FIG. 52 is a diagram to help explain how to change the angle using the angle information (SML_AGLI) in the disk search information (DSI) of FIG. 51;

FIG. 53 shows the parameters and contents of the search information (VOBU_SRI) for the video object unit (VOBU) of FIG. 49;

FIG. 54 illustrates bit maps describing the forward address of the search information unit (VOBU_SRI) on the video object unit (VOBU) of FIG. 49;

FIG. 55 illustrates bit maps describing the backward address of the search information unit (VOBU_SRI) on the video object unit (VOBU) of FIG. 49;

FIG. 56 shows the parameters and contents of the synchronizing playback information (SYNCI) on the video object unit (VOBU) of FIG. 49;

FIG. 57A and 57B present flowcharts for detecting the total number of titles on an optical disk, the number of chapters (programs) for each title, the number and languages of audio streams for each title, and the number and languages of sub-picture streams for each title;

FIG. 58 is a diagram exemplifying what is stored in a memory table;

FIG. 59 is a diagram showing an example of the reproduced image of a main menu;

FIGS. 60A through 60E show examples of the reproduced images of a title menu, a chapter menu, an audio menu, a sub-picture menu and an angle menu;

FIGS. 62, 63 and 64 are flowcharts of the procedure for reproducing the video data in the normal mode from an optical disk having logic formats shown in FIGS. 6 to 56;

FIG. 66 is a block diagram of an encoder system that encodes the video data and generates a video file;

FIG. 67 is a flowchart for an encoding process of FIG. 66;

FIG. 68 is a flowchart for combining the main video data, audio data, and sub-picture data all encoded according to the flow of FIG. 67 to create a video data file;

FIG. 69 is a block diagram of a disk formatter system that records the formatted video files on an optical disk;

FIG. 70 is a flowchart for creating logic data to be recorded on a disk in the disk formatter of FIG. 69;

FIG. 71 is a flowchart for creating from the logic data the physical data to be recorded on a disk; and FIG. 72 is a schematic diagram of a system that transfers the video title set of FIG. 6 via a communication route.

DETAILED DESCRIPTION OF THE PREFERRED EMBODIMENTS

Hereinafter, referring to the accompanying drawings, an optical disk reproducing apparatus according to an embodiment of the present invention will be explained.

Figure 2:
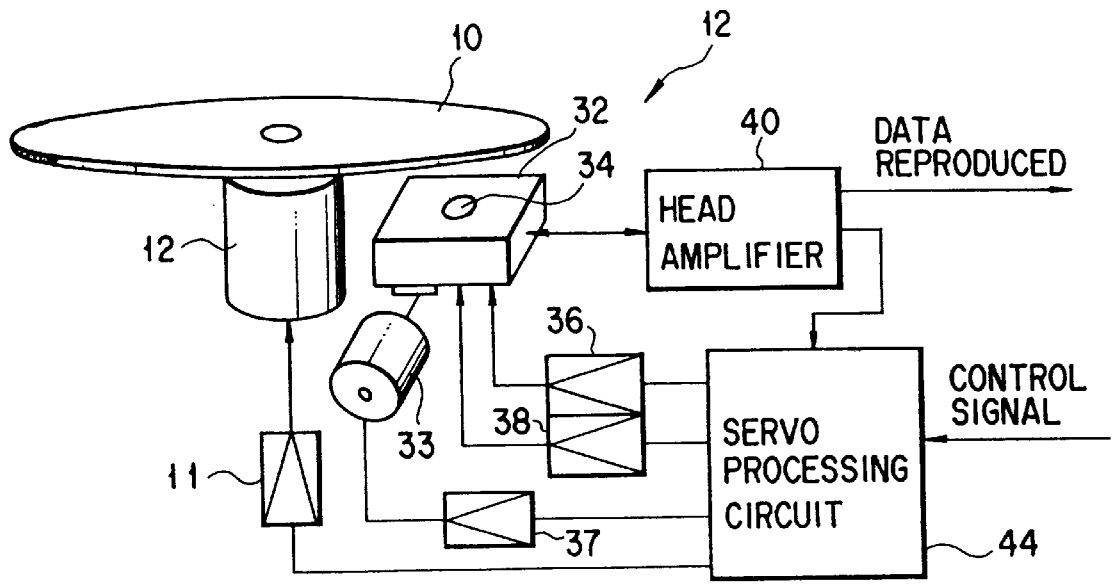
FIG. 2 is a detailed block diagram of the mechanical section of the disk drive unit of FIG. 1.
Figure 3:
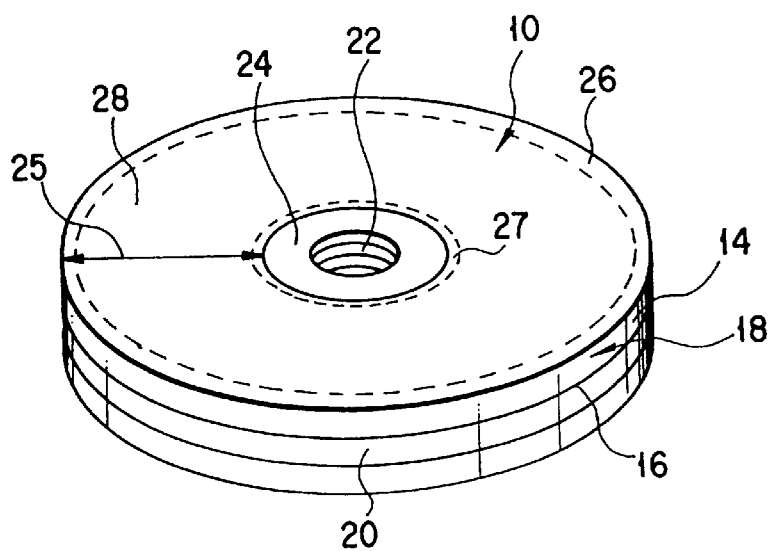
FIG. 3 is a schematic perspective view of the structure of an optical disk loaded in the disk drive unit of FIG. 1.

FIG. 1 is a block diagram of an optical disk reproducing apparatus that reproduces the data from an optical disk associated with an embodiment of the present invention. FIG. 2 is a block diagram of the disk drive section that drives the optical disk shown in FIG. 1. FIG. 3 shows the structure of the optical disk shown in FIGS. 1 and 2.

As shown in FIG. 1, the optical disk reproducing apparatus comprises a key/display section 4, a monitor section 6, and a speaker section 8. When the user operates the key/display section 4, this causes the recorded data to be reproduced from an optical disk 10. The recorded data contains video data, sub-picture data, and audio data, which are converted into video signals and audio signals. The monitor section 6 displays images according to the audio signals and the speaker section 8 generates sound according to the audio signals.

It is known that the optical disk 10 is available with various structures. For instance, one type of optical disk 10 is a read-only disk on which data is recorded with a high density as shown in FIG. 3. The optical disk 10, as shown in FIG. 3, is made up of a pair of composite layers 18 and an adhesive layer 20 sandwiched between the composite disk layers 18. Each of the composite disk layers 18 is composed of a transparent substrate 14 and a recording layer or a light-reflecting layer 16. The composite layer 18 is arranged so that the light-reflecting layer 16 may be in contact with the surface of the adhesive layer 20. A center hole 22 is made in the optical disk 10. On the periphery of the center hole 22 on both sides, clamping areas 24 are provided which are used to clamp the optical disk 10 during its rotation. When the disk 10 is loaded in the optical disk apparatus, the spindle of a spindle motor 12 shown in FIG. 2 is inserted into the center hole 22. As long as the disk is being rotated, it continues to be clamped at the clamping areas 24.

As shown in FIG. 3, the optical disk 10 has an information zone 25 around the clamping zone 24 on each side, the information zones allowing the information to be recorded on the optical disk 10. In each information area 25, its outer circumference area is determined to be a lead-out area 26 in which no information is normally recorded, its inner circumference area adjoining the clamping area 24 is determined to be a lead-in area 27 in which no information is normally recorded, and the area between the lead-out area 26 and the lead-in area 27 is determined to be a data recording area 28.

At the recording layer 16 in the information area 25, a continuous spiral track is normally formed as an area in which data is to be recorded. The continuous track is divided into a plurality of physical sectors, which are assigned serial numbers. On the basis of the sectors, data is recorded. The data recording area 28 in the information recording area 25 is an actual data recording area, in which management data, main video data, sub-picture data, and audio data are recorded in the form of pits (that is, in the form of changes in the physical state) as explained later. With the read-only optical disk 10, a train of pits is previously formed in the transparent substrate 14 by a stamper, a reflecting layer is formed by evaporation on the surface of the transparent substrate 14 in which the pit train is formed, and the reflecting layer serves as the recording layer 16. In the read-only optical disk 10, a groove is normally not provided as a track and the pit train in the surface of the transparent substrate 14 serves as a track.

The optical disk apparatus, as shown in FIG. 1, further comprises a disk drive section 30, a system CPU section 50, a system ROM/RAM section 52, a system processor section 54, a data RAM section 56, a video decoder 58, an audio decoder section 60, a sub-picture decoder section 62, and a D/A and data reproducing section 64, and the menu generator 66. The system processor section 54 is provided with a system time clock (STC) 54A and a register 54B. The video decoder section 58, audio decoder section 60, and sub-picture decoder section 62 are also provided with system time clocks (STC) 58A, 60A, 62A, respectively.

As shown in FIG. 2, the disk drive section 30 contains a motor driving circuit 11, a spindle motor 12, an optical head 32 (i.e., an optical pickup), a feed motor 33, a focus circuit 36, a feed motor driving circuit 37, a tracking circuit 38, a head amplifier 40, and a servo processing circuit 44. The optical disk 10 is placed on the spindle motor 12 driven by the motor driving circuit 11 and is rotated by the spindle motor 12. The optical head 32 that projects a laser beam on the optical disk 10 is located under the optical disk 10. The optical head 32 is placed on a guide mechanism (not shown). The feed motor driving circuit 37 is provided to supply a driving signal to the feed motor 33. The feed motor 33 is driven by the driving signal and moves the optical head 32 in and out across the radius of the optical disk 10. The optical head 32 is provided with an object lens 34 positioned so as to face the optical disk 10. The object lens 34 is moved according to the driving signal supplied from the focus circuit 36 so as to move along its optical axis.

To reproduce the data from the above optical disk, the optical head 32 projects a laser beam on the optical disk 10 via the object lens 34. The object lens 34 is moved little by little across the radius of the optical disk 10 according to the driving signal supplied from the tracking circuit 38. Furthermore, the object lens 34 is moved along its optical axis according to the driving signal supplied from the focusing circuit 36 so that its focal point may be positioned on the recording layer 16 of the optical disk 10. This causes the laser beam to form the smallest beam spot on the spiral track (i.e., the pit train), enabling the beam spot to trace the track. The laser beam is reflected from the recording layer 16 and returned to the optical head 32. The optical head 32 converts the beam reflected from the optical disk 10 into an electric signal, which is supplied from the optical head 32 to the servo processing circuit 44 via the head amplifier 40. From the electric signal, the servo processing circuit 44 produces a focus signal, a tracking signal, and a motor control signal and supplies these signals to the focus circuit 36, tracking circuit 38, and motor driving circuit 11, respectively.

Therefore, the object lens 34 is moved along its optical axis and across the radius of the optical disk 10, its focal point is positioned on the recording layer 16 of the optical disk 10, and the laser beam forms the smallest beam spot on the spiral track. Furthermore, the spindle motor 12 is rotated by the motor driving circuit 11 at a specific rotating speed. This allows the beam to track at, for example, a constant linear speed.

The system CPU section 50 of FIG. 1 supplies to the servo processing circuit 44 a control signal serving as an access signal. In response to the control signal, the servo processing circuit 44 supplies a head-moving signal to the feed motor driving circuit 37, which supplies a driving signal to the feed motor 33. Then, the feed motor 33 is driven, causing the optical head 32 to move across the radius of the optical disk 10. Then, the optical head 32 accesses a specific sector formed at the recording layer 16 of the optical disk 10. The data is reproduced from the specific sector by the optical head 32, which then supplies it to the head amplifier 40. The head amplifier 40 amplifies the reproduced data, which is outputted at the disk drive section 30.

The reproduced data is transferred and stored in a data RAM section 56 by the system processor section 54 which is controlled by the system CPU section 50 which is operated in accordance with the programs stored in the system ROM/RAM section 52. The stored reproduced data is processed at the system processor section 54, which sorts the data into video data, audio data, and sub-picture data, which are supplied to the video decoder section 58, audio decoder section 60, and sub-picture decoder section 62, respectively, and are decoded at the respective decoders. The D/A and data-reproducing section 64 converts the decoded video data, audio data, and sub-picture data into an analog video signal, an analog audio signal, and an analog sub-picture signals, subjects these signal to a mixing process, and supplies the resulting video signal and sub-picture signal to the monitor 6 and the resulting audio signal to the speaker 8. Then, on the basis of the video signal and sub-picture signal, an image is displayed on the monitor section 6 and according to the audio signal, sound is simultaneously reproduced at the speaker section 8.

This optical disk apparatus further comprises a menu generator 66 for generating menu screens and the like. The menu generator 66 is comprised of a character generator which is controlled by the system CPU section 50. The menu generator 66 prepares a menu screen or the like by causing the character generator to produce a character pattern associated with a character code for screen selection from the system CPU section 50, and supplies the menu screen or the like to the D/A and data reproducing section 64. The D/A and data reproducing section 64 converts the supplied menu screen, prepared by the character pattern, to a video signal as an associated analog signal, and sends the video signal to the monitor section 6. As a result, the monitor section 6 displays the image of the selected screen like the selected menu screen or the like.

In the optical disk reproducing apparatus shown in FIG. 1, as a user manipulates the key/display section 4 on the front panel of the main body or manipulates the remote controller 5 as a remote terminal connected to the remote control receive section 4A via optical communications using infrared rays, recorded data, i.e., video data, sub-picture data and audio data, is reproduced from the optical disk 10 and is converted to an audio signal and video signal in the apparatus. The video signal is reproduced as a video image on the external monitor section 6 and the audio signal is reproduced as a voice from the speaker section 8.

As shown in FIG. 4, the key/display section 4 comprises a power key 4a, microphone input terminals 4b, a playback key 4c, a pause key 4d, a stop key 4e, fast forward and rewind keys 4f, an open/close key 4g for instructing the loading or ejecting of the optical disk 10, indicators 4h, and a load/eject slot 4i for the optical disk 10.

As shown in FIG. 5, the remote controller 5 comprises a power key 5a, numeral keys 5b, a stop key 5c, a playback key 5d, a pause key 5e, a memory key 5f, an open/close key 5g for instructing the loading or ejecting of the optical disk 10, fast forward and rewind keys 5h and 5i, repeat keys 5j for instructing repeating and the repeat range, a menu key 5k for instructing the display of a menu screen, a title key 5l for instructing the display of a title menu screen, and up and down and right and left cursor keys 5m which are used to select an item on the displayed menu screen.

The detailed operation of the optical disk apparatus of FIG. 1 will be described later with reference to the logic format of the optical disk explained below.

Figure 6:
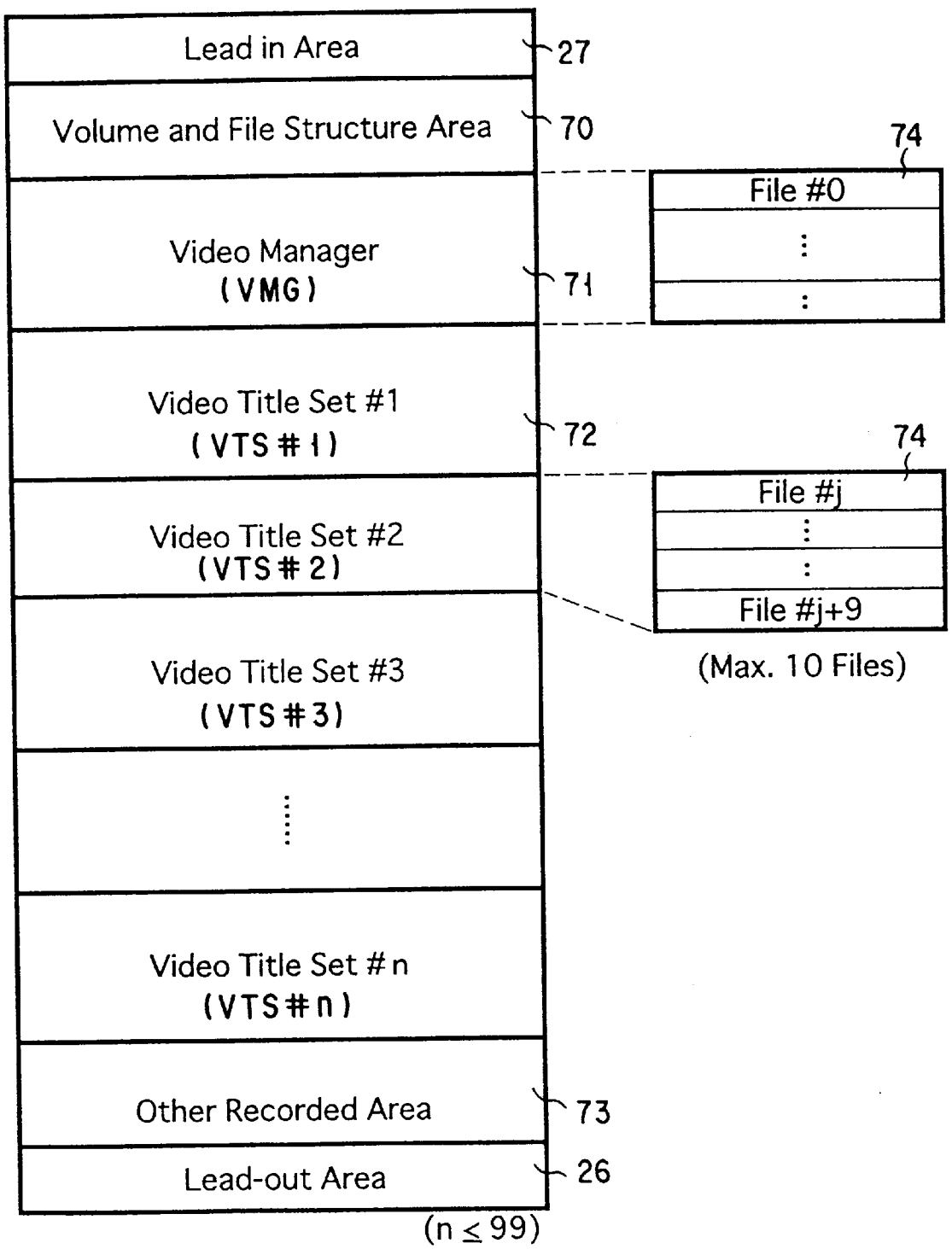
FIG. 6 shows the structure of the logic format of the optical disk of FIG. 3.

The data recording area 28 between the lead-in area 27 and the lead-out area 26 on the optical disk of FIG. 1 has a volume and file structure as shown in FIG. 6. The structure has been determined in conformity to specific logic format standards, such as Micro UDF or ISO 9660. The data recording area 28 is physically divided into a plurality of sectors as described earlier. These physical sectors are assigned serial numbers. In the following explanation, a logical address means a logical sector number (LSN) as determined in Micro UDF or ISO 9660. Like a physical sector, a logical sector contains 2048 bytes. The numbers (LSN) of logical sectors are assigned consecutively in ascending order as the physical sector number increments.

As shown in FIG. 6, the volume and file structure is a hierarchic structure and contains a volume and file structure area 70, a video manager 71, at least one video title set #i 72, and another recorded area 73. These areas 70, 71, 72, 73 are aligned with the boundaries between logical sectors. As with a conventional CD, a logical sector is defined as a set of 2048 bytes. Accordingly, one logical sector corresponds to one logical block.

The volume and file structure area 70 corresponds to a management area determined in Micro UDF or ISO 9660. According to the description in the management area, the video manager 71 is stored in the system ROM/RAM section 52. As explained with reference to FIG. 7, the information used to manage video title sets 72 is written in the video manager 71, which is composed of a plurality of files, starting with file #0. In each video title set 72, compressed video data, compressed audio data, compressed sub-picture data, and the reproducing information about these data items are stored as explained later. Each video title set is composed of a plurality of files 74. The number of video title sets 72 is limited to a maximum of 99. Furthermore, the number of files 74 (from file #j to file #j+9) constituting each video title set 72 is determined to be a maximum of 10. These files 72 are also aligned with the boundaries between logical sectors.

In the other recorded area 73, the information capable of utilizing the aforementioned video title sets 72 is recorded. The other recorded areas 73 are not necessarily provided.

As shown in FIG. 7, the video manager 71 contains at least three items each corresponding to individual files 74. Specifically, the video manager 71 is made up of video manager information (VMGI) 75, a video object set for video manager menu (VMGM_VOBS) 76, and backup of video manager information (VMGI_BUP) 77. Here, the video manager information (VMGI) 75 and the backup of video manager information (VMGI_BUP) 77 are determined to be indispensable items, and the video object set for video manager menu (VMGM_VOBS) 76 is determined to be an optional item. In the video object set 76 for VMGM, the video data, audio data, and sub-picture data about a menu of the volumes of the optical disk managed by the video manager 71 are stored.

By the video object set 76 for VMGM (VMGM_VOBS), the volume name of the optical disk 10, the sound accompanying the volume name representation, and the description of the sub-picture are displayed and at the same time, selectable items are provided in the form of sub-pictures as in a video reproduction explained later. For example, the video object set 76 for VMGM (VMGM_VOBS) indicates that the optical disk 10 contains the video data representing the matches a boxer played until he won a world championship. Specifically, a fighting pose of boxer X, together with a volume name, such as the glorious history of boxer X, is reproduced in the form of video data and at the same time, his theme song is reproduced in sound, and his chronological table is provided in a sub-picture. Furthermore, the user is asked which language option to select, English or Japanese, for a narration of the matches. At the same time, the user is asked whether a caption in another language should be provided in a sub-picture or which language option should be selected for a caption. Thus, for example, the VMGM video object set 76 (VMGM_VOBS) provides the user with preparations to watch a video of a match of boxer X in English speech with a sub-picture using Japanese captions.

Figure 8:
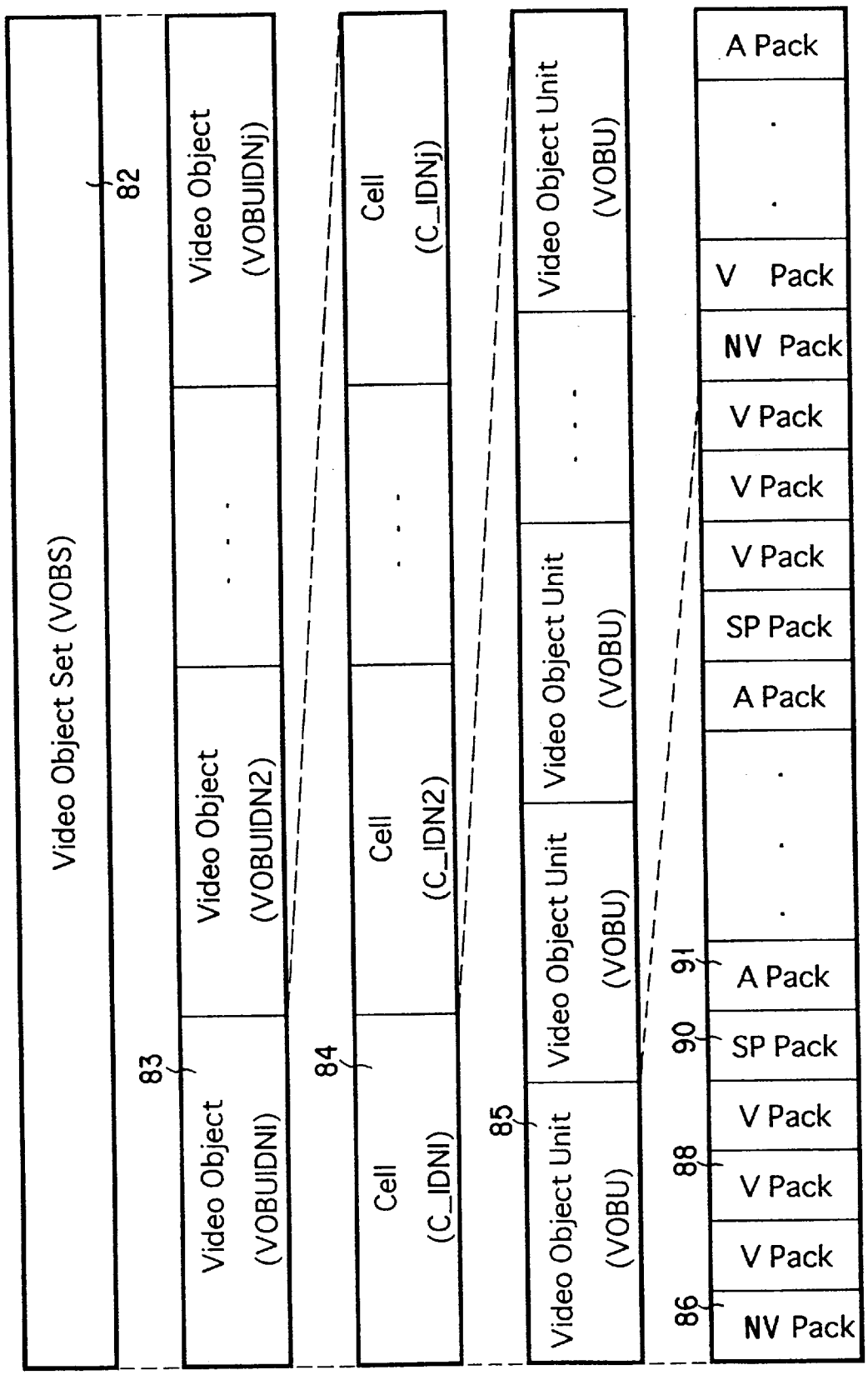
FIG. 8 shows an example of the structure of the video object set (VOBS) shown in FIG. 7.

Here, the structure of a video object set (VOBS) 82 will be described with reference to FIG. 8. FIG. 8 shows an example of a video object set (VOBS) 82. The video object set (VOBS) 82 comes in three types for two menus and a title. Specifically, the video object set (VOBS) 82 contains the video title set for video manager menu (VMGM_VOBS) 76, a video object set (VTSM_VOBS) 95 for a menu in the video title sets 72 and a video object set (VTSTT_VOBS) 82 for the titles of at least one video title set 72 in a video title set (VTS) 72 as explained later. Each video object set 82 has the same structure except that their uses differ.

As shown in FIG. 8, a video object set (VOBS) 82 is defined as a set of one or more video objects (VOB) 83. The video objects 83 in a video object set (VOBS) 82 is used for the same application. A video object set (VOBS) 82 for menus is usually made up of one video object (VOB) 83 and stores the data used to display a plurality of menu screens. In contrast, a video object set (VTSTT_VOBS) 82 for title sets is usually composed of a plurality of video objects (VOB) 83.

When the aforesaid video of a boxing match is taken as an example, a video object (VOB) 83 corresponds to the video data of each match played by boxer X. Specifying a particular video object (VOB) 83 enables, for example, boxer X's eleventh match for a world championship to be reproduced on a video. The video object set (VTSM_VOBS) 95 for a menu of the video title sets 72 contains the menu data for the matches played by boxer X. According to the presentation of the menu, a particular match, for example, boxer X's eleventh match for a world championship, can be specified. In the case of a usual single story movie, one video object (VOB) 83 corresponds to one video object set (VOBS) 82. One video stream is completed with one video object set (VOBS) 82. In the case of a collection of animated cartoons or an omnibus movie, a plurality of video streams each corresponding to individual stories are provided in a single video object set (VOBS) 82. Each video stream is stored in the corresponding video object 83. Accordingly, the audio stream and sub-picture stream related to the video stream are also completed with each video object (VOB) 83.

An identification number (IDN#j) is assigned to a video object (VOB) 83. By the identification number (ID#j), the video object (VOB) 83 can be identified. A video object (VOB) 83 further comprises one or more cells 84. Although a usual video stream is made up of a plurality of cells 84, a menu video stream, or a video object (VOB) 83 may be composed of one cell 84. A cell 84 is likewise assigned an identification number (C_IDN#j). By the identification number (C_IDN#j), the cell 84 is identified. At the time of the change of the angle explained later, the angle is changed by specifying the cell number.

Here, angle means to change an angle at which an object is viewed in the field of the films. In an example of a boxing match, angle means that the same knockout scene can be seen from different angles: e.g., a scene viewed from the champion, a scene viewed from the challenger, or a scene viewed from the judge. An angle may be selected by the user as he or she wishes, or the same scene may be repeated while the angle is being changed automatically as the story advances. Furthermore, the angle may be changed after the beginning of the same scene has been reached: e.g., the scene is changed the moment that the boxer dealt the opponent a counter and then a scene where the counter is dealt again is played. The angle may also be changed at the scene following the current scene: e.g., the angle is changed the moment that the boxer has dealt the opponent a counter. To achieve any angle change, a navigation pack explained in detail later is provided in a video object unit (VOBU) 85.

As shown in FIG. 8, each cell 84 is composed of one or more video object units (VOBU) 85, normally a plurality of video object units (VOBU) 85. Here, a video object unit (VOBU) 85 is defined as a pack train having a navigation pack (NV pack) 86 at its head. Specifically, a video object unit (VOBU) 85 is defined as a set of all the packs recorded, starting at a navigation pack (NV pack) 86 to immediately in front of the next navigation pack. The reproducing time of the video object unit (VOBU) 85 corresponds to the reproducing time of the video data made up of one or more GOP (Group of Pictures) contained in the video object unit (VOBU) 85 as shown in FIG. 9. The maximum reproducing time is determined to be 0.4 or more second and less than one second. In MPEG, one GOP is defined as compressed image data which corresponds to about 15 frames to be played back for, usually, 0.5 seconds.

In the case where the video data includes a video object unit as illustrated in FIG. 8, GOPs each composed of a video pack (V pack) 88, a sub-picture pack (SP pack) 90 and an audio pack (A pack) 91, all complying to the MPEG standards, are arranged, producing a video data stream. Regardless of the number of GOPs, a video object (VOBU) 83 is determined based on the time required for producing a GOP. The video object (VOBU) 83 has a navigation pack (NV) pack 86 arranged at its head. Any reproduced data, whether audio data, sub-picture data, or audio/sub-picture data, consists of one more video object units. Thus, even if a video object unit is composed of only audio packs only, these audio packs will be reproduced within the time for reproducing the video object unit. The procedure of reproducing these packs will be explained later in detail, along with the procedure of reproducing the navigation pack (NV pack) 86.

The procedure for reproducing these packs, together with the navigation pack, will be explained in detail later.

The video manager 71 will be explained with reference to FIG. 7. The video management information 75 placed at the head of the video manager 71 contains the information used to search for titles and the information used to manage the video title sets (VTS) 72 such as the information used for reproduction of a video manager menu. The volume management information 75 contains at least four tables 78, 79, 80, 81 in the order shown in FIG. 7. Each of these tables 78, 79, 80, 81 is aligned with the boundaries between logical sectors. A first table 78, a video manager information management table (VMGI_MAT) 78 is a mandatory table, in which the size of the video manager 71, the starting address of each piece of the information in the video manger 71, and the attribute information about the video object set (VMGM_VOBS) 76 for a video manager menu are written.

Written in a second table of the video manager 71, a title search pointer table 79 (TT_SRPT), is an entry program chain (EPGC) of the video titles (VTS) 72 contained in the optical disk 10 that are selectable according to the entry of a title number from the key/display section 4 on the apparatus or the selection of a title number via the remote controller 5.

Here, a program chain 87 is a set of programs 89 that reproduce the story of a title as shown in FIG. 9. Continuous reproduction of a program chain 87 completes the movie of a title. Therefore, the user can start to see the movie from a particular scene of the movie by specifying the program 89.

In a third table of the video manager 71, a video title set attribution table (VTS_ATRT) 80, the attribute information determined in the video title set 72 in the volume of the optical disk 10 is written. Specifically, in this table 80, the following items are written as attribute information: the number of video title sets, video title set numbers, video attributes, such as a video data compression scheme, audio stream attributes, such as an audio coding mode, and sub-picture attributes, such as the type of sub-picture display.

Described in a video manager menu PGCI unit table (VMGM_PGCI_UT) 81, the fourth table of the video manager 71, is information about the video object set (VMGM_VOBS) 76 for the video manager menu.

The video manager menu PGCI unit table (VMGM_PGCI_UT) 81 is essential when the video manager menu (VMGM) is present in the video object set (VMGM_VOBS) 76 for the video manager menu.

The contents of the video manager information management table (VMGI_MAT) 78 and the title search pointer table (TT_SRPT) 79 will be explained in detail with reference to FIGS. 10, 11, 12, and 13.

As shown in FIG. 10, written in the video manager information management table (VMGI_MAT) 78 are a video manager identifier (VMG_ID), the size of video manager information (VMGI_SZ) in logical blocks (one logical block contains 2048 bytes as mentioned above), the version number (VERN) of the optical disk 10 complying with the digital versatile disk video specification, and the category of video manager 71 (VMG_CAT).

In the category of video manager 71 (VMG_CAT), a flag indicating whether or not the DVD video directory prohibits copying is written. Further written in the table (VMGI_MAT) are a volume set identifier (VLMS_ID), the number of video title sets (VTS_Ns), the identifier for a person supplying the data to be recorded on the disk (Provider Unique ID: PVR_ID), a video manager menu video object set start address (VMCM_VOBS_SA), the end address (VMGI_MAT_EA) of a volume manager information management table (VMGI_MAT) 78, and the start address (TT_SRPT_SA) of a title search pointer table (TT_SRPT) 79. The start address (VMGM_PGCI_UT_SA) of the video manager menu PGCI unit table (VMGM_PGCI_UT) 81 is described in this table 78. When there is no video manager menu PGCI unit table (VMGM_PGCI_UT) 81, "0000000h" is described at the start address. The end address of VMG_MAT 78 (VMGI_MAT_EA) and the start address of TT_SRPT (TT_SRPT_SA) 79 are represented by the number of logical blocks, relative to the first logical block.

Furthermore, in the table 78, the start address (VTS_ATRT_SA) of the attribute table (VTS_ATRT) 80 of video title sets (VTS) 72 is represented by the number of bytes, relative to the first byte in the VMGI manager table (VMGI_MAT) 71, and the video attribute (VMGM_V_AST) of the video manager menu (VMGM) is written. Further written in the table 78 are the number of audio streams (VMGM_AST_Ns) in the video manager menu (VMGM), the attributes of audio streams (VMGM_AST_ATR) in the video manager menu (VMGM), the number of sub-picture streams (VMGM_SPST_Ns) in the video manager menu (VMGM), and the attributes of sub-picture streams (VMGM_SPST_ATR) in the video manager menu (VMGM).

Figures 11, 12, 13:
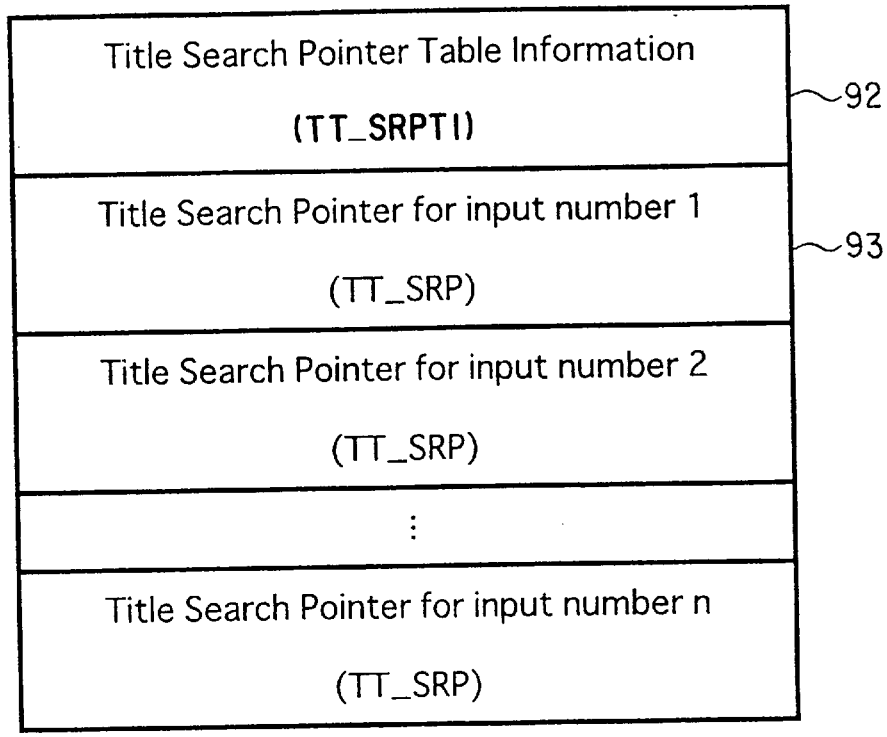
FIG. 11 shows the structure of the title search pointer table (TT_SRPT) in the video manager (VMGI) of FIG. 7.
FIG. 12 shows the parameters and contents of the title search pointer table information (TT_SRPTI) in the title search pointer table (TT_SRPT) of FIG. 11.
FIG. 13 shows the parameters and contents of the title search pointer (TT_SRP) corresponding to the input number in the title search pointer table (TT_SRPT) of FIG. 11.

In the title search pointer table (TT_SRPT) 79, as shown in FIG. 11, the title search pointer table information (TT-SRPTI) is first written and then as many title search pointers for input numbers 1 to n (n≦99) as are needed are written consecutively. When only the reproducing data for one title, for example, only the video data for one title, is stored in the volume of the optical disk, only one title search pointer (TT_SRP) 93 is written in the table (TT_SRPT) 79.

As shown in FIG. 12, the title search pointer table information (TSPTI) 92 contains the number of title search pointers (TT_Ns) and the end address (TT_SRPT_EA) of the title search pointer table (TT_SRPT) 79. The address (TT_SRPT_EA) is represented by the number of bytes, relative to the first byte in the title search pointer table (TT_SRPT) 79. Furthermore, as shown in FIG. 13, each title search pointer (TT_SRP) 93 contains the number of part-of-titles (PTT_Ns) as the number of chapters (programs), the video title set number (VTSN), the title number (VTS_TTN) of the video title pet 72, and the start address (VTS_SA) of the video title set 72. The contents of the title search pointer (TT_SRP) 93 specifies a video title set 72 to be reproduced and a location in which the video title set 72 is to be stored. The start address (VTS_SA) of the video title set 72 is represented by the number of logical blocks in connection with the title set 72 specified by the video title set number (VTSN).

The details of what is described in the video manager menu PGCI unit table (VMGM_PGCI_UT) 81 will now be discussed with reference to FIGS. 14 through 19.

Figures 14, 15, 16:
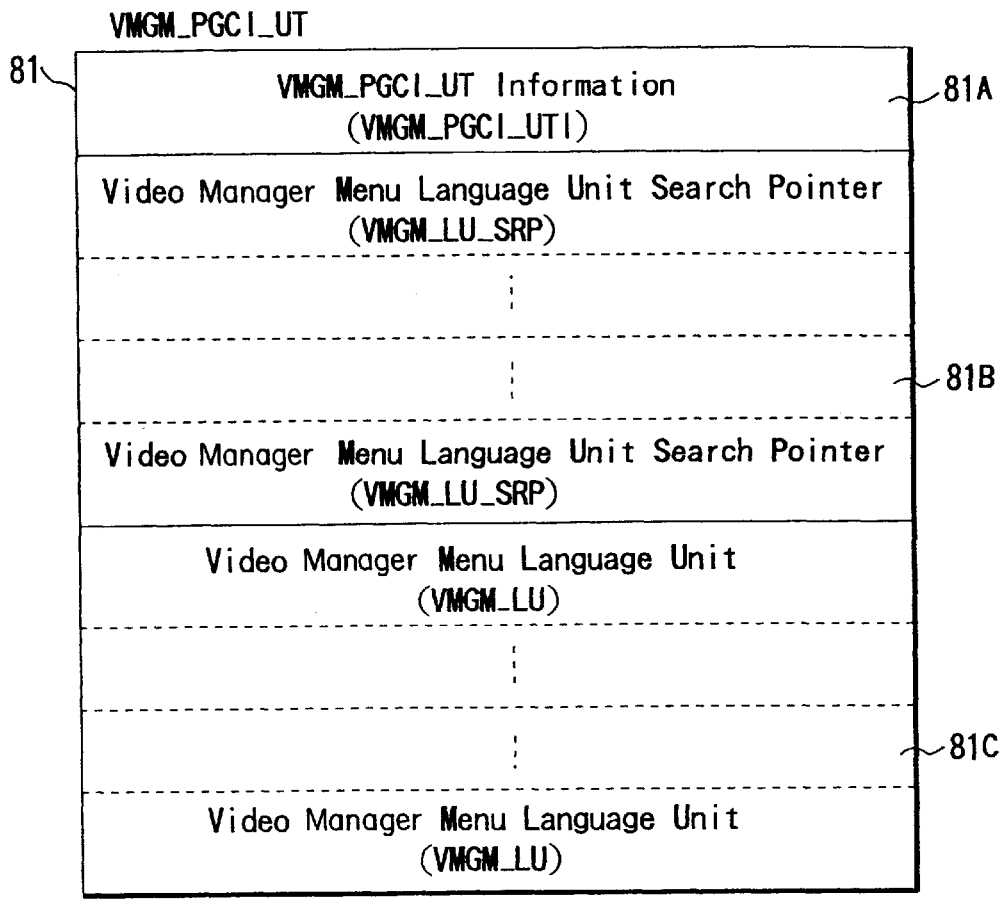
FIG. 14 depicts the structure of a video manager menu PGCI unit table (VMGM_PGCI_UT) shown in FIG. 7.
FIG. 15 illustrates the parameters and contents of video manager menu PGCI unit table information (VMGM_PGCI_UTI) in FIG. 14.
FIG. 16 illustrates the parameters and contents of a video manager menu PGCI unit search pointer (VMGM_LU_SRP) in FIG. 14.

The video manager menu PGCI unit table (VMGM_PGCI_UT) 81 shown in FIG. 14 is essential when the video object set (VMGM_VOBS) 76 for the video manager menu is provided, and information about a program chain for reproducing the video manager menu (VMGM) provided for each language is described in this table 81. By referring to the video manager menu PGCI unit table (VMGM_PGCI_UT) 81, the program chain of the specified language in the video object set (VMGM_VOBS) 76 can be acquired to be reproduced as a menu.

The video manager menu PGCI unit table (VMGM_PGCI_UT) 81 contains video manager menu PGCI unit table information (VMGM_PGCI_UTI) 81A, n video manager menu language unit search pointers (VMGM_LU_SRP) 81B, and n video manager menu language units (VMGM_LU) 81C in the named order as shown in FIG. 14.

The video manager menu PGCI unit table information (VMGM_PGCI_UTI) 81A contains information about the table 81. The video manager menu language unit search pointers (VMGM_LU_SRP) 81B are described in the order associated with the video manager menus #1 to #n and contain language codes and descriptions about the pointers to search for the video manager menu language units (VMGM_LU) 81C, described in the order associated with the video manager menus #1 to #n. Described in each video manager menu language unit (VMGM_LU) 81C are the category and start address of the program chain of the associated video manager menu.

Figures 17, 18, 19:
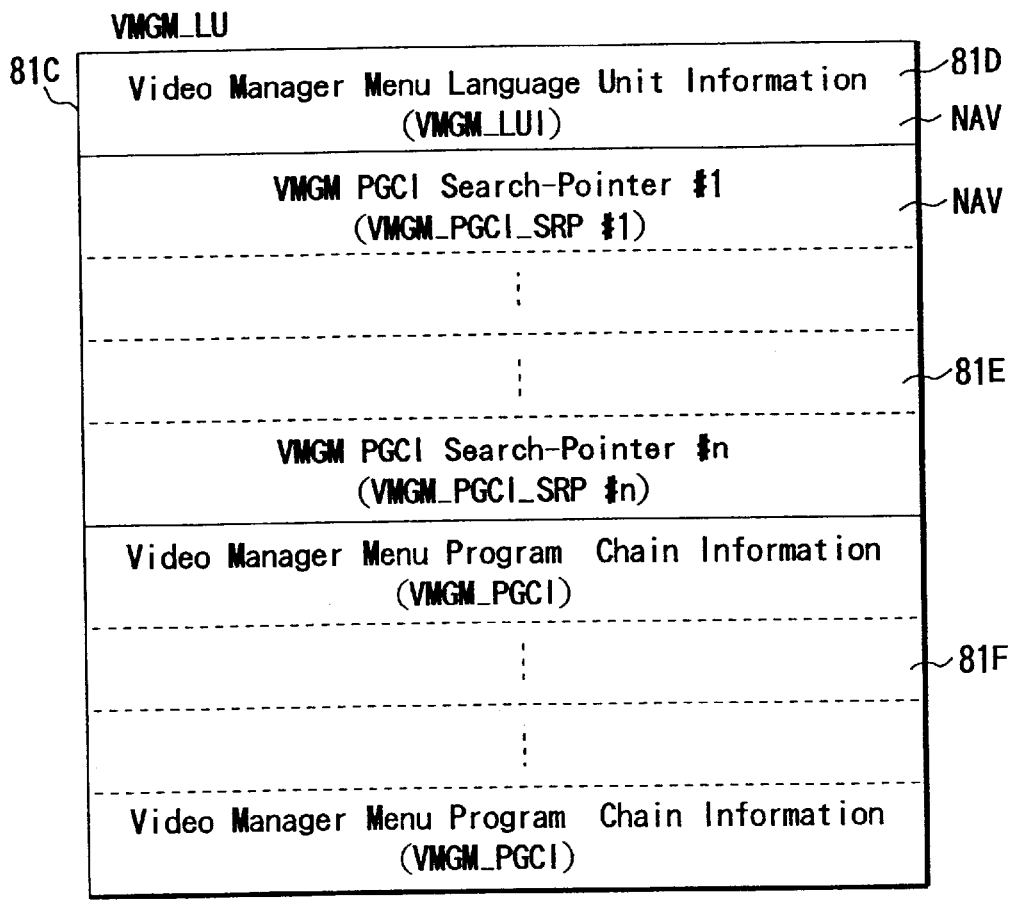
FIG. 17 shows the structure of video manager menu language unit (VMGM_LU) in FIG. 14.
FIG. 18 depicts the parameters and contents of video manager menu language unit information (VMGM_PGCI)
FIG. 19 illustrates the parameters and contents of video manager menu PGC information search pointer (VMGM_PGCI_SRP)

More specifically, as shown in FIG. 15, the video manager menu PGCI unit table information (VMGM_PGCI_UTI) 81A contains the number of the video manager menu language units (VMGM_LU) 81C as a parameter (VMGM_LU_Ns) and the end address of the video manager menu language units (VMGM_LU) 81C as a parameter (VMGM_PGCI_UT_EA). As shown in FIG. 16, each video manager menu language unit search pointer (VMGM_LU_SRP) 81B contains a video manager menu language code as a parameter (VMGM_LCD) and the start address of the associated video manager menu language unit (VMGM_LU) 81C as a parameter (VMGM_LU_SA). Each video manager menu language unit (VMGM_LU) 81C consists of video manager menu language unit information (VMGM_LUI) 81D, video manager menu PGC information search pointers (VMGM_PGCI_SRP) 81E and video manager menu PGC information (VMGM_PGCI) 81F in the named order as shown in FIG. 17. The video manager menu language unit information (VMGM_LUI) 81D contains information about this table 81C. The video manager menu PGC information search pointers (VMGM_PGCI_SRP) 81E are described in the order associated with the video manager menus #1 to #n and contain the categories of the program chains of the video manager menus and descriptions about the pointers to search for the video manager menu PGC information (VMGM_PGCI) 81F, described in the order associated with the video manager menus #1 to #n.

The video manager menu PGC information (VMGM_PGCI) 81F contains information about the program chain of the video manager menu or VMGM program chain information (VMGM_PGCI).

More specifically, as shown in FIG. 18, the video manager menu language unit information (VMGM_LUI) 81D contains the number of pieces of the VMGM program chain information (VMGM_PGCI) 81*f* as a parameter (VMGM_PGCI_Ns) and the end address of the video manager menu language unit information (VMGM_LUI) 81D as a parameter (VMGM_LUI_EA). As shown in FIG. 19, each video manager menu PGC information search pointer (VMGM_PGCI_SRP) 81E contains the category of the program chain of the associated video manager menu as a parameter (VMGM_PGC_CAT) and the start address of the associated VMGM program chain information (VMGM_PGCI) 81F as a parameter (VMGM_PGCI_SA).

Described in the category (VMGM_PGC_CAT) of the program chain of the video manager menu are a flag indicating whether or not there is an entry of this PGC and a menu ID indicating if it is a menu. The menu ID indicates a title menu when it is "0010".

The structure of the logic format of the video title set 72 shown in FIG. 6 will be described with reference to FIG. 20. In each video title set (VTS) 72, four items are written in the order shown in FIG. 20. Each video title set (VTS) 72 is made up of one or more video titles having common attributes. The video title set information (VTSI) 94 contains the management information on the video titles, including the information on entry search points, the information on playback of video object sets 72, the information on playback of title set menus (VTSM), and the attribute information on video object sets 72.

Each video title set 72 is provided with the backup of the video title set information (VTSI_BUP) 97. Between the video title set information (VTSI) and the backup of the information (VTSI_BUP) 97, a video object set for video title set menus (VTSM_VOBS) 95 and a video object set for video title set titles (VTSTT_VOBS) 96 are arranged. Both of the video object sets (VTSM_VOBS and VTSTT_VOBS) 95, 96 have the structure shown in FIG. 8, as explained earlier.

The video title set information (VTSI) 94, the backup of the information (VTSI_BUP) 97, and the video object set (VTSTT_VOBS) 96 for video title set titles are items indispensable to the video title set 72. The video object set (VTSM_VOBS) 96 for video title set menus is an option provided as the need arises.

Figure 20:
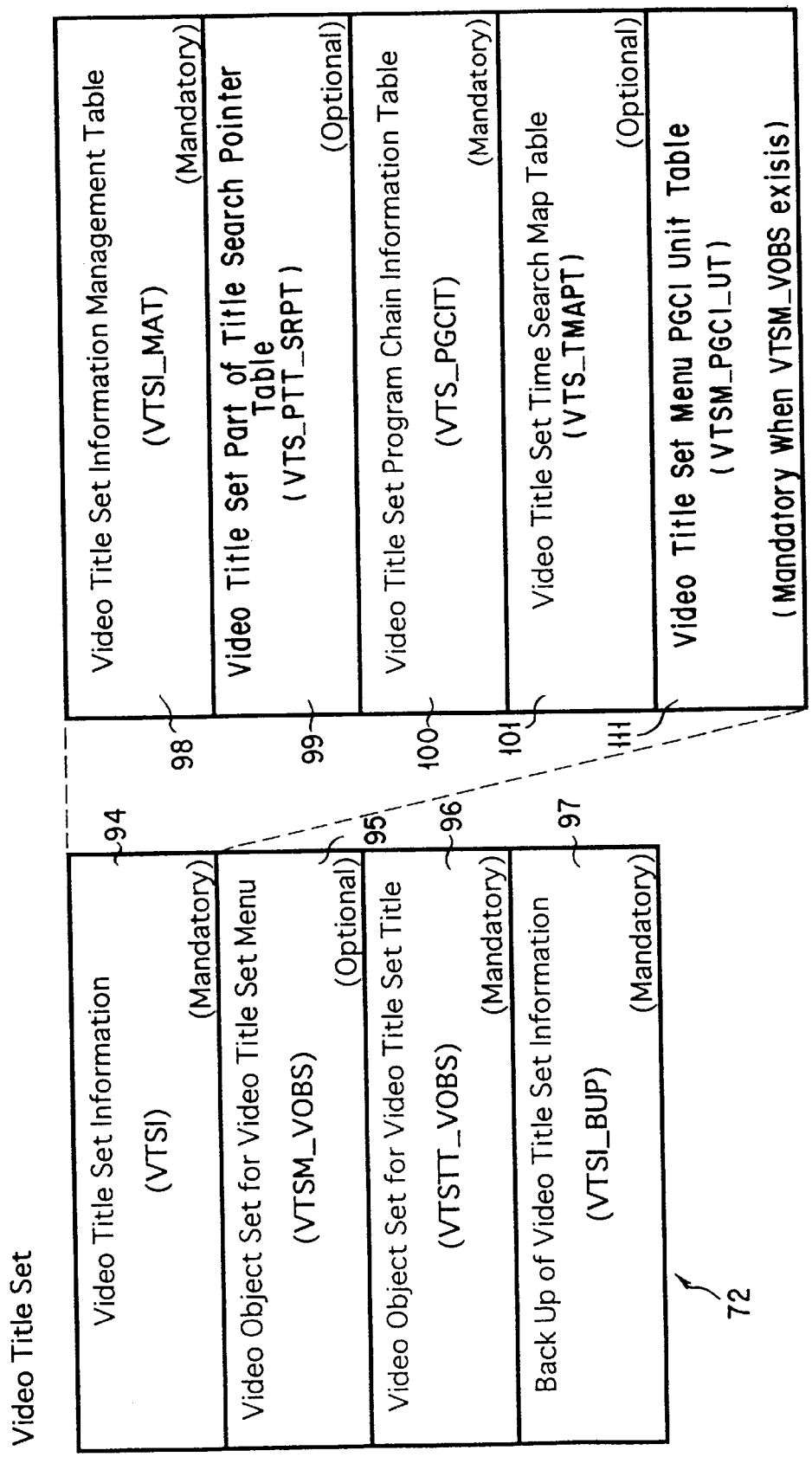
FIG. 20 illustrates the structure of the video title set of FIG. 6.

The video title set information (VTSI) 94 consists of five tables as shown in FIG. 20. The five tables are forced to align with the boundaries between logical sectors. The video title set information management table (VTSI_MAT) 98, a first table, is a mandatory table, in which the size of the video title set (VTS) 72, the start addresses of each piece of information in the video title set (VTS) 72, and the attributes of the video object sets (VOBS) 96 in the video title set (VTS) 72 are written.

The video title set part of title search pointer table (VTS_PTT_SRPT) 99, a second table, is an optional table provided as the need arises. Written in the table 99 are the program chains (PGC) 87 and/or programs (PG) 89 contained in the video title set 72 that are selectable according to the entry of a title number from the key/display section 4 of the apparatus or the selection of a title number given via the remote controller 5.

The video title set program chain information table (VTS_PGCIT) 100, a third table, is a mandatory table, in which the VTS program chain information (VTS_PGCI) 104 is written. The video title set time search map table (VTS_TMAPT) 101, a fourth table, is an optional table provided as the need arises, in which the information on the recording location, for a specific period of time of display, of the video data in each program chain (PGC) 87 in the title set 72 to which the map table (VTS_TMAPT) 101 belongs is written.

A video title set menu PGCI unit table (VTSM_PGCI_UT) 111, the fifth table, is an essential item when a video object set (VGSM_VOBS) 95 for the video title set menu is provided, and contains information about a program chain for reproducing a video title set menu (VTSM) provided for each language. By referring to this video title set menu PGCI unit table (VTSM_PGCI_UT) 111, the program chain of the specified language in the video object set (VTSM_VOBS) 95 can be acquired to be reproduced as a menu.

Next, the video title information management table (VTSI_MAT) 98 and video title set program chain information table (VTSI_PGCIT) 100 shown in FIG. 20 will be described with reference to FIGS. 21 to 30.

FIG. 21 shows the contents of the video title information management table (VTSI_MAT) 98, in which the video title set identifier (VTS_ID), the size of the video title set 72 (VTS_SZ), the version number of the DVD video specification (VERN), and the video title set category (VTS_CAT) are written in that order. Furthermore, in the table (VTSI_MAT) 98, the start address of the video object set (VTSM_VOBS) for VTS menus is expressed by a logical block relative to the first logical block in the video title set (VTS) 72. The start address (VTSTT_VOB_SA) of the video object 83 for titles in the video title set (VTS) 72 is expressed by a logical block (RLBN) relative to the first logical block in the video title set (VTS) 72.

Furthermore, in the table (VTSI_MAT) 98, the end address (VTSI_MAT_EA) of the video title set information management table (VTSI_MAT) 98 is represented by the number of blocks, relative to the first byte in the table (VTSI_MAT) 98 and the start address (VTS_PTT_SRPT_SA) of the video title set part of title search pointer table (VTS_PTT_SRPT) 99 is represented by the number of blocks, relative to the first byte in the video title set information (VTSI) 94.

Still furthermore, in the table (VTSI_MAT) 98, the start address (VTS_PGCIT_SA) of the video title set program chain information table (PGCIT) 100 is expressed by the number of blocks, relative to the first byte of the video title set information (VTSI) 94, and the start address (VTS_TMAPT_SA) of the time search map (VTS_TMAPT) 101 in the video title set (VTS) 72 is expressed by a logical sector relative to the first logical sector in the video title set (VTS) 72. This table (VTSI_MAT) 98 contains the start address (VTSM_PGCI_UT_SA) of the video title set menu PGCI unit table (VTSM_PGCI_UT) in terms of the number of relative blocks from the top byte of the video title set information (VTSI) 94. When the video manager menu PGCI unit table (VMGM_PGCI_UT) 81 is not present, "00000000h" is described at the start address. Written in the table (VTSI_MAT) 98 are the video object set (VTSM_VOBS) 95 for the video title set menu (VTSM) in the video title set (VTS) 72, the video attributes (VTS_V_ATR) of the video object set (VTST_VOBS) 96 for the titles (VTSTT) in the video title set 72, and the number of audio streams (VTS_AST_Ns) in the video object set (VTSTT_VOBS) 82 for the titles (VTSTT) for the video title sets 72. Here, the video attributes (VTS_V_ATR) include a video compression mode, a frame rate of the TV system, and an aspect ratio for displaying an image on a display unit.

Written in the table (VTSI_MAT) 98 are the audio stream attributes (VTS_AST_ATR) of the video object set (VTST_VOBS) for the titles (VTSTT) in the video title set (VTS). The attributes (VTS_AST_ATR) include an audio encoding mode indicating how audio is encoded, the number of bits used to quantize audio, the number of audio channels and an audio language code.

Furthermore, written in the table (VTSI_MAT) 98 are the number (VTS_SPST_Ns) of sub-picture streams in the video object set 82 for the titles (VTSTT) in the video title set (VTS) 72 and the attributes (VTS_SPST_ATR) of each sub-picture stream. The attributes (VTR_SPST_ATR) for each sub-picture stream include a sub-picture coding mode and a sub-picture display type.

Furthermore, in the table (VTSI_MAT) 98, written are the number (VTSM_AST_Ns) of audio streams in the video title set menu (VTSM), the audio stream attributes (VTSM_AST_ATR), the number (VTSM_SPST_Ns) of sub-picture streams, and the sub-picture stream attributes (VISM_SPST_ATR).

Each audio stream attribute (VTS_AST_ATR) of the video title set (VTS) contains the audio coding mode, the multichannel extension, the audio type, the audio application ID, quantization, the sampling frequency, and the number of audio channels from bit number b63 to bit number b48 with bit b51 reserved, and audio stream language codes as specific codes from bit number b47 to bit number b40 and from bit number b39 to bit number b32, as shown in FIG. 22. Bit number b31 to bit number b24 of this audio stream attribute (VTS_AST_ATR) are reserved for specific codes.

Bit number 23 to bit number b8 are reserved for the future use, and bit number b7 to bit number b0 describe application information. When the video object set (VTSM_VOBS) 95 for the VTS menu is not present or that video object set contains no audio stream, "0" is described in each of the bits from bit number b63 to bit number b0.

Specific codes are described in bits b47 to b40 and b39 to b32 where a language code determined by ISO-639 is described as a language symbol when the audio stream type is a language or voice. When the audio stream type is not a language or voice, this area is reserved.

As shown in FIG. 23, each sub-picture stream attribute (VTS_SPSTG_ATR) of the video object set (VTST_VOBS) 96 for VTSTT contains the sub-picture coding mode, sub-picture display type and sub-picture type from bit number b47 to bit number b40 with bit b44 reserved, and a language code of this sub-picture stream as specific codes from bit number b39 to bit number b32 and from bit number b31 to bit number b24. Bits b23 to b16 are reserved for specific codes. Bits b23 to b8 are reserved for the future use, and bits b15 to b8 describe the specific code extension. Further, bits b7 to b0 are reserved.

Figure 24:
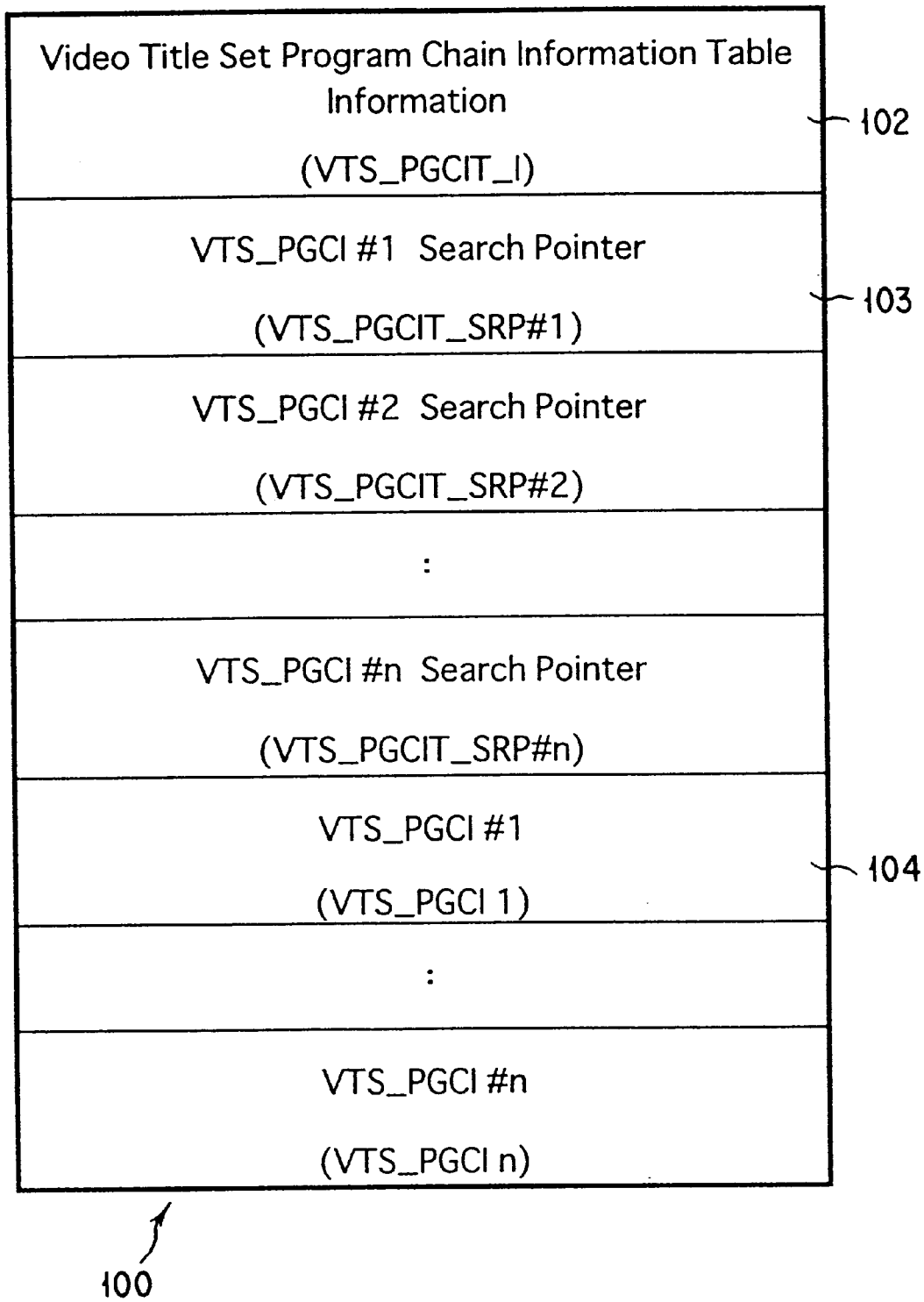
FIG. 24 illustrates the structure of the video title set program chain information table (VTS_PGCIT) of the video title set (VTS) of FIG. 20.

The VTS program chain information table (VTS_PGCIT) 100 has a structure as shown in FIG. 24. In the information table (VTS_PGCIT) 100, information on the VTS program chain (VTS_PGC) is written, starting with information (VTS_PGCIT_I) 102 on the information table (VTS_PGCIT) 100 related to the VTS program chain (VTS_PGC). In the information table (VTS_PGCIT) 100, the information (VTS_PGCIT_I) 102 is followed by as many VTS_PGCI search pointer (VTS_PGCIT_SRP) 103 used to search for VTS program chains (VTS_PGC) as the number (#1 to #n) of VTS program chains in the information table (VTS_PGCIT). At the end of the table, there are provided as many pieces of information (VTS_PGCI) 104 on the respective VTS program chains (VTS_PGC) as the number (from #1 to #n) of the VTS program chains (VTS_PGC).

Figures 25, 26, 27:
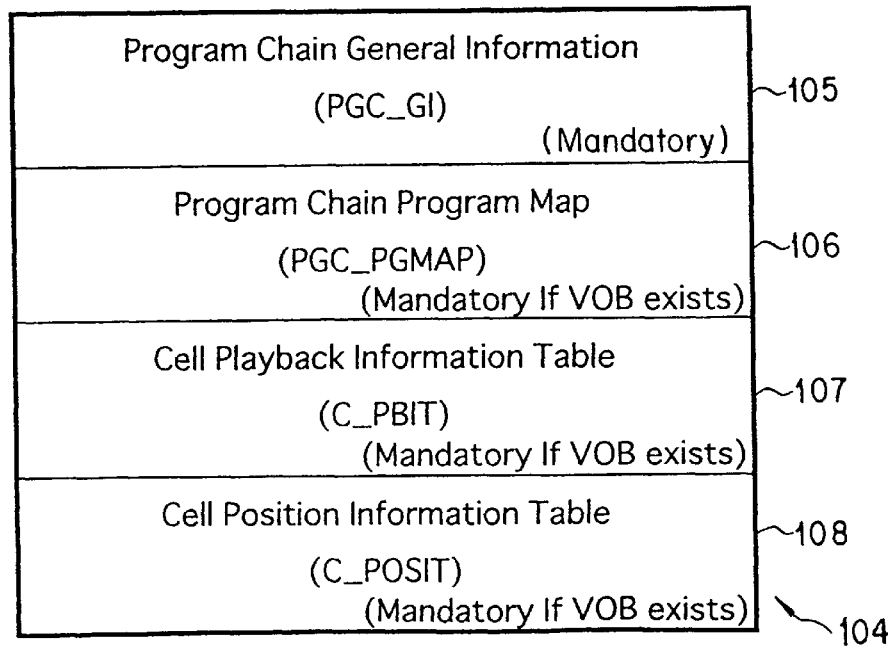
FIG. 25 shows the parameters and contents of the information (VTS_PGCIT_I) in the video title set program chain information table (VTS_PGCIT) of FIG. 24.
FIG. 26 shows the parameters and contents of the search pointer (VTS_PGCIT_SRP) corresponding to the program chain in the video title set program chain information table (VTS_PGCIT) of FIG. 24.
FIG. 27 illustrates the structure of the program chain information (VTS_PGCI) in the video set corresponding to the program chain in the video title set program chain information table (VTS_PGCIT) of FIG. 24.

The information (VTS_PGCIT_I) 102 in the VTS program chain information table (VTS_PGCIT) 100 contains the number (VTS_PGC_Ns) of VTS program chains (VTS_PGC) as shown in FIG. 25. The end address (VTS_PGCIT_EA) of the table information (VTS_PGCIT_I) 102 is expressed by the number of bytes, relative to the first byte in the information table (VTS_PGCIT) 100.

Furthermore, as shown in FIG. 26, the VTS_PGCIT search pointer (VTS_PGCIT_SRP) 103 contains the attributes (VTS_PGC_CAT) of the program chains (VTS_PGC) in the video title set (VTS) 72 and the start address (VTS_PGCI_SA) of the VTS_PGC information (VTS_PGCI) 104 expressed by the number of bytes, relative to the first byte in the VTS_PGC information table (VTS_PGCIT) 100. Here, the VTS_PGC attribute (VTS_PGC_CAT) is, for example, an attribute indicating whether an entry program chain (Entry PGC) is the first one to be reproduced. Usually, an entry program chain (PGC) is written before program chains (PGC) that are not entry program chains (PGC). Generally, program chains (PGC) are reproduced in the description order of VTS_PGCIs as shown in FIG. 24.

The PGC information (VTS_PGCI) 104 in the video title set 72 contains four items as shown in FIG. 27. In the PGC information (VTS_PGCI) 104, the program chain general information (PGC_GI) 105 on a mandatory item is first arranged, followed by at least three items that are made mandatory only when there is an video object 83. Specifically, contained as the three items in the PGC information (VTS_PGCI) 104 are a program chain program map (PGC_PGMAP) 106, a cell playback information table (C_PBIT) 107, and a cell position information table (C_POSIT) 108.

As shown in FIG. 28, the program chain general information (PGC_GI) 105 contains the category (PGCI_CAT) of the program chain 87, the contents (PGC_CNT) of the program chain (PGC) 87, and the playback time of the program chain (PGC). 87 Written in the category of PGC (PGCI_CAT) are whether the PGC can be copied or not and whether the programs 89 in the PGC are played back continuously or at random. The contents of PGC (PGC_CNT) contains the description of the program chain structure, that is, the number of programs 89, the number of cells 84, and the number of angles in the program chain 87. The playback time of PGC (PGC_PB_TIME) contains the total playback time of the programs 89 in the PGC. The playback time is the time required to continuously play back the programs 89 in the PGC, regardless of the playback procedure. When an angle mode is available, the playback time of angle cell number 1 is the playback time of the angle.

Furthermore, the program chain general information (PGC_GI) 105 contains PGC sub-picture stream control (PGC_SPST_CTL), PGC audio stream control (PGC_AST_CTL), and PGC sub-picture pallet (PGC_SP_PLT). The PGC sub-picture stream control (PGC_SPST_CTL) contains the number of sub-pictures usable in the PGC 89 and the PGC audio stream control (PGC_AST_CTL) likewise contains the number of audio streams usable in the PGC 89. The PGC sub-picture palette (PGC_SP_PLT) contains a set of a specific number of color pallets used in all of the sub-picture streams in the PGC 89.

Furthermore, the PGC general information (PGC_GI) 105 contains the start address (C_PBIT_SA) of the cell playback information table (C_PBIT) and the start address (C_POSIT_SA) of the cell position information table (C_POSIT) 108. Both of the start addresses (C_PBIT_SA and C_POSIT SA) are represented by the number of logical blocks, relative to the first byte in the VTS_PGC information (VTS_PGCI) 105.

For a program chain (PGC) for a menu, as shown in FIG. 29, bit b31 of the category (PGC_CAT) of the program chain describes a PGC entry or a non PGC entry as the entry type, bits b30 to b28 of are reserved for the future use, bits b27 to b24 describe a menu ID indicative of the type of the menu, bits b23 and b22 describe the PGC block mode, bits b21 and b20 describe the PGC block type, bits b19 to b16 describe the program playback control, bits b15 and b14 describe the copy flag, bits b13 and b12 describe the playback management, bits b11 to b8 describe the application type, and bits b7 to b0 are reserved for the future usage.

With regard to the menu ID, "0010" indicates a title menu for use in the video manager information menu (VMGM), "0011" indicates a root menu for use in the video title set menu (VTSM), "0100" indicates a sub-picture menu for use in the video title set menu (VTSM), "0101" indicates an audio menu for use in the video title set menu (VTSM), "0110" indicates an angle menu for use in the video title set menu (VTSM), and "0111" indicates a program menu for use in the video title set menu (VTSM).

When the category (PGC_CAT) of the program chain (PGC) is a program chain (PGC) for a title, bits b30 to b24 describe the number of titles (VTS_TTN), any of numbers 1 to 99, in this program chain (PGC), bits b15 to b8 describe the number of cells, any of 1 to 255, in this program chain (PGC), bits b7 to b4 are reserved for the future use, and bits b3 to b0 describe the number of angles, any one of 1 to 9, in the program chain (PGC).

The program chain program map (PGC_PGMAP) 106 is a map showing the arrangement of the programs 89 in the PGC 87 of FIG. 31. In the map (PGC_PGMAP) 106, the entry cell numbers (ECELLN), the start cell numbers of the individual programs 89, are written in ascending order as shown in FIGS. 31 and 32. In addition, program numbers are allocated, starting at 1, in the order in which the entry cell numbers are written. Consequently, the first entry number in the map (PGC_PGMAP) 106 must be #1.

The cell playback information table (C_PBIT) defines the order in which the cells 84 in the PGC 87 are played back. In the cell playback information table (C_PBIT) 107, pieces of the cell playback information (C_PBI) are written consecutively as shown in FIG. 33. Basically, cells 84 are played back in the order of cell number. The cell playback information (C_PBIT) 108 contains a cell category (C_CAT) as shown in FIG. 34. Written in the cell category (C_CAT) are a cell block mode indicating whether a cell is in the block and if it is in the block, whether the cell is the first one, a cell block type indicating whether a cell 84 is not part of the block or is in an angle block, and an STC discontinuity flag indicating whether the system time clock (STC) must be set again.

An "angle block" of cells is defined as a set of cells 84 having a specific angle. The angle can be changed by replacing one angle block with another. In the case of a baseball video program, for example, an angle block representing a scene taken from the outfield may be replaced by an angle block representing a scene taken from the infield.

Further written in the cell category (C_CAT) are a cell playback mode indicating whether the video object units (VOBU) 85 in the cell 84 are played back continuously or a picture is made still at one video object unit (VOBU) 85 to another in the cell 84, and cell navigation control indicating whether the picture is made still after the playback of the cell or indicating the rest time.

As shown in FIG. 34, the cell playback information table (C_PBIT) 107 contains the cell playback time (C_PBTNM) representing the total playback time of the PGC 87. When the PGC 87 has an angle cell block, the playback time of the angle cell number 1 represents the playback time of the angle block. Further written in the cell playback information table (C_PBIT) 107 are the start address (C_FVOBU_SA) of the first video object unit (VOBS) 85 in the cell 84 expressed by the number of logical sectors, relative to the first logical sector in the video object unit (VOBS) 85 in which the cell 84 is written and the start address (C_LVOBU_SA) of the end video object unit (VOBS) 85 in the cell 84 expressed by the number of logical sectors, relative to the first logical sector in the video object unit (VOBS) 85 in which the cell 84 is written.

The cell position information table (C_POSI) 108 specifies the identification number (VOB_ID) of the video object (VOB) 85 in the cell used in the PGC 87 and the identification number (Cell_ID) of the cell 84. In the cell position information table (C_POSI) 108, pieces of the cell position information (C_POSI) corresponding to the cell numbers written in the cell playback information table 107 as shown in FIG. 35 are written in the same order as in the cell playback information table (C_PBIT) 107. The cell position information (C_POSI) contains the identification number (C_VOB_IDN) of the video object unit (VOBS) 85 in the cell 84 and the cell identification number (C_IDN) as shown in FIG. 36.

Figures 37, 38, 39:
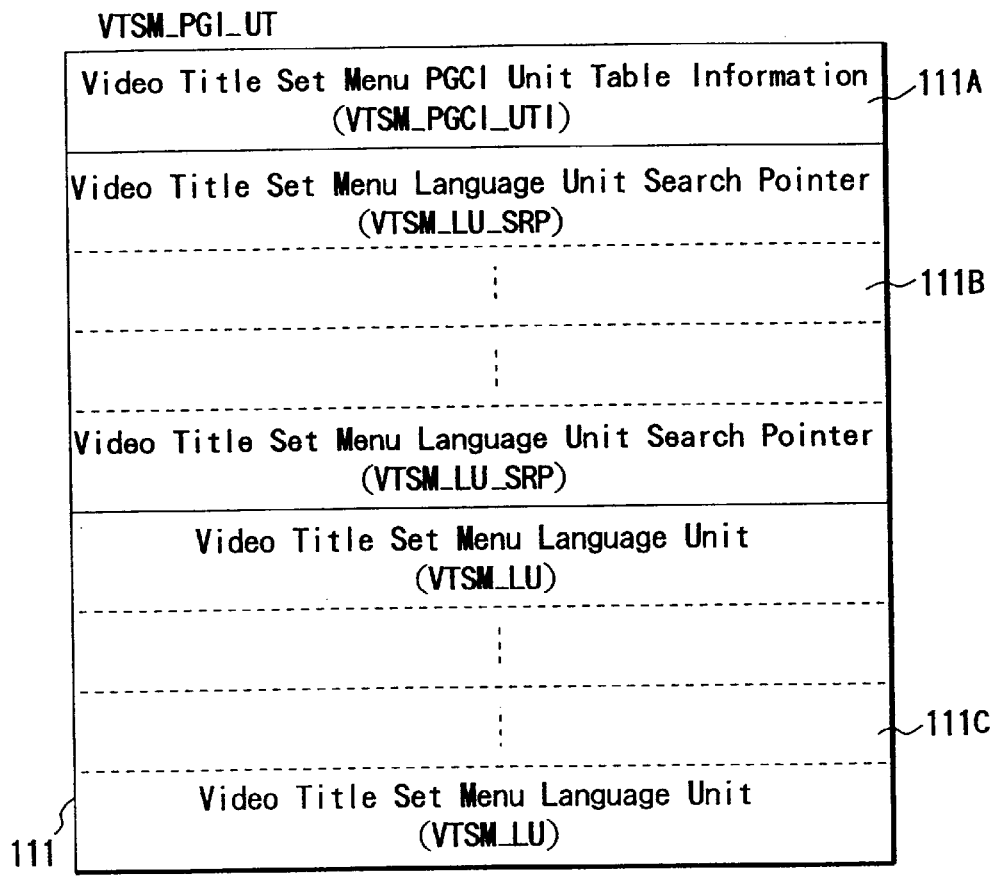
FIG. 37 shows the structure of a video title set menu PGCI unit table (VTSM_PGCI_UT) in FIG. 20.
FIG. 38 depicts the structure of video title set menu PGCI unit table information (VTSM_PGCI_UTI) in FIG. 37.
FIG. 39 shows the structure of a video title set menu PGCI unit search pointer (VTSM_LU_SRP) in FIG. 37.

The video title set menu PGCI unit table (VTSM_PGCI_UT) 111 describing language-by-language information of the video title set menu (VTSM) shown in FIG. 20 consists of video title set menu PGCI unit table information (VTSM_PGCI_UTI) 111A, n video title set menu language unit search pointers (VTSM_LU_SRP) 111B and n video title set menu language units (VTSM_LU) 111C in the named order, as shown in FIG. 37.

The video title set menu PGCI unit table information (VTSM_PGCI_UTI) 111A contains information of this table 111. The video title set menu language unit search pointers (VTSM_LU_SRP) 111B are described in the order associated with the video title set menus #1 to #n, and contain descriptions about the pointers to search for the video title set menu language units (VTSM_LU) 111C described in the order associated with the video title set menus #1 to #n. Described in each video title set menu language unit (VTSM_LU) 111C are the category and start address of the program chain of the associated video title set menu.

Figures 40, 41, 42:
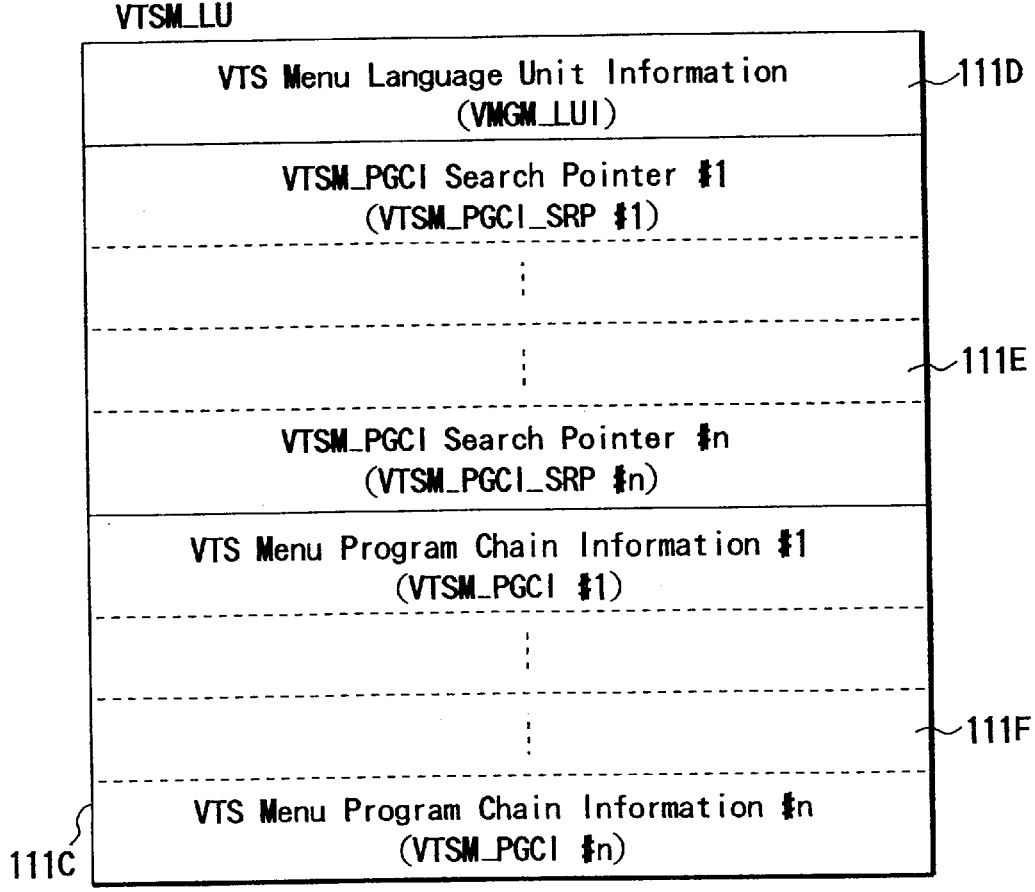
FIG. 40 illustrates the structure of a video title set menu language unit (VTSM_LU) in FIG. 37.
FIG. 41 illustrates the structure of video title set menu language unit information (VTSM_LUI) in FIG. 37.
FIG. 42 illustrates the parameters and contents of a video title set menu PGC information search pointer (VTSM_PGCI_SRP)

More specifically, as shown in FIG. 38, the video title set menu PGCI unit table information (VTSM_PGCI_UTI) 111A contains the number of the video title set menu language units (VTSM_LU) 111C as a parameter (VTSM_LU_Ns) and the end address of the video title set menu language units (VTSM_LU) 111C as a parameter (VTSM_PGCI_UT_EA). As shown in FIG. 39, each video title set menu language unit search pointer (VTSM_LU_SRP) 111B describes a video title set menu language code as a parameter (VTSM_LCD) and the start address of the associated video title set menu language unit (VTSM_LU) 111C as a parameter (VTSM_LU_SA). As shown in FIG. 40, each video title set menu language unit (VTSM_LU) 111C consists of video title set menu language unit information (VTSM_LUI) 111D, video title set menu PGC information search pointers (VTSM_PGCI_SRP) 111E and video title set menu PGC information (VTSM_PGCI) 111F in the named order. The video title set menu language unit information (VTSM_LUI) 111D contains information of this table 111C. The video title set menu PGC information search pointers (VTSM_PGCI_SRP) 111E are described in the order associated with the video title set menus #1 to #n, and contain the categories of program chains of the video title set menus and descriptions about the pointers to search for the video title set menu PGC information (VTSM_PGCI) 111F described in the order associated with the video title set menus #1 to #n.

Each video title set menu PGC information (VTSM_PGCI) 111F contains information about the program chain of the associated video title set menu, i.e., VTSM program chain information (VTSM_PGCI).

More specifically, as shown in FIG. 41, the video title set menu language unit information (VTSM_LUI) 111D contains the number of pieces of video title set menu PGC information (VTSM_PGCI) 111F as a parameter (VTSM_PGC_Ns), and the end address of the video title set menu language unit information (VTSM_LUI) 111D as a parameter (VTSM_LU_EA). As shown in FIG. 42, each video title set menu PGC information search pointer (VTSM_PGCI_SRP) 111E contains the category of the program chain of the associated video title set menu as a parameter (VTSM_PGC_CAT) and the start address of the associated video title set menu PGC information (VTSM_PGCI) 111F as a parameter (VTSM_PGCI_SA).

Described in the category (VMGM_PGC_CAT) of the program chain of the video title set menu are a flag indicating whether or not there is an entry of this PGC and a menu ID indicating if it is a menu. The menu ID indicates a sub-picture menu when it is "0100," indicates an angle menu when it is "0110," and indicates a program menu when it is "0111."

Figure 43:
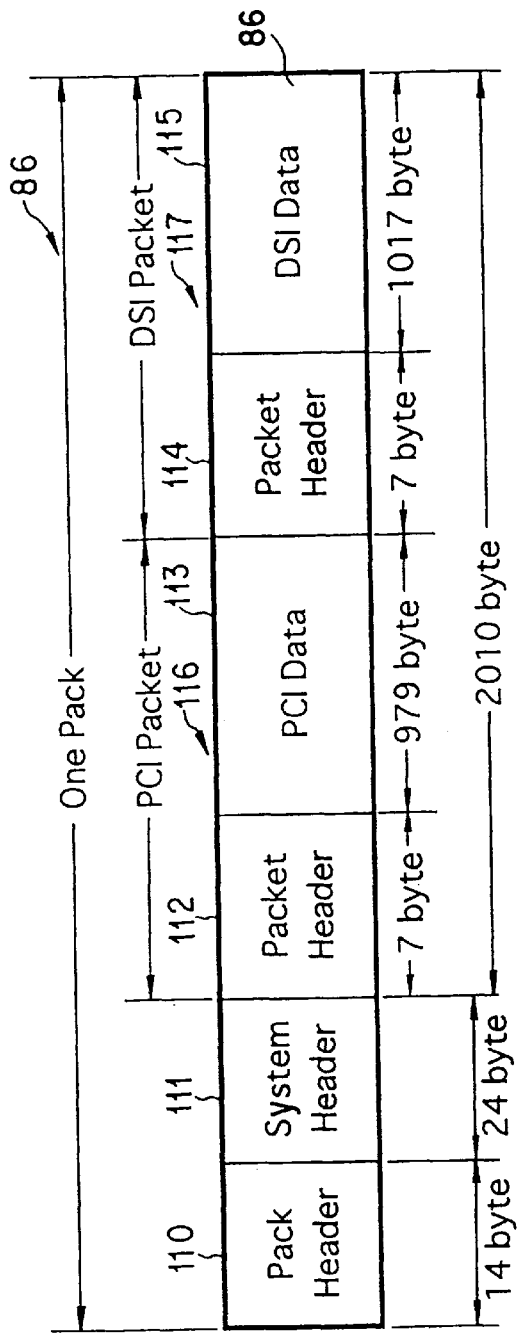
FIG. 43 illustrates the structure of the navigation pack of FIG. 8.

As explained with reference to FIG. 8, a cell 84 is a set of video object units (VOBU) 85. A video object unit 85 is defined as a pack train starting with a navigation (NV) pack 86. Therefore, the start address (C_FVOBU_SA) of the first video object unit (VOBU) 85 in a cell 84 is the start address of the NV pack 86. As shown in FIG. 43, the NV pack 86 consists of a pack header 110, a system header 111, and two packets 116, 117 of navigation data; namely, a playback control information (PCI) packet 116 and a data search information (DSI) packet 117. As many bytes as shown in FIG. 43 are allocated to the respective sections so that one pack may contain 2048 bytes corresponding to one logical sector. The NV pack is provided immediately before the video pack 88 which contains the first data item in the group of pictures (GOP). Even if the object unit 85 contains no video pack 88, the NV pack 86 is positioned at the head of the object unit 85, provided that the object unit 85 contains an audio pack 91 and/or a sub-picture pack 90. Thus, even if object unit 85 contains no video pack, its playback time is determined on the basis of the time required for playing back a video pack 88, exactly in the same way as in the case where the unit 85 contains a video pack 88.

Here, GOP is defined as a data train constituting a screen determined in the MPEG standards. In other words, GOP is equivalent to compressed data which may be expanded into image data representing a plurality of frames of a moving picture. The pack header 110 contains a pack starting code, a system clock reference (SCR), and a multiplex rate. The system header 111 contains a bit rate and a stream ID. The packet header 112, 114 of each of the PCI packet 116 and DCI packet 117 contains a packet starting code, a packet length, and a stream ID as determined in the MPEG2.

Figure 44:
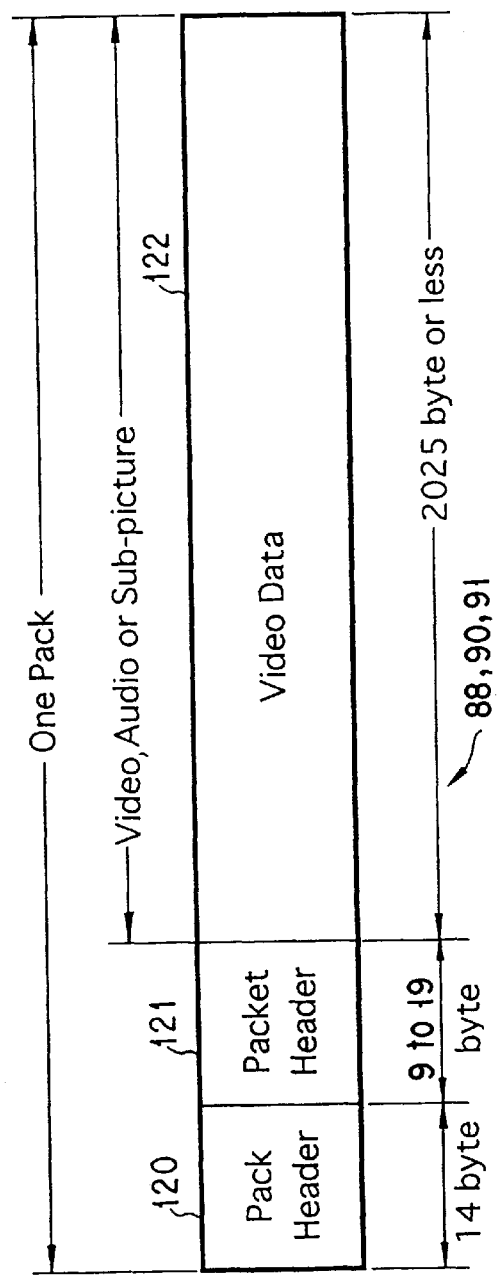
FIG. 44 illustrates the structure of the video pack, audio pack, or sub-picture pack of FIG. 8.

As shown in FIG. 44, another video, audio or sub-picture pack consists of a pack header 120, packet header 121, and a packet 122 containing the corresponding data as in the system layer 24 MPEG 2. Its pack length is determined to be 2048 bytes. Each of these packs is aligned with the boundaries between logical blocks.

The PCI data (PCI) 113 in the PCI packet 116 is navigation data used to make a presentation, or to change the contents of the display, in synchronization with the playback of the video data in the VOB unit (VOBU) 85. Specifically, the PCI data (PCI) 113 contains PCI general information (PCI_GI) as information on the entire PCI data 113 and angle information (NSML_AGLI) as each piece of jump destination angle information during angle change as shown in FIG. 45. The PCI general information (PCI_GI) contains the address (NV_PCK_LBN) of the NV pack (NV_PCK) 86 in which the PCI data is recorded as shown in FIG. 28, the address being expressed in the number of blocks, relative to the VOBU logical sector in which the PCI data is recorded. The PCI general information (PCI_GI) contains the category of VOBU (VOBU_CAT), the start PTS of VOBU 85 (VOBU_SPTS), and the end PTS of VOBU 85 (VOBU_EPTS). Here, the start PTS of VOBU 85 (VOBU_SPTS) indicates the playback start time (start presentation time stamp (SPTS)) of the video data in the VOBU 85 containing the PCI data. The playback start time is the playback start time of the first picture in the first GOP in the VOBU 85. Normally, the first picture corresponds to I picture (intra-picture) data in the MPEG standards. The end PTS (VOBU_EPTS) in the VOBU 85 indicates the playback end time (end presentation time stamp (EPTS)) of the video data in the VOBU 85 containing the PCI data. The playback end time is the playback start time of the last picture in the last GOP in the VOBU 85.

Figure 48:
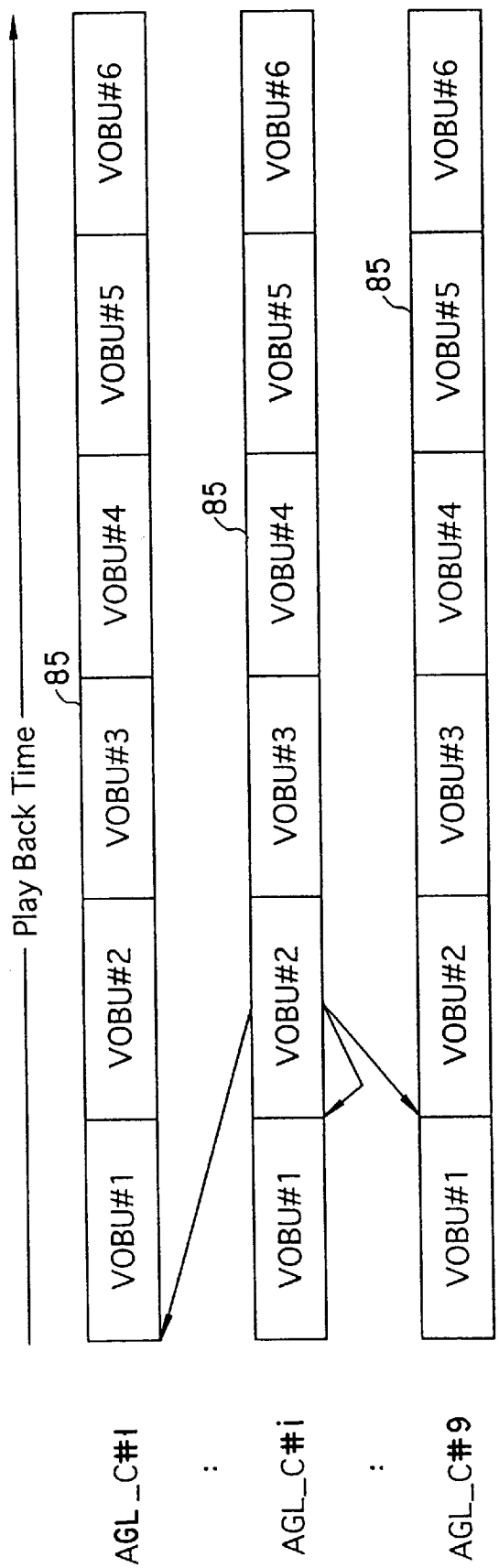
FIG. 48 is a diagram to help explain how to change the angle using the angle information (NSML_AGLI) in the playback control information (PCI) of FIG. 47.
Figure 57B:
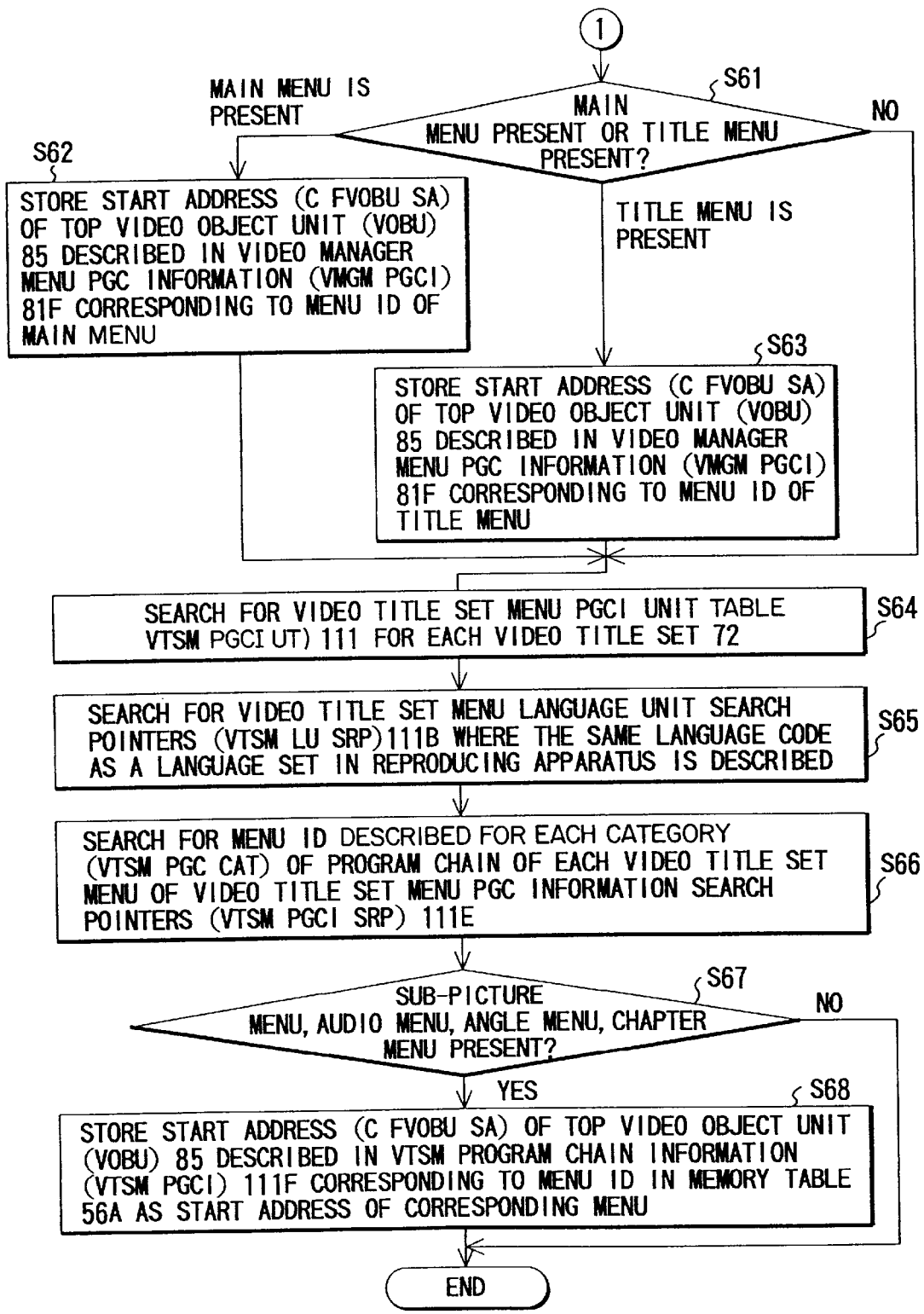

The angle information (NSML_AGLI) contains as many start addresses (NSML_AGL_C_DSTA) of the angle cells at jump destinations as the number of angles as shown in FIG. 49. Each of the start addresses is represented by a logical sector relative to the logical sector of the NV pack 86 in which the PCI data is recorded. When the angle is changed on the basis of the angle information (NSML_AGLI), the angle information (NSML_AGLI) contains either the start address of the VOBU in another angle block whose playback time is equal to that of the VOBU 85 in which the PCI data is recorded as shown in FIG. 48, or the start address (NSML_AGL_C_DSTA) of the VOBU 85 in another angle block whose playback time is closest to the preceding one.

According to the description of the start address (NSML_AGL_C_DSTA) of such an angle cell, the angle is changed in a concrete example as follows. Assume that in a series of consecutive scenes in a baseball game, the pitcher throws a ball, the batter hits the ball, and the ball lands in the stands. The change of the angle will be explained. An angle cell (ANG_C#j) can be changed on a video object unit (VOBU) 85 basis as shown in FIG. 48. In FIG. 48, the video object units (VOBU) 85 are assigned numbers in the order of playback. The video object unit (VOBU#n) 85 corresponding to playback number n of an angle cell (ANG_C#j) stores the video data for a different scene which is contemporary with or immediately preceding that for which the video data is stored in the video object unit (VOBU#n) 85 with playback number n corresponding to another angle cell (ANG_C#l) or angle cell (ANG_C#9). It is assumed that in an angle cell (ANG_C#j), VOBUs are arranged consecutively as video data used to show on the screen the whole view including the pitcher and batter and a series of actions. It is also assumed that in angle cell (ANG_C#1), VOBUs are arranged consecutively as video data used to show only the batter on the screen to view the batting form of the batter, and that in angle cell (ANG_C#9), VOBUs are arranged consecutively as video data used to show only the expression of the pitcher on the screen. When the user is viewing angle cell #j (ANG_C#j) and changes to angle cell #1 the moment the batter hit the ball, that is, changes to the angle at which only the batter is shown, at the moment the batter made a hit, this switches to a screen where the batter starts swinging a bat before making the hit, not to a screen showing only the batter after he made a hit. Furthermore, when the user is viewing angle cell #j (ANG_C#j) and changes to angle cell #9 the moment the batter hit the ball, that is, changes to the angle at which only the pitcher is shown, at the moment the batter made a hit, this causes the pitcher's expression at the moment the batter made a hit to appear on the screen, enabling the user to read a change in the pitcher's mental state by his expression.

The DSI data (DSI) 115 in the DSI packet 117 shown in FIG. 43 is the navigation data used to search for a VOB unit (VOBU) 85. The DSI data (DSI) 115 contains the DSI general information (DSI_GI), angle information (SML_AGLI), VOB unit search information (VOBU_SRI), and the synchronizing playback information (SYNCI), as shown in FIG. 49.

The DSI information (DSI_GI) contains information about the entire DSI data 115. Specifically, as shown in FIG. 50, the DSI general information (DSI_GI) contains the system clock reference for the NV pack (NV_PCK_SCR)

86. The system clock reference (NV_PCK_SCR) is stored in the system time clock (STC) 54A, 58A, 60A or 62A built in each section of FIG. 1. On the basis of the STC 54A, 58A, 60A, 62A, video, audio, and sub-picture packs are decoded at the video, audio, and sub-picture decoders 58, 60, and 62 and the monitor 6 and the speaker 8 reproduce images and sound, respectively. The DSI general information (DSI_GI) contains the start address (NV_PCK_LBN) of the NV pack (NV_PCK) 86 containing the DSI data expressed by the number of logical sectors (RLSN), relative to the first logical sector in the VOB set (VOBS) 82 containing the DSI, and the address (VOBU_EA) of the last pack in the VOB unit (VOBU) 85 containing the DSI data expressed by the number of logical sectors (RLSN), relative to the first logical sector in the VOB unit (VOBU) 85.

Furthermore, the DSI general information (DSI_GI) contains the end address (VOBU_IP_EA) of the V pack (V_PCK) 88 containing the last data item for the first I picture in the VOB unit (VOBU) expressed by the number of logical sectors (RLSN), relative to the first logical sector in the VOB unit (VOBU) 85 containing the DSI data, and the identification number (VOBU_VOB_IDN) of the VOB 83 containing the VOB DSI and the identification number (VOBU_C_IDN) of the cell 84 in which the cell DSI data is recorded.

Like the angle information (NSML_AGLI) in PCI 113, the angle information (SML_AGLI) contains as many start addresses (SML_AGL_C_DSTA) of angle cells at jump destinations as the number of angles, as shown in FIG. 51. Each of the start addresses is represented by a logical sector relative to the logical sector in the NV pack 86 in which the DSI 115 is recorded. When the angle is changed on the basis of the angle information (SML_AGLI), the angle information (SML_AGLI) contains the start address of the cell 84 in another angle block after the playback time of the VOBU 85 in which the DSI data 115 is recorded, as shown in FIG. 52.

When the angle information (SML_AGL1) in DSI data 113 is used, the angle is changed, cell by cell, whereas PCI can be changed on the basis of a video object unit (VOBU) 85. Namely, consecutive changes of the angle are described in the angle information (SML_AGLI) in DSI data 115, whereas discontinuous changes of the angle are described in the angle information (SML_AGLI) in PCI data 113. In the above example of baseball, the angle is changed as follows. It is assumed that angle cell #j (AGL_C#j) 84 contains a stream of video data for a series of scenes where the pitcher throws a ball, the batter hits the ball, and the ball lands in the stands, filmed from the infield, and that angle cell #1 contains a stream of video data for a series of the same scenes filmed from the outfield. Furthermore, angle cell #9 is assumed to be a stream of video data as to how the team to which the batter belongs looks in connection with a series of the above scenes. When the user is viewing angle cell #j (AGL_C#j) and changes to angle cell #1 the instant the batter made a hit, that is, changes to a scene from the outfield the instant the batter hit the ball, he or she can switch to consecutive scenes where the ball is flying closer to the outfield after the batter hit the ball. Furthermore, when the user is viewing angle cell #j (AGL_C#j) and changes to angle cell #9 the moment the ball landed in the stands, that is, changes to an angle at which how the batter's team looks is shown on the screen, the team cheering for the home run and the baseball manager's expression are displayed on the screen. When the angle information (NSML_AGLI) in PCI data 113 and the angle information (SML_AGLI) in DSI data 115 are used, it is apparent that a different scene is played back.

The search information (VOBU_SRI) in VOBU 85 contains information used to identify the first address in a cell 84 as shown in FIG. 53. Specifically, the search information (VOBU_SRI) in VOBU 85 contains the start addresses (A_FWDn) of +1 to +20, +60, +120, and +240 VOB units (VOBU) 85 as forward addresses (FWDANn) in the order of playback on the basis of the VOB unit (VOBU) 85 containing the DSI 115 as shown in FIG. 43, the forward addresses being expressed by the number of logical sectors, relative to the first logical sector in the VOB unit.

Each forward address (FWDANn) contains 32 bits as shown in FIG. 54. Bit number 29 (b29) to bit number 0 (b0) are assigned to its address, for example, the address of forward address 10 (FWDA10). At the head of the forward address (FWDANn), a flag (V_FWD_Exist1) indicating whether the video data exists in the video object unit (VOBU) 85 corresponding to the forward address (FWDANn) and a flag (V_FWD_Exist2) indicating whether the video data exists in the video object unit between the current address and the forward address (FWDAn). Specifically, VFWD_Exist1 corresponds to bit number (b31). When this flag is at 0, this means that there is no video data in the video object unit (VOBU) specified by the address (FWDANn) written in bit number 29 to bit number 0. When this flag is at 1, this means that there is video data in the video object unit (VOBU) specified by the forward address (FWDANn) written in bit number 29 to bit number 0. For example, if forward address 10 (FWD10) has video data, the flag will be up (1) in V_FWD_Exist1 of the 31st bit. If the address has no video data, the flag will be down (0) in V_FWD_Exist1 of the 31st bit. Furthermore, V_FWD_Exist2 corresponds to bit number (b30). When this flag is at 0, this means that there is video data in none of the video object units between the current address and the forwarding address (FWDAn). Specifically, V_FWD_Exixt 1 corresponds to bit number (b31). When this flag is at 0, this means that there is no video data in the video object units (VOBU) 85 between the forward address (FWDANn) written in bit number 29 to bit number 0 and current address. When this flag is at 1, this means that there is video data in at least one of the video object units (VOBU) 85 between them. For example, if there is video data in a plurality of video object units 85 between forward address 1 and forward address 9, the flag will be up (1) in V_FWD_Exist2 of the 30th bit. If the address has no video data, the flag will be down (0) in V_FWD_Exist2 of the 30th bit.

Furthermore, the VOBU search information (VOBU_SRI) contains the start addresses (A_BWDn) of -1 to -20, -60, -120, and -240 VOB units (VOBU) 85 as backward addresses (BWDA) in the reverse order of playback on the basis of the VOB unit (VOBU) 85 containing the DSI as shown in FIG. 53, the backward addresses being expressed by the number of logical sectors, relative to the first logical sector in the VOB unit 85.

Each backward address (FWDANn) contains 32 bits as shown in FIG. 55. Bit number 29 (b29) to bit number 0 (b0) are assigned to its address, for example, the address of backward address 10 (BWDA10). At the head of the backward address (BWDANn), a flag (V_BWD_Exist1) indicating whether the video data exists in the video object unit (VOBU) 85 corresponding to the backward address (BWDANn) and a flag (V_BWD_Exist2) indicating whether the video data exists in the video object units between the backward address (BWDAn) and the current address. Specifically, V_BWD_Exist1 corresponds to bit number (b31). When this flag is at 0, this means that there is no video data in the video object unit (VOBU) 85 specified by the address (BWDANn) written in bit number 29 to bit number 0. When this flag is at 1, this means that there is video data in the video object unit (VOBU) specified by the address (BWDANn) written in bit number 29 to bit number 0. For example, if backward address 10 (BWDA10) has video data, the flag will be up (1) in V_BWD_Exist1 of the 31st bit. If the address has no video data, the flag will be down (0) in V_BWD_Exist1 of the 31st bit. Furthermore, V_BWD_Exist2 corresponds to bit number (b30). When this flag is at 0, this means that there is video data in none of the video object units between the backward address (BWDANn) written in bit number 29 to bit number 0 and the current address. When this flag is at 1, this means that there is video data in at least one of the video object units (VOBU) 85. For example, if there is video data in video object units between the backward address 10 (BWDA10) and the current address 0, the flag will be up (1) in V_BWD_Exist2 of the 30th bit. If the address has no video data, the flag will be down (0) in V_BWD_Exist2 of the 30th bit.

The synchronizing information (SYNCI) contains address information on the sub-pictures and audio data reproduced in synchronization with the playback start time of the video data in the VOB unit (VOBU) 85 containing the DSI data. Specifically, as shown in FIG. 56, the start address (A_SYNCA) of the target audio pack (A_PCK) is expressed by the number of logical sectors (RLSN), relative to the NV pack (NV_PCK) 86 in which DSI data 115 is recorded. When there are more than one audio stream (8 audio streams maximum), as many pieces of the synchronizing information (SYNCI) as there are audio streams are written. Furthermore, the synchronizing information (SYNCI) contains the address (SP_SYNCA) of the NV pack (NV_PCK) 86 of the VOB unit (VOBU) 85 containing the target audio pack (SP_PCK) 91, the address being expressed by the number of logical sectors (RLSN), relative to the NV pack (NV_PCK) 86 in which DSI 115 is recorded. When there are more than one sub-picture stream (32 sub-picture streams maximum), as many pieces of the synchronizing information (SYNCI) as there are sub-picture streams are written.

With reference to FIG. 1 and the optical disk 10 which has the logic format illustrated in FIGS. 6 through 56, the menu reproducing process will now be described. In FIG. 1, the solid arrows between blocks indicate a data bus and the broke-line arrows indicate a control bus.

When the optical disk apparatus depicted in FIG. 1 is powered on and the optical disk 10 is loaded therein, the system CPU section 50 reads an initialization program from the system ROM/RAM section 52 and operates the disk drive section 30. Consequently, the disk drive section 30 starts the reading operation from the lead-in area 27 and reads the volume and file structure area 70, which follows the lead-in area 27 and defines the volume and file structure in conformity to ISO-9660 or the like. More specifically, the system CPU section 50 sends a read command to the disk drive section 30 to read the contents of the volume and file structure area 70, recorded at a predetermined position on the optical disk 10 loaded in the disk drive section 30, and temporarily stores the read data into the data RAM section 56 via the system processor section 54. The system CPU section 50 extracts information, such as the recorded position, recorded capacity and size of each file, and management information necessary for management, via a path table and directory records stored in the data RAM section 56, and transfers this information to a predetermined location in the system ROM/RAM section 52 to save the information there.

By referring to the information on the recorded position and recorded capacity of each file from the system ROM/RAM section 52, the system CPU section 50 acquires the video manager 71 which consists of a plurality of files starting at file number "0". More specifically, the system CPU section 50 refers to the information on the recorded position and recorded capacity of each file obtained from the system ROM/RAM section 52, sends the read command to the disk drive section 30 to acquire the positions and sizes of a plurality of files which form the video manager 71 present on the root directory, reads this video manager 71 and stores the video manager 71 into the data RAM section 56 via the system processor section 54.

Thereafter, the system CPU section 50 detects the total number of titles on the optical disk 10, the number of chapters (the number of programs) for each title, the number of audio streams and the languages of audio streams for each title, the number of sub-picture streams and the languages of the sub-picture streams for each title.

The system CPU section 50 searches for the title search pointer table (TT_SRPT) 79 or the second table of the video manager 71 (step S51). The system CPU section 50 acquires the total number of titles on the optical disk 10 from the number (TT_Ns) of title search pointers described in the title search pointer table information (TT_SRPTI) in the title search pointer table (TT_SRPT) 79 (step S52).

The system CPU section 50 acquires the number of chapters (the number of programs) for each title from the number (PTT_Ns) of part-of-titles as the number of chapters (the number of programs) described in each title search pointer (TT_SRP) 93 in the title search pointer table (TT_SRPT) 79 (step S53).

The system CPU section 50 searches for the video title set direct access pointer table (VTS_PTT_SRPT) 99 in the video title set information (VTSI) 94 as the first table of each video title set 72 using the start address (VTS_SA) of the video title set 72 described in each title search pointer (TT_SRP) 93 (step S54). The system CPU section 50 acquires the number of audio streams for each title from the number (VTS_AST_Ns) of audio streams described in the table (VTS_PTT_SRPT) 99 for each video title set 72, and acquires the number of sub-picture streams for each title from the number (VTS_SPST_Ns) of sub-picture streams (step S55).

The system CPU section 50 acquires the language for audio streams for each title from audio language codes for the associated audio streams described in the audio stream attributes (VTS_AST_ATR) of the table (VTS_PTT_SRPT) 99 for each video title set 72 (step S56).

The system CPU section 50 also acquires the languages for sub-picture streams for each title from the sub-picture language codes for the associated sub-picture streams described in the sub-picture stream attributes (VTS_PTT_SRPT) of the table (VTS_DAPT) 99 for each video title set 72 (step S57).

The system CPU section 50 searches for the video manager menu PGCI unit table (VMGM_PGCI_UT) 81 or the fourth table in the video manager information (VMGM) 75 of the video manager 71 (step S58). In this search, the video manager menu language unit search pointers (VMGM_LU_SRP) 81B where the same language code as the language set in the reproducing apparatus are searched (step S59).

Using the video manager menu language unit search pointers (VMGM_LU_SRP) 81B to find where the same language code is described, the system CPU section 50 searches for the menu IDs which are described for the individual categories (VMGM_PGC_CAT) of the program chains of the individual video manager menus of the video manager menu PGC information search pointers (VMGM_PGCI_SRP) 81E in the video manager menu language units (VMGM_LU) 81C associated with the pointers (VMGM_LU_SRP) 81B (step S60) to determine if there is the main menu as the root menu and to determine if the title menu (video title set menu) is present (step S61).

When the main menu is present, the system CPU section 50 reads the contents of the associated VMGM program chain information (VMGM_PGCI) 81F based on the start addresses (VMGM_PGCI_SA) of the VMGM program chain information (VMGM_PGCI) 81F described in one of the video manager menu PGC information search pointers (VMGM_PGCI_SRP) 81E where the menu ID of the root menu is described, and stores the start address (C_FVOBU_SA) of the top video object unit (VOBU) 85, described in the VMGM program chain information (VMGM_PGCI) 81F, in the memory table 56A as the start address of the main menu (step S62).

When the title menu is present, the system CPU section 50 reads the contents of the associated VMGM program chain information (VMGM_PGCI) 81F based on the start addresses (VMGM_PGCI_SA) of the VMGM program chain information (VMGM_PGCI) 81F described in one of the video manager menu PGC information search pointers (VMGM_PGCI_SRP) 81E where the menu ID of the title menu is described, and stores the start address (C_FVOBU_SA) of the top video object unit (VOBU) 85, described in the VMGM program chain information (VMGM_PGCI) 81F, in the memory table 56A as the start address of the title menu (step S63).

The system CPU section 50 searches for the video title set menu PGCI unit table (VTSM_PGCI_UT) 111 i.e., the first table in each video title set 72 (step S64). In this search, the video title set menu language unit search pointers (VTSM_LU_SRP) 111B containing the same language code as the language set in the reproducing apparatus are searched (step S65).

When the video title set menu language unit search pointers (VTSM_LU_SRP) 111B where the same language code is described, the system CPU section 50 searches for the menu IDs which are described for the individual categories (VTSM_PGC_CAT) of the program chains of the individual video title set menu PGC information search pointers (VTSM_PGCI_SRP) 111E in the video title set menu language units (VTSM_LU) 111C associated with the pointers (VTSM_LU_SRP) 111B (step S66 to determine if there is the sub-picture menu, audio menu, angle menu or chapter (program) menu and also determine if the title menu is present (step S67).

When any of the menus is present, the system CPU section 50 reads the contents of the associated video title set menu PGC information (VTSM_PGCI) 111F based on the start addresses (VTSM_PGCI_SA) of the video title set menu PGC information (VTSM_PGCI) 111F described in one of the video title set menu PGC information search pointers (VTSM_PGCI_SRP) 111E where the menu ID of that menu is described, and stores the start address (C_FVOBU_SA) of the top video object unit (VOBU) 85, described in the video title set menu PGC information (VTSM_PGCI) 111F, in the memory table 56A as the start address of the associated menu (step S68).

Accordingly, the start addresses of the sub-picture menu, audio menu, angle menu and chapter (program) menu for each video title set 72 are stored in the memory table 56A.

As a result, the memory table 56A retains the start addresses associated with the individual menus associated with the language set in the reproducing apparatus, as shown in FIG. 58.

When the menu key 5k on the remote controller 5 is depressed, the system CPU section 50 determines the reproduction of the main menu and determines if the main menu is present. When the main menu is present, the system CPU section 50 reads the start address (C_FVOBU_SA) of the top video object unit (VOBU) 85 stored in association with the main menu in the memory table 56A, reads data of the main menu corresponding to this address from the area on the optical disk 10 which corresponds to the video object set (VMGM_VOBS) 76 for the video manager menu (VMGM) 75 and reproduces that data. This reproduced data is sent via the system processor section 54 to the data RAM section 56. Based on the reproduction time information, the data cell 84 is supplied to the video decoder section 58, audio decoder section 60 and sub-picture decoder section 62 to be decoded there. The decoded data are converted to signals by the D/A and data reproducing section 64, so that the image of the main menu as shown in FIG. 59 is reproduced on the monitor section 6 and a voice is reproduced from the speaker section 8.

When the title key 51 on the remote controller 5 is depressed or the key "1" corresponding to the title is depressed with the main menu reproduced, or at the time the normal reproduction starts, the system CPU section 50 determines the reproduction of the title menu and determines if the title menu is present. When the title menu is present, the system CPU section 50 reads the start address (C_FVOBU_SA) of the top video object unit (VOBU) 85 stored in association with the title menu in the memory table 56A, reads data of the title menu corresponding to this address from the area on the optical disk 10 which corresponds to the video object set (VMGM_VOBS) 76 for the video manager menu (VMGM) 75 and reproduces that data. This reproduced data is sent via the system processor section 54 to the data RAM section 56. Based on the reproduction time information, the data cell 84 is supplied to the video decoder section 58, audio decoder section 60 and sub-picture decoder section 62 to be decoded there. The decoded data are converted to signals by the D/A and data reproducing section 64, so that the image of the title menu as shown in FIG. 60A is reproduced on the monitor section 6 and a voice is reproduced from the speaker section 8.

When the key "2" corresponding to the chapter is manipulated with the main menu reproduced, or after the title is selected during normal reproduction, the system CPU section 50 determines the reproduction of the chapter menu associated with the currently selected title and determines if the chapter menu is present. When the chapter menu is present, the system CPU section 50 reads the start address (C_FVOBU_SA) of the top video object unit (VOBU) 85 stored in association with the chapter menu in the memory table 56A, reads data of the chapter menu corresponding to this address from the area on the optical disk 10 which corresponds to the video object set (VTSM_VOBS) 95 for the video title set menu (VTSM) and reproduces that data. This reproduced data is sent via the system processor section 54 to the data RAM section 56. Based on the reproduction time information, this data cell 84 is supplied to the video decoder section 58, audio decoder section 60 and sub-picture decoder section 62 to be decoded there. The decoded data are converted to signals by the D/A and data reproducing section 64, so that the image of the chapter menu as shown in FIG. 60B is reproduced on the monitor section 6 and a voice is reproduced from the speaker section 8.

When the key "3" corresponding to the audio is manipulated with the main menu reproduced, or after the title is selected in the normal reproduction, the system CPU section 50 determines the reproduction of the audio menu associated with the currently selected title and determines if the audio menu is present. When the audio menu is present, the system CPU section 50 reads the start address (C_FVOBU_SA) of the top video object unit (VOBU) 85 stored in association with the audio menu in the memory table 56A, reads data of the audio menu corresponding to this address from the area on the optical disk 10 which corresponds to the video object set (VTSM_VOBS) 95 for the video title set menu (VTSM) and reproduces that data. This reproduced data is sent via the system processor section 54 to the data RAM section 56. Based on the reproduction time information, this data cell 84 is supplied to the video decoder section 58, audio decoder section 60 and sub-picture decoder section 62 to be decoded there. The decoded data are converted to signals by the D/A and data reproducing section 64, so that the image of the chapter menu as shown in FIG. 60C is reproduced on the monitor section 6 and a voice is reproduced from the speaker section 8.

When the key "4" corresponding to the sub-picture is manipulated with the main menu reproduced, or after the title is selected during normal reproduction, the system CPU section 50 determines the reproduction of the sub-picture menu associated with the currently selected title and determines if the sub-picture menu is present. When the sub-picture menu is present, the system CPU section 50 reads the start address (C_FVOBU_SA) of the top video object unit (VOBU) 85 stored in association with the sub-picture menu in the memory table 56A, reads data of the sub-picture menu corresponding to this address from the area on the optical disk 10 which corresponds to the video object set (VTSM_VOBS) 95 for the video title set menu (VTSM) and reproduces that data. This reproduced data is sent via the system processor section 54 to the data RAM section 56. Based on the reproduction time information, the data cell 84 is supplied to the video decoder section 58, audio decoder section 60 and sub-picture decoder section 62 to be decoded there. The decoded data are converted to signals by the D/A and data reproducing section 64, so that the image of the sub-picture menu as shown in FIG. 60D is reproduced on the monitor section 6 and a voice is reproduced from the speaker section 8.

When the key "5" corresponding to the angle is manipulated with the main menu reproduced, or after the title is selected in the normal reproduction, the system CPU section 50 determines the reproduction of the angle menu associated with the currently selected title and determines if the angle menu is present. When the angle menu is present, the system CPU section 50 reads the start address (C_FVOBU_SA) of the top video object unit (VOBU) 85 stored in association with the angle menu in the memory table 56A, reads data of the angle menu corresponding to this address from the area on the optical disk 10 which corresponds to the video object set (VTSM_VOBS) 95 for the video title set menu (VTSM) and reproduces that data. This reproduced data is sent via the system processor section 54 to the data RAM section 56. Based on the reproduction time information, the data cell 84 is supplied to the video decoder section 58, audio decoder section 60 and sub-picture decoder section 62 to be decoded there. The decoded data are converted to signals by the D/A and data reproducing section 64, so that the image of the angle menu as shown in FIG. 60E is reproduced on the monitor section 6 and a voice is reproduced from the speaker section 8.

As the system CPU section 50 stores the acquired position data of the individual menus in the menu table 56A in the data RAM section 56, the reproduction of the needed menu can easily be accomplished using this table.

When the system CPU section 50 determines that the main menu is not present, the system CPU section 50 outputs the character code corresponding to the total number of titles, the number of chapters, the audio language, the sub-picture language and the number of angles acquired in the above-described manner, the format data of the character code, and the instruction for preparing the main menu screen to the menu generator 66. Consequently, the menu generator 66 prepares the main menu screen from the character code and format data thereof from the system CPU section 50. The data of this main menu screen is subjected to signal conversion in the D/A and data reproducing section 64 so that the image of the main menu as shown in FIG. 59 is reproduced on the monitor section 6.

Figure 61A:
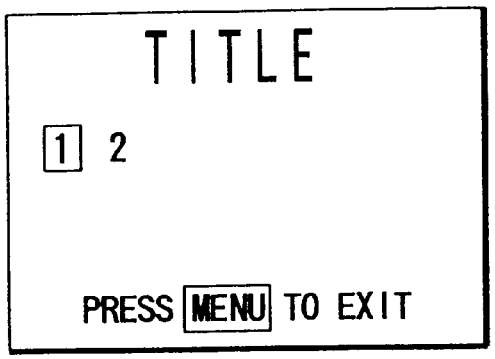
FIGS. 61A through 61E exemplify the reproduced images of the title menu, chapter menu, audio menu, sub-picture menu and angle menu.

When the system CPU section 50 does not determines that the title menu is not present, the system CPU section 50 outputs the character code corresponding to the value of the number of titles acquired in the above-described manner, the format data of the character code, and the instruction for preparing the title menu screen to the menu generator 66. Consequently, the menu generator 66 prepares the title menu screen from the character code and format data thereof from the system CPU section 50. The data of this title menu screen is subjected to signal conversion in the D/A and data reproducing section 64 so that the image of the title menu as shown in FIG. 61A is reproduced on the monitor section 6.

Figure 61B:
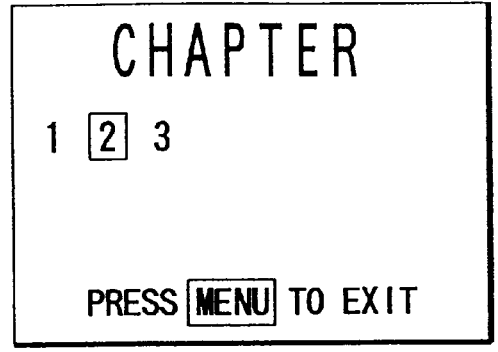

When the system CPU section 50 determines that the chapter menu is not present, the system CPU section 50 outputs the character code corresponding to the value of the number of chapters acquired in the above-described manner, the format data of the character code, and the instruction for preparing the chapter menu screen to the menu generator 66. Consequently, the menu generator 66 prepares the chapter menu screen from the character code and format data thereof from the system CPU section 50. The data of this chapter menu screen is subjected to signal conversion in the D/A and data reproducing section 64 so that the image of the chapter menu as shown in FIG. 61B is reproduced on the monitor section 6.

Figure 61C:
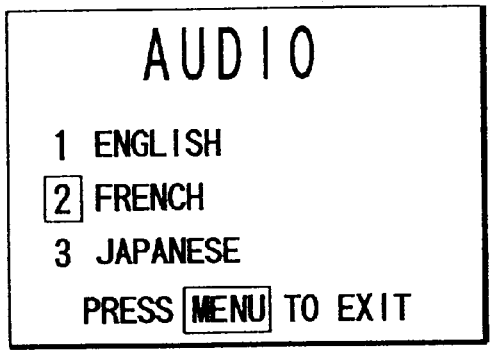

When the system CPU section 50 determines that the audio menu is not present, the system CPU section 50 outputs the character code corresponding to the value of the number of audio data acquired in the above-described manner, the format data of the character code, and the instruction for preparing the audio menu screen to the menu generator 66. Consequently, the menu generator 66 prepares the audio menu screen from the character code and format data thereof from the system CPU section 50. The data of this audio menu screen is subjected to signal conversion in the D/A and data reproducing section 64 so that the image of the audio menu as shown in FIG. 61C is reproduced on the monitor section 6.

Figure 61D:
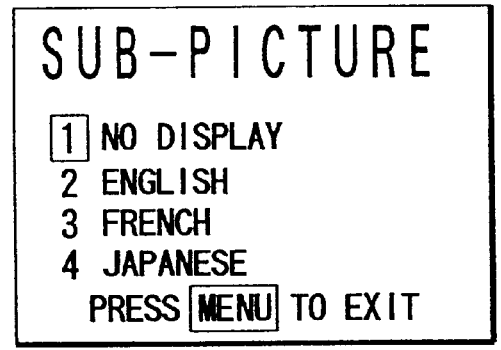

When the system CPU section 50 determines that the sub-picture menu is not present, the system CPU section 50 outputs the character code corresponding to the value of the number of sub-pictures acquired in the above-described manner, the format data of the character code, and the instruction for preparing the sub-picture menu screen to the menu generator 66. Consequently, the menu generator 66 prepares the sub-picture menu screen from the character code and format data thereof from the system CPU section 50. The data of this sub-picture menu screen is subjected to signal conversion in the D/A and data reproducing section 64 so that the image of the sub-picture menu as shown in FIG. 61D is reproduced on the monitor section 6.

Figure 61E:
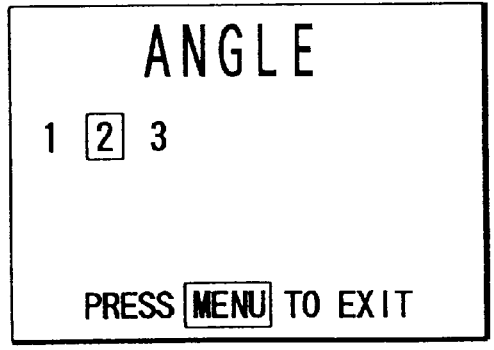

When the system CPU section 50 determines that the angle menu is not present, the system CPU section 50 outputs the character code corresponding to the value of the number of angles acquired in the above-described manner, the format data of the character code, and the instruction for preparing the angle menu screen to the menu generator 66. Consequently, the menu generator 66 prepares the angle menu screen from the character code and format data thereof from the system CPU section 50. The data of this angle menu screen is subjected to signal conversion in the D/A and data reproducing section 64 so that the image of the angle menu as shown in FIG. 61E is reproduced on the monitor section 6.

Note that the system CPU section 50 acquires the number of the video streams, audio streams and sub-picture streams and their attribute information for the video manager menu, which are described in the information management table (VMGI_MAT) 78 of the video manager (VMGI) 75 and sets parameters for the reproduction of the video manager menu in the video decoder section 58, audio decoder section 60 and sub-picture decoder section 62 based on the acquired attribute information.

With reference to FIG. 1, a description will now be given of the operation for reproducing movie data from the optical disk 10 which has the logic format illustrated in FIGS. 6 through 56 under the condition that the title, etc. are selected through the above-described menus.

When the playback key 4c on the key/display section 4 or the playback key 5d on the remote controller 5 is manipulated while the desired title is selected, the system CPU section 50 acquires the last address of the title search pointer table (TT_SRPT) 79 from the title search pointer table information (TT_SRPTI) 92 and acquires the video title set number (VTSN), program chain number (PGCN) and the start address (VTS_SA) of the video title set, which correspond to the input number, from the title search pointers (TT_SRP) 93 corresponding to the input number from the key/display section 4 or the title number selected by the remote controller 5. When there is only one title set, a single title search pointer (TT_SRP) 93 is searched, regardless of the presence of the input number from the key/display section 4 or the selection of the title number by the remote controller 5, to acquire the start address (VTS_SA) of that title set. The system CPU section 50 acquires the target title set from the start address (VTS_SA) of the title set.

Next, from the start address (VTS_SA) of the video title set 72 of FIG. 13, the video title set information (VTSI) 94 about the title set is obtained as shown in FIG. 20. The end address (VTI_MAT_EA) of the video title set information management table (VTSI_MAT) 98 of FIG. 21 is acquired from the management table (VTSI_MAT) 98 of the video title set information (VTSI) 94. At the same time, each section of the reproducing unit shown in FIG. 1 is set on the basis of the number of audio streams and the number of sub-picture data streams (VTS_AST_Ns, VTS_SPST_Ns) and the attribute information on the video, audio, and sub-picture data (VTS, V_ATR, VTS_A_ATR, VTS_SPST_ATR).

When a menu (VTSM) for a video title set (VTS) has a simple structure, the start address (VTSM_VOB_SA) of a video object set (VTSM_VOB) for menus for a video title set is acquired from the video title set information management table (VTSI_MAT) 98 of FIG. 21. On the basis of the video object set (VTSM_VOB) 95, a menu for the video title set is displayed. When a video object set (VTT_VOBS) 96 for titles (VTST) in the title set (VTS) is simply reproduced without selecting a program chain (PGC) with reference to the menu, the video object set 96 is reproduced on the basis of the start address (VTSTT_VOB_SA) shown in FIG. 21.

When a program chain is specified from the key/display section 4 or the remote controller 5, the desired program chain 87 is retrieved in the following procedure. The retrieval of a program chain 87 is not limited to a program chain 87 for titles in the video title set. The same procedure applies to the retrieval of a program chain 87 for a relatively complex menu made up of program chains 87. The start address of the program chain information table (VTS_PGCIT) 100 in the video title set (VTS) of FIG. 21 written in the management table (VTSI_MAT) 98 of the video title set information (VTSI) 94 is acquired, and the information (VTS_PGCIT_I) 102 in the VTS program chain information table 100 of FIG. 24 is read. From the information (VTS_PGCIT_I) 102, the number of program chains (VTS_PGC_Ns) and the end address (VTS_PGCIT_EA) of the table 100 shown in FIG. 25 are obtained.

When the number of a program chain 87 is specified from the key/display section 4 or the remote controller 5 the category of the program chain 87 and the start address of the VTS_PGC information 104 corresponding to the search pointer (VTS_PGCIT_SRP) 103 shown in FIG. 26 are acquired from the VTS_PGCIT search pointer (VTS_PGCIT_SRP) 103 corresponding to the number shown in FIG. 24. On the basis of the start address (VTS_PGCI_SA), the program chain general information (PGC_GI) of FIG. 27 is read out. According to the general information (PGC_GI) 105, the category and playback time of the program chain (PGC) (PGC_CAT, PGC_PB_TIME) are obtained and further the start addresses (C_PBIT_SA, C_POSIT_SA) of the cell playback information table (C_PBIT) 107 and cell position information table (C_POSIT) 108 contained in the general information (PGC_GI) are acquired. From the start address (C_PBIT_SA), the video object identifier (C_VOB_IDN) and cell identifier (C_IDN) of FIG. 36 are acquired as the cell position information (C_POSI) of FIG. 35.

Furthermore, from the start address (C_PBIT_SA), the cell playback information (C_PBI) of FIG. 33 is obtained. The start address (C_FVOBU_SA) of the first VOBU 85 and the start address (C_LVOBO_SA) of the last VOBU in the cell of FIG. 34 contained in the playback information (C_PBI) are acquired. Then, the target cell is retrieved. In the playback of cells, referring to the program map of FIG. 31 in the PGC program map (PGC_PGMAP) 106 of FIG. 27, playback cells 84 are determined one after another. The data cells of program chains thus determined are read one after another from the video object 83 and inputted to the data RAM section 56 via the system processor section 54. The data cells 84, on the basis of the playback time information, are supplied to the video decoder section 58, audio decoder section 60, and sub-picture decoder section 62, which decode them. The decoded signals are subjected to signal conversion at the D/A and data-reproducing section 64 and an image is reproduced at the monitor section 6 and at the same time, sound is reproduced at the speaker sections 8, 9.

Furthermore, a normal playback and high-speed search of the video data using a navigation pack 86 will be described in detail with reference to a flowchart.

Figure 63:
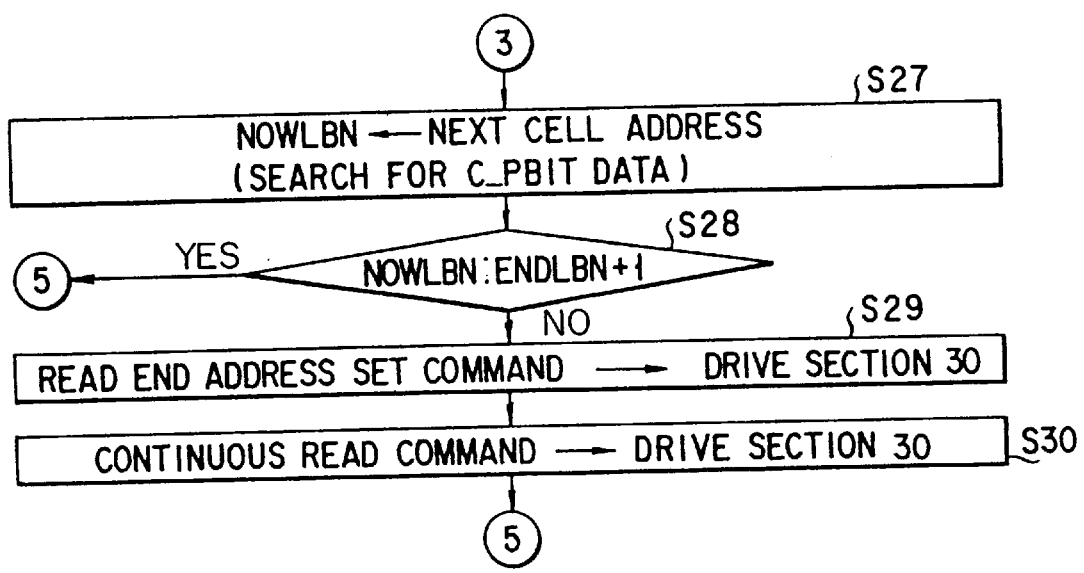

In a normal playback of video data, when a normal playback is started as shown in FIGS. 62 and 63, after the start-up at step S11, the video manager information (VMGI) 75, as explained earlier, is retrieved by the system CPU section 50 and stored in the system ROM/RAM section 52. On the basis of the video manger information (VMGI) 75, the video title set information (VTSI) 94 on the video title set (VTS) 72 is read and simultaneously the video title set menu is displayed on the monitor section 6, as mentioned above, using the video object set (VTSM_VOBS) 95. On the basis of the display, as shown in step S13, the user selects a title set 72 to be reproduced and playback conditions. When the decided title 72 is selected using the key/display section 4 or the remote controller 5, as shown in step S14, the data in the cell playback information table (C_PBIT) 107 of FIGS. 27, 33, and 34 is read by the system CPU section 50 from the program chain information table (VTS_PGCIT) 100 of FIG. 20 in the selected title set 72. The read-out data is stored in the system ROM/RAM section 52. According to the playback conditions, the system CPU section 50 determines a program chain number (VTS_PGC_Ns), angle number (ANGNs), audio stream number, and sub-picture stream number using the aforementioned menus. For example, the eleventh boxing match for a world championship is selected as a title for a program chain and it is determined that Japanese subtitles are displayed as sub-pictures with English narration. The user selects an angle so that a match between the champion and the opponent may be viewed impressively. The determined sub-picture number and audio stream number are set in the register of the system processor section 54 as shown in step S16. Similarly, the playback start time is set in the system time clock in each of the system processor section 54, video decoder 58, audio decoder 60, and sup-picture decoder 62. The start address of the first VOBU in a cell and PGC number, or cell number, are stored in the system ROM/RAM section 52.

As shown in step S17, at the time when a preparation to read a video title set has been made, the system CPU section 50 gives a read command to the disk drive section 30, which searches the optical disk 10 on the basis of the above start address and PGC number. By the read command, the cells 84 related to the specified program chain (PGC) are read one after another from the optical disk 10, and are transferred to the data RAM section 56 via the system CPU section 50 and system processing section 54. The transferred cell data includes a navigation pack 86 which is, as shown in FIG. 8, the head pack of the video object unit (VOBU) 85. The navigation pack 86 is stored into the data RAM 56. Thereafter, the video pack 88, audio pack 91, and sub-picture pack 90 in the video object unit (VOBU) are distributed to the video decoder section 58, audio decoder section 60, and sub-picture decoder section 62, respectively. The individual decoders decode the packs and supply the resulting signals to the D/A and data-reproducing section 64. As a result, a video signal is sent to the monitor 6 and an audio signal is transmitted to the speaker 8, thereby starting the display of images with sub-pictures. At the same time, the reproduction of sound is started.

If a key input is supplied from the key/display section 4 or the remote controller 5 during the video and audio reproduction, the key data acquired is stored into the system RAM/ROM section 52. If there is no key input from the section 4, it is determined in step S19 whether or not a play-back end message has been supplied from the drive section 30. If the message has not been supplied, it is determined in step S20 whether or not a navigation pack 86 has been transferred to the system ROM/RAM section 52. If the navigation pack 86 has been transferred to the section 52, the logical sector number (NV_PCK_LSN) in the naviga-tion pack 86 is stored as current logical block number (NOWLBN) into the system RAM/ROM section 52 in step 21.

After the NV pack has been transferred, it is determined whether the NV pack is the last one in the cell 84. More precisely, in step S22 it is determined whether or not the NV pack is the last navigation pack 86 in the cell 84. This is effected by comparing the start address (C_LVOBU_SA) of the cell playback table (C_PBI) 107 with the address (NV_PCK_LBN) of the navigation pack 86. If the NV 86 is not the last one in the cell 84, control will return to step S19. If the NV pack 86 is the last one in the cell 84, control goes to step S23. In step S23 it is verified whether there is an angle change. An angle change is judged on the basis of whether an angle change is inputted from the key/display section 4 or the remote controller 5 to the system CPU section 50. If there is no angle change, as shown in step S24, it will be verified whether it is the end cell of the program chain (PGC) to which the cell 84 belongs. The verification is effected on the basis of whether the cell 84 shown in FIGS. 27 and 33 is the end cell in the cell playback information table (C_PBIT) 107. Namely, the verification is achieved on the basis of the number of cells 84 constituting the program chain and the identification number of the reproduced cell. If the cell does not correspond to the end cell of the program chain (PGC), control will be returned to step S19.

If the cell 84 is the end cell of the program chain (PGC), it will be determined that the program chain has finished and the next program chain (PGC) will be specified. Except for special cases, the program chains are reproduced in the sequence of their numbers, so that adding 1 to the number of the program chain that has been reproduced enables the number of a program chain to be reproduced next to be set. Whether there is a program chain whose program number is the set program chain number is verified at step S26. If there is no program chain to be reproduced next, control will be passed to the flow for the playback end procedure shown in FIG. 64 explained later. If the set program chain is present, as shown in step S27, the address of the cell in the program chain that has been set again, that is, the start address (C_FVOBU_SA) of C_FVOBU in the cell playback information (C_PBI) 107 of FIG. 34 is obtained as the present logical block number. As shown in step S28, it is verified whether the start address (C_FVOBU_SA) is equal to the address obtained by adding 1 to the end address (ENDLBN) of the cell 84 in the preceding program chain already reproduced. If they are equal to each other, this means the playback of cells having consecutive addresses and control will return to step S19. If those addresses are not equal, this means that addresses of the cells are not consecutive. In this case in step S29, the system CPU section 50 issues a read end address command and temporarily stops the reading operation of the disk drive section 30. The read end address command designates the end address of the current video object unit. Thereafter, in step S30, the system CPU section 50 gives a consecutive read command again to the disk drive section 30. Then, control return to step S19, thereby starting the retrieval of a navigation pack 86.

Figure 64:
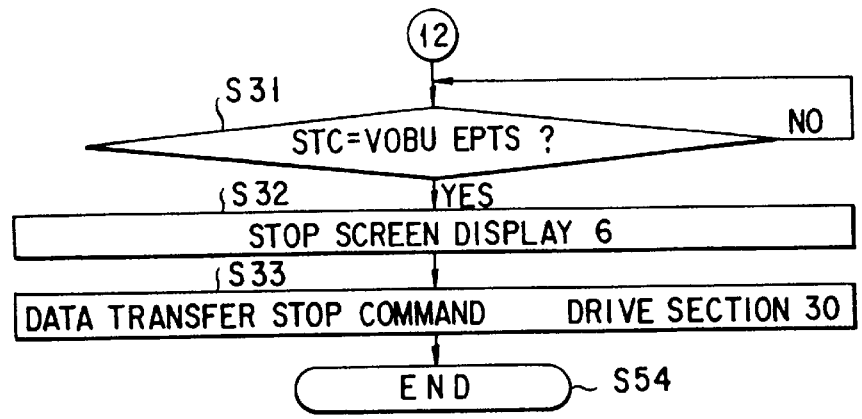

If the end of playback has been specified in step S19, or if there is no program chain to be reproduced next in step S26, the end PTS (VOBU_EPTS) contained in the PCI general information (PCI_GI) is referred to in step S31 (FIG. 64). When the end PTS (VOBU_EPTS) coincides with the system time clock (STC), the monitor 6 will stop displaying on the screen as shown in step S32, then the system CPU will supply a data transfer stop command to the disk drive section 30, which thereby stops the data transfer as shown in step S33, terminating the playback operation.

Figure 65:
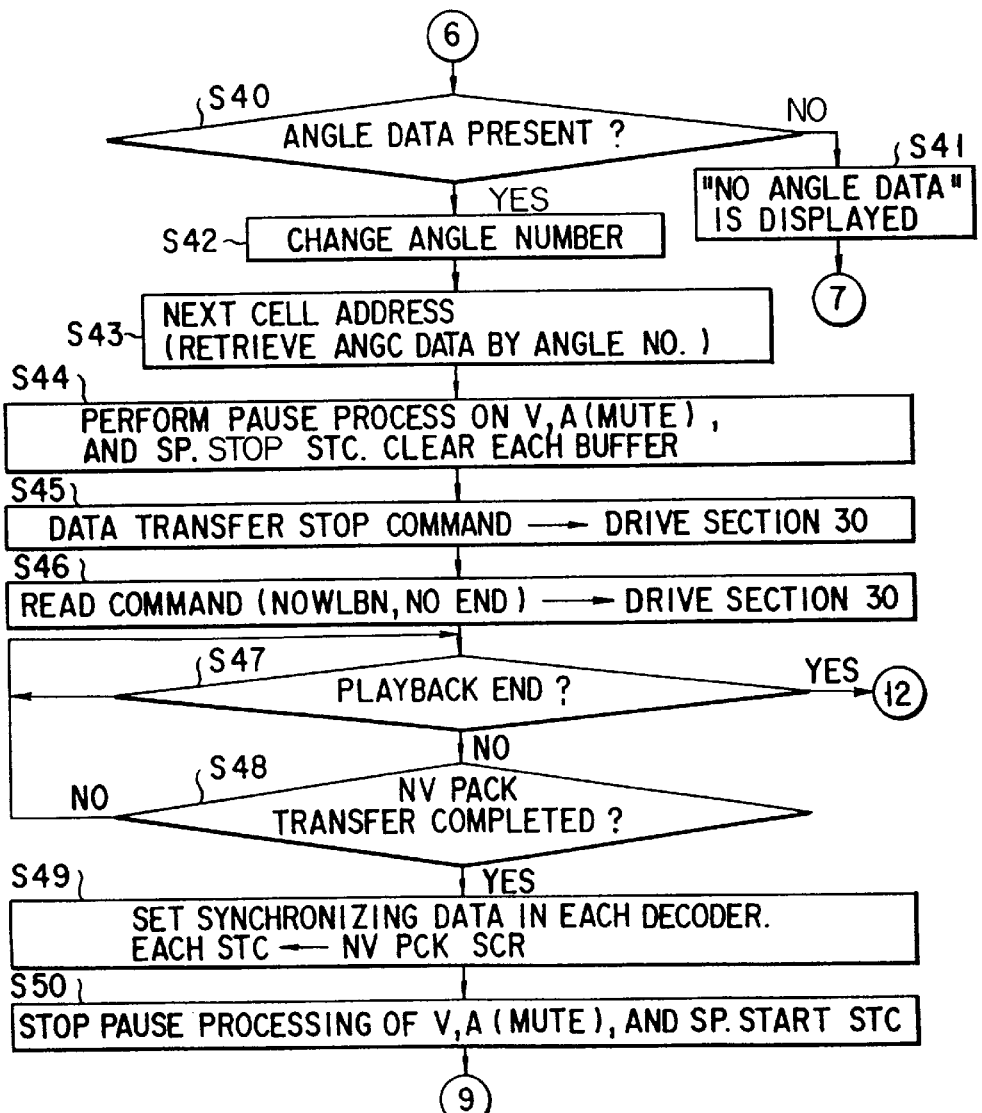
FIG. 65 is a flowchart of the procedure for changing the angle during playback of the video data from an optical disk having logic formats shown in FIGS. 6 to 56.

If an angle change input is supplied from the key/display section 4 or the remote controller 5 in step S23, it will be checked whether there is angle data as shown in step S40 of FIG. 65. The presence/absence of angle has been given as angle information (NSML_AGLI, SML_AGLI) to both of the PCI data 113 and DSI data 115 in the navigation pack 86. If there is no angle to be changed in step S40, the message that there is no angle data will be displayed on the key/display section 4 or the remote controller 5 or the monitor 6 as shown in step S41. After the message for no angle data is displayed, control goes to step S24. If there is angle data, as shown in step S42, an angle number to be changed will be specified from the key/display section 4 or the remote controller 5. In this case, as explained earlier, it will be specified which of the angle information in the PCI data and the DSI data (NSML_AGLI, SML_AGLI) is used to change the angle. When only one type of angle information is available, the selection is limited to the one type. If an angle number is specified, the target addresses (NSML_AGL_C_DSTA, SML_AGL_C_DSTA) of the angle cell corresponding to the specified angle number as shown in FIGS. 47 and 51 will be acquired at step S43. By this address, a cell is searched for. The address is set for the logical block number (NOWLBN) to be searched for. With the angle change operation using the PCI data, the system CPU section 50 performs a muting process on the playback of video and audio data and also effects a pause process on the playback of sub-pictures, as shown in S44. These processes stop the system time clock (STC) in each section of the reproducing system and make it possible to take in the angle data already changed by clearing the buffers in the video, audio, and sub-picture decoders 58, 60, and 62. At the same time, as shown in step S45, the system CPU section 50 issues a read end address command and temporarily prevents the disk drive section 30 from reading the data. Thereafter, as shown in step S46, the CPU section 50 supplies a read command to the disk drive section 30. Then, the selected cell is searched for by the set retrieval logical block number, or by the start address of the cell, the cell data is retrieved consecutively. The transfer of the data in the selected angle cell is then started.

After the transfer has been started, it is checked again, in step S47 whether a playback end has been specified and control waits for the transfer of the navigation pack of the first cell associated with the changed angle. As shown in step S48, it is checked whether a navigation pack has been transferred as a result of the data transfer. If no navigation pack has been transferred, control will be returned to step S47. If a navigation pack has been transferred, each system time clock (STC) will be set with reference to the SCR in the NV pack (NV_PCK_SCR) contained in the DSI general information (DSIG) in the navigation pack 86. Thereafter, the video and audio muting state and the pause state of sub-pictures are canceled at step S50 and then the system time clock (STC) starts. Then, step S21 of FIG. 62 is executed as in a normal playback.

Next, the video data in the logic formats shown in FIGS. 6 to 56, a method of recording data on the optical disk 10 to reproduce the video data, and a recording system to which the recording method is applied will be explained with reference to FIGS. 66 to 71.

FIG. 66 shows an encoder system that creates a video file of a title set 84 in which the video data including menu data is encoded. In the system of FIG. 66, for example, a videotape recorder (VTR) 201, an audiotape recorder (ATR) 202, and a sub-picture source 203 are used as sources of the main video data, the audio data, and the sub-picture data.

Under the control of a system controller (Sys con) 205, they create the main video data, audio data, and sub-picture data, which are supplied to a video encoder (VENC) 206, an audio encoder (AENC) 207, and a sub-picture encoder (SPENC) 208, respectively. Under the control of the system controller (Sys con) 205, these encoders 206, 207, and 208 perform A/D conversion of the main video data, audio data, and sub-picture data and encode them by the respective compression schemes. The encoded main video data, audio data, and sub-picture data (Comp Video, Comp Audio, Comp Sub-pict) are stored in memories 210, 211, and 212. The main video data, audio data, and sub-picture data (Comp Video, Comp Audio, Comp Sub-pict) are outputted to a file formatter (FFMT) 214 under the control of the system controller (Sys con) 205, which converts them so that they may have a file structure of video data for the system as explained earlier. Then, under the control of the system controller (Sys con) 205, management information, such as the setting conditions for each data item, the attributes and data for preparing menu data are stored in a memory 216 in the form of files.

The menu-data preparing data includes the aforementioned PTT_Ns, TT_Ns, ATS_AST_Ns, VTS_AST_ATR, VTS_SPST_Ns and VTS_SPST_AST.

Explained next will be a standard flow of an encoding process in the system controller (Sys con) 205 that creates a file from video data.

According to the flow of FIG. 67, the main video data and the audio data are encoded and the encoded main video data and audio data (Comp Video, Comp Audio) are supplied. Specifically, when the encoding process is started, as shown in step S70 of FIG. 67, the parameters necessary for encoding the main video data and audio data are set. Part of the set parameters are stored in the system controller (Sys con) 205 and at the same time, are used at the file formatter (FFMT) 214. As shown in step S71, the main video data is pre-encoded using the parameters and the optimum distribution of the amount of codes is calculated. Then, on the basis of the code amount distribution obtained in the pre-encoding, the main video data is encoded as shown in step S72. At the same time, the audio data is also encoded at step S72. As shown in step in S73, if necessary, the main video data is partially encoded again and the reencoded portion of the main video data replaces the old one. Through the series of steps, the main video data and audio data are encoded. Furthermore, as shown in steps S74 and S75, the sub-picture data is encoded and the encoded sub-picture data (Comp Sub-pict) is supplied. Namely, the parameters necessary for encoding the sub-picture data are set. As shown in step S74, part of the parameters are stored in the system controller (Sys con) 205 and used in the file formatter (FFMT) 214. On the basis of the parameters, the sub-picture data is encoded. By the process, the sub-picture data is encoded.

According to the flow of FIG. 68, the encoded main video data, audio data, and sub-picture data (Com Video, Com Audio, Comp Sub-pict) are combined and converted so as to form a video data title set structure as explained in FIG. 6. Specifically, as shown in step S76, a cell is set as the smallest unit of the video data and cell playback information on a cell (C_PBI) is created. Then, as shown in step S77, the structure of the cells constituting a program chain and the main video, sub-picture, and audio attributes (the information obtained in encoding the respective data items are used for part of these attributes) are set and the video title set information management table information (VTSI_MAT) 98 containing information on a program chain and a video title set time search map table (VTS_TMAPT) 142 are created. At this time, as the need arises, a video title set part of title search pointer table (VTS_PTT_SRPT) 99 is also created. The encoded main video data, audio data, and sub-picture data (Com Video, Comp Audio, Comp Sup-pict) are subdivided into specific packs. An NV pack is placed at the head of each VOBU unit so that playback can be effected in the order of a time code of each data item, as shown in step S78. With the NV packs arranged this way, each data cell is positioned so that a video object (VOB) may be composed of a plurality of cells as shown in FIG. 8. A set of such video objects is formatted into the title set structure.

In the flow of FIG. 68, the program chain information (PGI) is obtained in the process of step S77 by using the database in the system controller (Sys con) 205 or entering data again as the need arises.

FIG. 69 shows a disk formatter system that records on an optical disk the title set formatted as described above. In the disk formatter system of FIG. 67, the memories 220, 222, in which the created title set is stored, supply these file data items to a volume formatter (VFMT) 226. The volume formatter (VFMT) 226 extracts the management information from the title sets 84, 86, produces a video manager 71, and creates the logic data to be recorded on the disk 10 in the arrangement of FIG. 6. A disk formatter (DFMT) 228 adds error correction data to the logic data created at the volume formatter (VFMT) 226, thereby reconverting the logic data into physical data to be recorded on the disk. A modulator 230 converts the physical data created at the disk formatter (DFMT) 228 into the recording data to be recorded actually on the disk. Then, a recorder 232 records the modulated recording data on the disk 10.

A standard flow for creating the aforementioned disk will be described with reference to FIGS. 70 and 71. FIG. 70 shows the flow for creating the logic data to be recorded on the disk 10. Specifically, as shown in step S80, parameter data items, including the number of video data files, their arrangement, and the size of each video data file, are set first. Next, in step S81 video manger 71 is generated from the parameters set and the video title set information 94 of each video title set 72. In step S82, the video manager 71 and the video tile set 72 are arranged in the order mentioned, according to their logic block numbers, thereby generating logic data which is to be recorded on the disk 10.

Thereafter, the flow for creating the physical data to be recorded on the disk as shown in FIG. 71 is executed. Specifically, as shown in step S83, the logic data is divided into units of a specific number of bytes, thereby forming error correction data. Next, as shown in step S84, the logic data divided into units of a specific number of bytes are combined with the created error correction data to form physical sectors. Thereafter, as shown in step S85, physical data is created by combining physical sectors. In this way, the modulating process based on certain rules is performed on the physical data created in the flow of FIG. 71, thereby forming the recording data. Thereafter, the recording data is recorded on the disk 10.

The above-described data structure can be applied not only to a case where the data is recorded on recording mediums, such as optical disks, and then the disks are distributed to the users, but also to a communication system as shown in FIG. 72. Specifically, according to the procedure shown in FIGS. 66 to 69, an optical disk 10 in which a video manager 71 and video title set 72 as shown in FIG. 6 may be loaded into a reproducing unit 300, from whose system CPU section 50 the encoded data is taken out digitally and transmitted by a modulator/transmitter 310 to the users or the cable subscribers by radio or via a cable. Furthermore, the encoding system 320 shown in FIGS. 66 and 69 may create the data encoded on the provider side, such as a broadcasting station and the encoded data may be transmitted by the modulator/transmitter 310 to the users or the cable subscribers by radio or via a cable. In such a communication system, the information in the video manager 71 is modulated at the modulator/transmitter 310 and then supplied to or is directly supplied to the users free of charge. When a user is interested in the title, the modulator/transmitter 310 transmits the title set 72 at the user's or subscriber's request by radio or via a cable. Under the control of the video manager 71, the video title set information 94 is first transferred and then the title video object 95 in the video title set reproduced according to the title set information 94 is transferred. At this time, if necessary, the video title set menu video object 95 is also transmitted. The transferred data is received by a receiver/demodulator 400 on the user side and is processed as encoded data at the system CPU section 50 of the reproducing unit on the user or subscriber side of FIG. 1 in the same manner as in the above-described reproducing process, whereby the video data is reproduced.

In transferring the video title set 72, the video object sets 95, 96 are transferred using the video object unit 85 of FIG. 8 as a unit. At the head of the video object unit 85, an NV pack 86 containing video playback and search information is arranged. Furthermore, because the NV pack contains the addresses of the video object units to be reproduced immediately before and after the video object unit 85 to which the NV pack 86 belongs, even if the video object unit 85 is lost during transfer for some reason, the video object can be reproduced reliably on the user side by requesting the lost video object unit 85 to be transmitted again. Furthermore, even if transfer is not carried out in the order of playback of video object units, because the system ROM/RAM section 52 on the user side holds accurate playback information on program chains, the system CPU section 50 can specify the order of playback referring to the address data in its NV pack.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An optical disk for use with an optical disk playback apparatus, said playback apparatus comprising:

means for acquiring a total number of titles corresponding to a plurality of video title sets in which data is recorded;

means for determining whether a title menu is present, said title menu being arranged to be displayed as an image of a selection screen on which said video title sets are displayed for selection;

a title key for designating display of said title menu;

means for reproducing said title menu when said title key designates display of said title menu and when said determining means determines that said title menu is present; and means for preparing a title menu screen in accordance with a character code and format data corresponding to said total number of titles acquired by said acquiring means, when said title key designates display of said title menu, and said determining means determines that said title menu is not present, said optical disk comprising:
  a video title set recording area in which said video title sets including data are recorded;
  a total title number recording area in which said total number of titles corresponding to said video title sets recorded in said video title set recording area is recorded;
  a menu ID recording area in which a menu ID is recorded, said menu ID identifying said title menu, which is an image of a selection screen on which said video title sets recorded in said video title set recording area are displayed for selection; and
  a title menu recording area in which said title menu is recorded.

2. An optical disk for use with an optical disk playback apparatus, said playback apparatus comprising:
  means for acquiring a number of a plurality of audio streams corresponding to a plurality of video title sets in which data is recorded, and also for acquiring an audio language code corresponding to each of said audio streams;
  means for determining whether an audio menu is present, said audio menu being arranged to be displayed as an image of a selection screen on which said audio streams corresponding to said video title sets are displayed for selection;
  a designation key for designating display of said audio menu;
  means for reproducing said audio menu when said designation key designates display of said audio menu and when said determining means determines that said audio menu is present; and
  means for preparing an audio menu screen in accordance with a character code and format data corresponding to said number of said audio streams acquired by said acquiring means, when said designation key designates display of said audio menu and said determining means determines that said audio menu is not present, said optical disk comprising:
  a video title set recording area in which said video title sets including data are recorded;
  an audio stream number recording area in which said number of said audio streams corresponding to said video title sets recorded in said video title set recording area is recorded;
  an audio stream language code recording area in which language codes corresponding to said audio streams of said video title sets recorded in said video title set recording area are recorded;
  a menu ID recording area in which a menu ID is recorded, said menu ID identifying said audio menu, which is arranged to be displayed as an image of a selection screen on which said audio streams are displayed for selection; and
  an audio menu recording area in which said audio menu is recorded.

3. An optical disk for use with an optical disk playback apparatus, said playback apparatus comprising:
  means for acquiring a number of sub-picture streams corresponding to a plurality of video title sets in which data is recorded, and also for acquiring a language code corresponding to each of said sub-picture streams;
  means for determining whether a sub-picture menu is present, said sub-picture menu being arranged to be displayed as an image of a selection screen on which said sub-picture streams corresponding to said video title sets are displayed for selection;
  a designation key for designating display of said sub-picture menu;
  means for reproducing said sub-picture menu when said designation key designates display of said sub-picture menu and when said determining means determines that said sub-picture menu is present; and
  preparation means for preparing a sub-picture menu screen in accordance with a character code and format data corresponding to said number of sub-picture streams acquired by said acquiring means, when said designation key designates display of said sub-picture menu and said determination means determines that said sub-picture menu is not present, said optical disk comprising:
  a video title set recording area in which said video title sets including data are recorded;
  a sub-picture stream number recording area in which said number of sub-picture streams corresponding to said video title sets recorded in said video title set recording area is recorded;
  a sub-picture stream language code recording area in which language codes corresponding to said sub-picture streams of said video title sets recorded in said video title set recording area are recorded;
  a menu ID recording area in which a menu ID is recorded, said menu ID identifying said sub-picture menu, which is an image of a selection screen on which said sub-picture streams are displayed for selection; and
  a sub-picture menu recording area in which said sub-picture menu is recorded.

4. An optical disk playback apparatus for reproducing data from an optical disk, said optical disk comprising:
  a file area in which a plurality of files including video data are recorded;
  a total title number recording area in which a total number of titles corresponding to said files recorded in said file area is recorded;
  a title menu presence information recording area in which title menu presence information indicating whether or not a title menu is present is recorded, said title menu being arranged to be displayed as an image of a selection screen on which titles corresponding to said file area are displayed for selection; and
  a menu video data recording area in which menu video data, based on which said title menu is displayed, is recorded, said optical disk playback apparatus comprising:
  means for acquiring a total number of titles corresponding to said optical disk based on said total number of titles recorded in said total title number recording area;
  a title key for designating display of said title menu;
  means for determining whether said title menu is present by referring to said title menu presence information recorded in said title menu presence information recording area, when said title key designates display of said title menu;
  means for reproducing said menu video data recorded in said menu video data recording area and used for display of said title menu, when said determining means determines that said title menu is present; and
  preparation means for preparing a title menu screen in accordance with a character pattern corresponding to a character of said total number of titles acquired by said acquiring means, when said title key designates display of said title menu and said determining means determines that said title menu is not present.

5. An optical disk playback apparatus for reproducing data from an optical disk, said optical disk comprising:

a file area in which a plurality of files including video data are recorded;

an audio stream number recording area in which a number of a plurality of audio streams corresponding to said files recorded in said file area is recorded;

an audio stream language code recording area in which language codes corresponding to a plurality of audio streams are recorded;

an audio menu presence information recording area in which audio menu presence information indicating whether or not an audio menu is present is recorded, said audio menu being arranged to be displayed as an image of a selection screen on which audio streams corresponding to said file area are displayed for selection; and a menu video data recording area in which menu video data, based on which said audio menu is displayed, is recorded, said optical disk playback apparatus comprising:

means for acquiring said number of said audio streams present on said optical disk and a plurality of audio stream types corresponding to said audio streams, by referring to an audio stream number, said audio stream number being recorded in a type recording area, and an audio stream type being recorded in said type recording area;

an audio key for designating display of said audio menu;

means for determining whether said audio menu is present by referring to said audio menu presence information recorded in said audio menu presence information recording area, when said audio key designates display of said audio menu;

means for reproducing said menu video data recorded in said menu video data recording area and used for display of said audio menu, when said determining means determines that said audio menu is present; and means for preparing an audio menu screen in accordance with a character code corresponding to said audio stream number acquired by said acquiring means and a character pattern corresponding to a language code of said audio stream type, when said audio key designates display of said audio menu and said determining means determines that said audio menu is not present.

6. An optical disk playback apparatus for reproducing data from an optical disk, said optical disk comprising:

a file area in which a plurality of files including sub-picture data are recorded;

a sub-picture channel number/type recording area in which a sub-picture channel number representing a number of sub-picture channels recorded in said file area is recorded, along with a type of each of said sub-picture channels;

a sub-picture menu presence information recording area in which sub-picture menu presence information indicating whether a sub-picture menu is present is recorded, said sub-picture menu arranged to be displayed as an image on a selection screen on which said sub-picture channels corresponding to said file area are displayed for selection; and a menu video data recording area in which menu video data, based on which said sub-picture menu is displayed, is recorded, said optical disk playback apparatus comprising:

means for acquiring said number of sub-picture channels present on said optical disk and a plurality of sub-picture channel types corresponding to said sub-picture channels, by referring to said sub-picture channel number, said sub-picture channel number being recorded in a type recording area, and a sub-picture channel type being recorded in said type recording area;

a sub-picture key for designating display of said sub-picture menu;

means for determining whether said sub-picture menu is present by referring to said sub-picture menu presence information recorded in said sub-picture menu presence information recording area, when said sub-picture key designates display of said sub-picture menu;

means for reproducing said menu video data recorded in said menu video data recording area and used for display of said sub-picture menu, when said determination means determines that said sub-picture menu is present; and means for preparing a sub-picture menu screen in accordance with a character code corresponding to said sub-picture channel number acquired by said acquiring means and a character pattern corresponding to a language code of said sub-picture channel type, when said sub-picture key designates display of said sub-picture menu and said determining means determines that said sub-picture menu is not present.

7. An optical disk playback apparatus for reproducing data from an optical disk, said optical disk comprising:

a video title set recording area in which a plurality of video title sets including data are recorded;

a total title number recording area in which a total number of titles corresponding to said video title sets recorded in said video title set recording area is recorded;

a menu ID recording area in which a menu ID identifying a title menu is recorded, said title menu being arranged to be displayed as an image of a selection screen on which said video title sets recorded in said video title set recording area are displayed for selection; and a title menu recording area in which said title menu is recorded;

said optical disk playback apparatus comprising:

means for acquiring a total number of titles corresponding to said video title sets by referring to said total number of titles recorded in said total title number recording area;

means for determining whether a title menu is present by referring to said menu ID recorded in said menu ID recording area, said title menu being arranged to be displayed as an image of a selection screen on which said video title sets are displayed for selection;

a title key for designating display of said title menu;

means for reproducing said title menu recorded in said title menu recording area when said title key designates display of said title menu and when said determining means determines that said title menu is present; and means for preparing a title menu screen in accordance with a character code and format data corresponding to said total number of titles acquired by said acquiring means, when said title key designates display of said title menu and said determining means determines that said title menu is not present.

8. An optical disk playback method for reproducing data from an optical disk, said optical disk comprising:

a video title set recording area in which a plurality of video title sets including data are recorded;

a total title number recording area in which a total number of titles corresponding to the video title sets recorded in said video title set recording area is recorded;

a menu ID recording area in which a menu ID identifying a title menu is recorded, said title menu being arranged to be displayed as an image of a selection screen on which said video title sets recorded in said video title set recording area are displayed for selection; and a title menu recording area in which said title menu is recorded;

said optical disk playback method comprising:

acquiring a total number of titles corresponding to said video title sets by referring to said total number of titles recorded in said total title number recording area;

determining whether said title menu is present;

designating display of said title menu by referring to said menu ID stored in said menu ID recording area;

reproducing said title menu when a title key designates display of said title menu and when said determining determines that said title menu is present; and preparing a title menu screen in accordance with a character code and format data corresponding to said acquired total number of titles, when display of said title menu is designated and said title menu is determined not to be present.

9. An optical disk playback apparatus for reproducing data from an optical disk, said optical disk comprising:

a video title set recording area in which a plurality of video title sets including data are recorded;

an audio stream number recording area in which a number of audio streams corresponding to said video title sets recorded in said video title set recording area is recorded;

an audio stream language code recording area in which a plurality of language codes of a plurality of audio streams of said video title sets stored in said video title set recording area are recorded;

a menu ID recording area in which a menu ID identifying an audio menu is recorded, said audio menu being arranged to be displayed as an image of a selection screen on which said audio streams are displayed for selection; and an audio menu recording area in which said audio menu is recorded;

said optical disk playback apparatus comprising:

means for acquiring a number of audio streams corresponding to said plurality of video title sets in which said data are recorded and also for acquiring a language code corresponding to each of said audio streams, by referring to said number of audio streams recorded in said audio stream number recording area and corresponding to said video title sets, and said language code recorded in said audio stream language code recording area and corresponding to each of said audio streams;

means for determining whether an audio menu is present by referring to said menu ID recorded in said menu ID recording area, said audio menu being arranged to be used as an image of a selection screen on which said audio streams corresponding to said video title sets are displayed for selection;

a designation key for designating display of said audio menu;

means for reproducing said audio menu when said designation key designates display of said audio menu and when said determining means determines that said audio menu is present; and preparation means for preparing an audio menu screen in accordance with a character code corresponding to said number of audio streams acquired by said acquiring means, said language codes of said audio streams, and format data when said designation key designates display of said audio menu and said determination means determines that said audio menu is not present.

10. An optical disk playback method for reproducing data from an optical disk, said optical disk comprising:

a video title set recording area in which a plurality of video title sets including data are recorded;

an audio stream number recording area in which a number of audio streams corresponding to said video title sets recorded in said video title set recording area is recorded;

an audio stream language code recording area in which a plurality of language codes of a plurality of audio streams of said video title sets stored in said video title set recording area are recorded;

a menu ID recording area in which a menu ID identifying an audio menu is recorded, said audio menu being arranged to be displayed as an image of a selection screen on which said audio streams are displayed for selection; and an audio menu recording area in which said audio menu is recorded;

said optical disk playback method comprising:

acquiring a number of audio streams corresponding to said plurality of video title sets in which data are recorded, and also acquiring a language code corresponding to each of said audio streams, by referring to said number of audio streams recorded in said audio stream number recording area and corresponding to said video title sets, and said language code recorded in said audio stream language code recording area and corresponding to each of said audio streams;

determining whether an audio menu is present by referring to said menu ID recorded in said menu ID recording area, said audio menu being arranged to be used as an image of a selection screen on which said audio streams corresponding to said video title sets are displayed for selection;

designating display of said audio menu;

reproducing said audio menu when display of said audio menu is designated and when said audio menu is determined to be present; and preparing an audio menu screen in accordance with a character code corresponding to said acquired number of audio streams, said language codes of said audio streams, and format data, when display of said audio menu is designated and said audio menu is determined not to be present.

11. An optical disk playback apparatus for reproducing data from an optical disk, said optical disk comprising:

a video title set recording area in which a plurality of video title sets including data are recorded;

a sub-picture stream number recording area in which a number of sub-picture streams corresponding to said video title sets recorded in said video title set recording area is recorded;

a sub-picture stream language code recording area in which a plurality of language codes of said sub-picture streams of said video title sets stored in said video title set recording area are recorded;

a menu ID recording area in which a menu ID identifying a sub-picture menu is recorded, said sub-picture menu being arranged to be displayed as an image of a selection screen on which said sub-picture streams are displayed for selection; and a sub-picture menu recording area in which said sub-picture menu is recorded;

said optical disk playback apparatus comprising:

means for acquiring a number of sub-picture streams corresponding to said plurality of video title sets in which data are recorded, and also a language code corresponding to each of said sub-picture streams, by referring to said number of sub-picture streams recorded in said sub-picture stream number recording area and corresponding to said video title sets, and said language code recorded in said sub-picture stream language code recording area and corresponding to each of said sub-picture streams;

means for determining whether a sub-picture menu is present by referring to said menu ID recorded in said menu ID recording area, said sub-picture menu being used as an image of a selection screen on which said sub-picture streams corresponding to said video title sets are displayed for selection;

a designation key for designating display of said sub-picture menu;

means for reproducing said sub-picture menu when said designation key designates display of said sub-picture menu and when said determining means determines that said sub-picture menu is present; and means for preparing a sub-picture menu screen in accordance with a character code corresponding to said number of said sub-picture streams acquired by said acquiring means, said language codes of said sub-picture streams, and format data, when said designation key designates display of said sub-picture menu and said determining means determines that said sub-picture menu is not present.

12. An optical disk playback method for reproducing data from an optical disk, said optical disk comprising:

a video title set recording area in which a plurality of video title sets including data are recorded;

a sub-picture stream number recording area in which a number of sub-picture streams corresponding to said video title sets recorded in said video title set recording area is recorded;

a sub-picture stream language code recording area in which a plurality of language codes of a plurality of sub-picture streams of said video title sets stored in said video title set recording area are recorded;

a menu ID recording area in which a menu ID identifying a sub-picture menu is recorded, said sub-picture menu being arranged to be displayed as an image of a selection screen on which said sub-picture streams are displayed for selection; and a sub-picture menu recording area in which said sub-picture is recorded;

said optical disk playback method comprising:

acquiring a number of said sub-picture streams corresponding to said plurality of video title sets in which data are recorded, and also acquiring a language code corresponding to each of said sub-picture streams, by referring to said number of sub-picture streams recorded in said sub-picture stream number recording area and corresponding to said video title sets, and said language code recorded in said sub-picture stream language code recording area and corresponding to each of said sub-picture streams;

determining whether a sub-picture menu is present by referring to said menu ID recorded in said menu ID recording area, said sub-picture menu being used as an image of a selection screen on which said sub-picture streams corresponding to said video title sets are displayed for selection;

designating display of said sub-picture menu;

reproducing said sub-picture menu when display of said sub-picture menu is designated and when said sub-picture menu is determined as being present; and preparing a sub-picture menu screen in accordance with a character code corresponding to said acquired number of sub-picture streams, said language codes of said sub-picture streams, and format data, when display of said sub-picture menu is designated and said sub-picture menu is determined as not being present.

* * * * *